(12) United States Patent
Koito et al.

(10) Patent No.: US 12,411,363 B2
(45) Date of Patent: Sep. 9, 2025

(54) LIGHTING DEVICE AND OPTICAL ELEMENT

(71) Applicant: Japan Display Inc., Tokyo (JP)

(72) Inventors: Takeo Koito, Tokyo (JP); Kojiro Ikeda, Tokyo (JP); Tae Kurokawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 135 days.

(21) Appl. No.: 18/492,067

(22) Filed: Oct. 23, 2023

(65) Prior Publication Data

US 2024/0045237 A1 Feb. 8, 2024

Related U.S. Application Data

(63) Continuation of application No. PCT/JP2022/019928, filed on May 11, 2022.

(30) Foreign Application Priority Data

May 21, 2021 (JP) ................. 2021-086465

(51) Int. Cl.
*G02F 1/00* (2006.01)
*G02F 1/01* (2006.01)
*G02F 1/03* (2006.01)

(52) U.S. Cl.
CPC .......... *G02F 1/0045* (2013.01); *G02F 1/0105* (2013.01); *G02F 1/0316* (2013.01); *G02F 1/0327* (2013.01)

(58) Field of Classification Search
CPC ..................................................... G02F 1/0045
See application file for complete search history.

(56) References Cited

U.S. PATENT DOCUMENTS

2006/0120082 A1* 6/2006 Choo ................. G02F 1/133603
362/276
2016/0077402 A1 3/2016 Takehara et al.

FOREIGN PATENT DOCUMENTS

JP 2006-147573 A 6/2006
JP 2010-230887 A 10/2010
(Continued)

OTHER PUBLICATIONS

International Search Report issued in International Patent Application No. PCT/JP2022/019928 on Jul. 19, 2022 and English translation of same. 5 pages.

(Continued)

*Primary Examiner* — Chanceity N Robinson
(74) *Attorney, Agent, or Firm* — K&L Gates LLP

(57) ABSTRACT

A lighting device includes a light source, a first liquid crystal cell over the light source, and a second liquid crystal cell over the first liquid crystal cell. The light source includes light-emitting elements arranged in a matrix shape with m rows and n columns. The first and second liquid crystal cells each include: a first substrate; first electrode groups located over the first substrate and arranged in a matrix shape with m rows and n columns; a liquid crystal layer over the first electrode groups; and a second substrate over the liquid crystal layer. In each of the first and the second liquid crystal cells, the first electrode groups each have first electrodes extending in a row direction, and the light-emitting elements in a jth row and a kth column overlaps the first electrode group located in the jth row and the kth column.

19 Claims, 44 Drawing Sheets

(56) References Cited

FOREIGN PATENT DOCUMENTS

| | | | |
|---|---|---|---|
| JP | 2016-057541 | A | 4/2016 |
| JP | 2019-169435 | A | 10/2019 |
| JP | 2021-026916 | A | 2/2021 |
| JP | 2021-032913 | A | 3/2021 |

OTHER PUBLICATIONS

Written Opinion issued in International Patent Application No. PCT/JP2022/019928 on Jul. 19, 2022. 3 pages.

\* cited by examiner

100

100

LIGHTING DEVICE AND OPTICAL ELEMENT

CROSS-REFERENCE TO RELATED APPLICATIONS

This application is a Continuation of International Patent Application No. PCT/JP2022/019928, filed on May 11, 2022, which claims the benefit of priority to Japanese Patent Application No. 2021-086465, filed on May 21, 2021, the entire contents of which are incorporated herein by reference.

FIELD

An embodiment of the present invention relates to a lighting device and a driving method thereof. For example, an embodiment of the present invention relates to a lighting device capable of arbitrarily controlling an illuminated region and a driving method thereof.

BACKGROUND

In recent years, lighting devices have been developed in which an illuminated region and an illumination distance of a light source can be controlled by controlling the light emitted from the light source using a liquid crystal lens. For example, the lighting devices disclosed in Japanese Patent Application Publications No. 2010-230887, 2016-057541, and 2019-169435 include a liquid crystal cell having a liquid crystal layer and electrodes sandwiching the liquid crystal layer as well as a light source overlapping the liquid crystal cell. In these lighting devices, the orientation of liquid crystal molecules in the liquid crystal layer is controlled by the electric field between the electrodes to allow the liquid crystal cell to function as a lens, thereby controlling the light distribution.

SUMMARY

An embodiment of the present invention is a lighting device. The lighting device includes a light source, a first liquid crystal cell over the light source, and a second liquid crystal cell over the first liquid crystal cell. The light source includes a plurality of light-emitting elements arranged in a matrix shape with m rows and n columns. Each of the first liquid crystal cell and the second liquid crystal cell includes: a first substrate; a plurality of first electrode groups located over the first substrate and arranged in a matrix shape with m rows and n columns; a liquid crystal layer over the plurality of first electrode groups; and a second substrate over the liquid crystal layer. In each of the first liquid crystal cell and the second liquid crystal cell, each of the plurality of first electrode groups has a plurality of first electrodes extending in a row direction, and the light-emitting element in a jth row and a kth column overlaps with the first electrode group located in the jth row and the kth column. Longitudinal directions of the plurality of first electrodes of the first liquid crystal cell are parallel to longitudinal directions of the plurality of first electrodes of the second liquid crystal cell. n and m are each a natural number larger than 1, j is a variable selected from natural numbers equal to or larger than 1 and equal to or smaller than n, and k is a variable selected from natural numbers equal to or larger than 1 and equal to or smaller than m.

An embodiment of the present invention is an optical element. The optical element includes a first substrate, a plurality of first electrode groups, a liquid crystal layer over the plurality of first electrode groups, and a second substrate over the liquid crystal layer. The plurality of first electrode groups is located over the first substrate and is arranged in a matrix shape with m rows and n columns. Each of the plurality of first electrode groups includes a plurality of first electrodes extending in a row direction. In the plurality of first electrode groups arranged in a kth column, the odd-numbered first electrodes along a column direction are connected to a first wiring, while the even-numbered first electrodes are connected to a second wiring. In the plurality of first electrode groups arranged in a (k+1)th column, the odd-numbered first electrodes along the column direction are connected to a third wiring, while the even-numbered first electrodes are connected to a fourth wiring. n and m are each a natural number larger than 1, and k is a variable selected from a natural number equal to or larger than 1 and smaller than n.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate. When a plurality of the same or similar structures is collectively represented, a reference number is used, while a hyphen and a natural number follow the reference number when the structures are independently represented. In addition, when a portion of a structure is represented, a small letter of the alphabet may be provided after the reference number.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the specification and the claims, an expression that two structures "intersect" includes not only a state where these two structures orthogonally (90°) intersect but also a state where these two structures intersect at an angle of 90°±10°.

In the specification and the claims, an expression "a structure is exposed from another structure" means a mode in which a portion of the structure is not covered by the other structure and includes a mode where the portion uncovered by the other structure is further covered by another structure. In addition, the mode expressed by this expression includes a mode where the structure is not in contact with the other structure.

First Embodiment

In this embodiment, an optical element according to an embodiment of the present invention, a lighting device 100 including the optical element, and a driving method thereof are explained.

1. Outline Structure of Lighting Device

Figure 1:
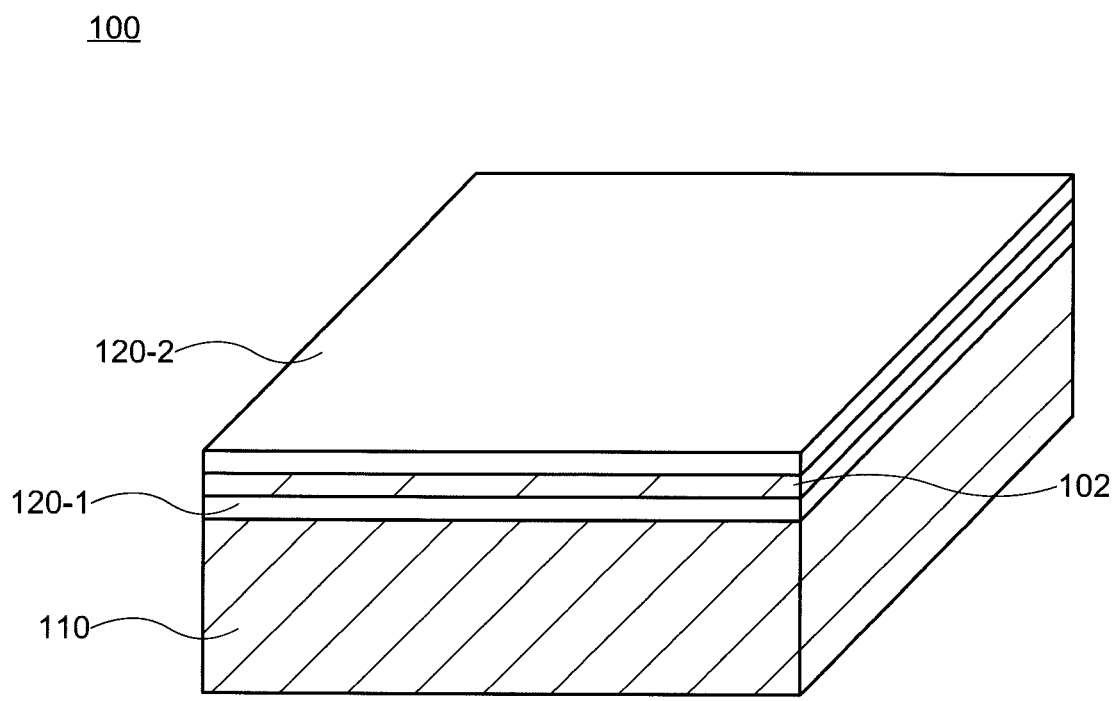
FIG. 1 is a schematic perspective view of a lighting device according to an embodiment of the present invention.

A schematic perspective view of the lighting device 100 is shown in FIG. 1. As shown in FIG. 1, the lighting device 100 includes, as fundamental components, a light source 110 and two optical elements disposed over and overlapping the light source 110. One of the optical elements is a first liquid crystal cell 120-1 over the light source 110, while the other is a second liquid crystal cell 120-2 disposed over and overlapping the first liquid crystal cell 120-1. The first liquid crystal cell 120-1 and the second liquid crystal cell 120-2 may be in direct contact with or fixed to each other via an adhesive layer 102. Although not illustrated, the lighting device 100 may further have one or a plurality of liquid crystal cells 120 over or under the second liquid crystal cell 120-2 or between the first liquid crystal cell 120-1 and the second liquid crystal cell 120-2. The total number of liquid crystal cells 120 is not restricted and may be equal to or more than 2 and equal to or less than 10, equal to or more than 2 and equal to or less than 6, equal to or more than 2 and equal to or less than 4, or an odd number.

1-1. Light Source

Figure 2A:
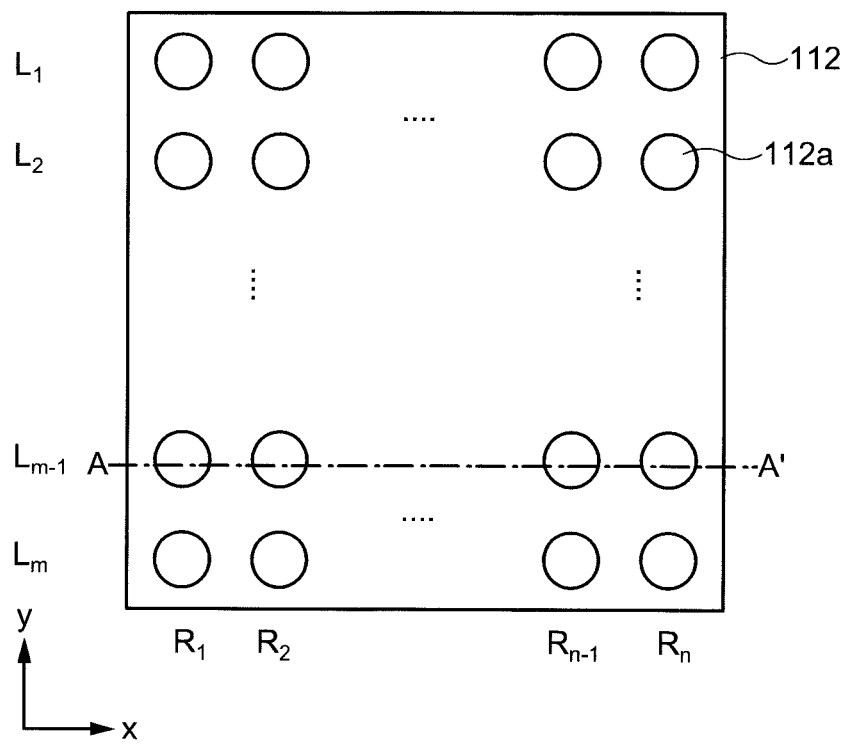
FIG. 2A is a schematic top view of a light source of a lighting device according to an embodiment of the present invention.
Figure 2B:
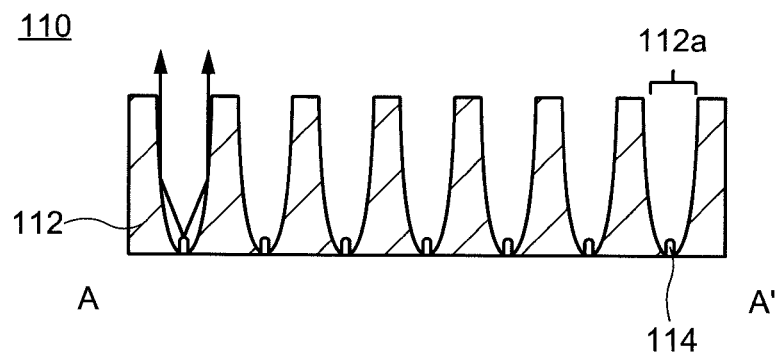
FIG. 2B is a schematic cross-sectional view of a light source of a lighting device according to an embodiment of the present invention.

A schematic top view of the light source 110 is shown in FIG. 2A, and a schematic view of the cross section along the chain line A-A' in FIG. 2A is shown in FIG. 2B. The light source 110 has a reflective plate 112 and a plurality of light-emitting elements 114. One or a plurality of light-emitting elements 114 is provided in each depressed portion 112a. The reflective plate 112 has a function of imparting directionality to the light emitted from the light-emitting elements 114 and irradiating the liquid crystal cell 120 with the light. Specifically, the reflective plate 112 has a plurality of depressed portions 112a arranged in a matrix shape with m rows and n columns. Here, m and n are each a natural number greater than 1, and m and n may be independently 6, 8, 12, 14, or 16, for example. m and n may be the same as or different from each other. Hereafter, the x-direction in the drawings is defined as a row direction, and the y direction is defined as a column direction. The direction perpendicular to both the x direction and the y direction is defined as a z direction. For example, the x direction and the y direction are parallel to the sides of a first substrate 122 or a second substrate 124 described below.

(1) Reflective Plate

The material structuring the reflective plate 112 may be arbitrarily selected and may be a metal such as aluminum and stainless steel, a polymer such as a polyimide, a polycarbonate, and an acrylic resin, or an inorganic oxide such as glass, for example. However, the reflective plate 112 reflects and converges the light from the light-emitting elements 114 in the depressed portions 112a and directs the light toward the liquid crystal cell 120 as shown by the arrows in FIG. 2B. Therefore, when the reflective plate 112 is composed of a material transmitting visible light such as glass and a polymer, it is preferable to configure the surface of the concave portions 112a with a film having a high reflectance to visible light. Examples of such a film include a film containing a metal such as aluminum, silver, gold, chromium, and stainless steel and a laminate of thin films containing a high refractive-index material such as titanium oxide and tantalum oxide and thin films containing a low refractive-index material such as silicon oxide and magnesium fluoride. The shape of the depressed portions 112a is appropriately adjusted to obtain highly directional light from the light-emitting elements 114 in the depressed portions 112a.

Figure 3A:
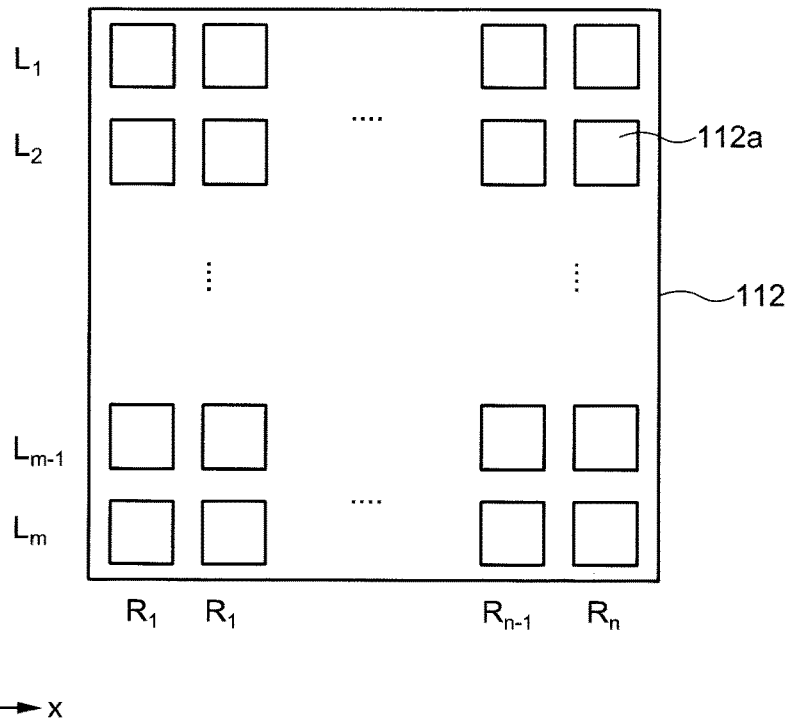
FIG. 3A is a schematic top view of a light source of a lighting device according to an embodiment of the present invention.

There is no restriction on the shape of the reflective plate 112 in the xy plane and may be determined as appropriate according to the environment in which the lighting device 100 is disposed. For example, as shown in FIG. 1A, the shape of the reflective plate 112 in the xy plane may be a square or may be a circle, an ellipse, or a polygon although not illustrated. The planar shape (hereinafter, simply referred to as a planar shape of the depressed portion 112a) of the depressed portion 112a in an upper surface of the reflective plate 112 (an upper surface closer to the liquid crystal cell 120) is not restricted and may be a circle as shown in FIG. 2A or a polygon exemplified by a rectangle as shown in FIG. 3A.

Figure 3B:
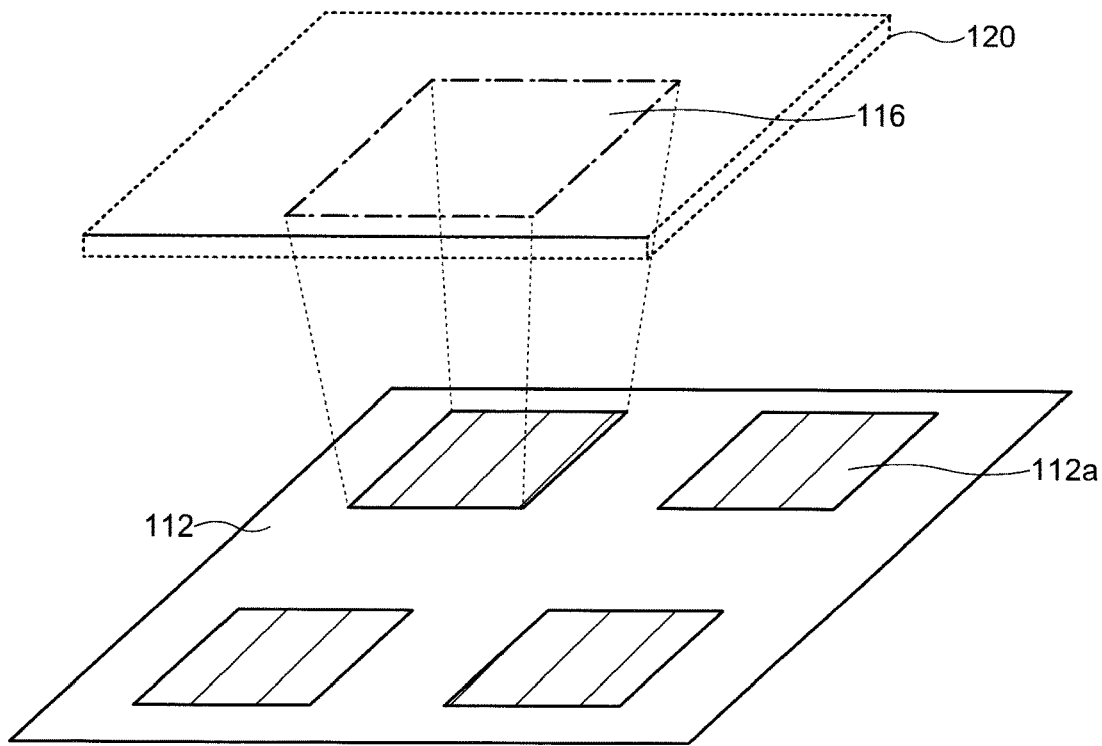
FIG. 3B is a schematic perspective view of a portion of a light source of a lighting device according to an embodiment of the present invention.

The use of the reflective plate 112 with the depressed portions 112a having the light-converging function allows the light from the light-emitting element 114 to have high directivity, by which light with parallel rays in the beam (also called collimated light) or light with low diffusion (highly directional light) can be obtained from each depressed portion 112a. Therefore, an illuminated plane 116 with the same shape as or a similar shape to the planar shape of the depressed portion 112a can be formed on the liquid crystal cell 120 (FIG. 3B). In other words, each light-emitting element 114 is capable of selectively irradiating a portion of the first liquid crystal cell 120-1 overlapping the depressed portion 112a and providing the illuminated plane 116 with light reflecting the planar shape of the depressed portion 112a.

(2) Light Emitting Device

Each light-emitting element 114 is an element having a function to emit light when supplied with an electric current, and there are no restrictions on its structure. A typical example is a light-emitting diode (LED). A light emitting diode has, as its fundamental components, an electroluminescence element, in which an inorganic emitter such as gallium nitride and gallium nitride containing indium is sandwiched by a pair of electrodes, as well as a protective film protecting the electroluminescence element, for example, and is configured to emit visible light by electroluminescence.

A single or a plurality of light-emitting elements 114 may be provided in each depressed portion 112a. The emission color of each light-emitting element 114 may also be arbitrarily selected. For example, one or a plurality of light-emitting elements 114 providing white emission may be provided in each depressed portion 112a. Alternatively, the light source 110 may be configured by disposing a red-emissive light-emitting element 114, a green-emissive light-emitting element 114, and a blue-emissive light-emitting element 114 in each depressed portion 112a so that emission with a variety of colors can be obtained.

There is no restriction on the size of each light-emitting element 114, and a light emitting diode with an occupying area equal to or more than $1.0 \times 10^4$ μm$^2$ and equal to or less than $1.0 \times 10^6$ μm$^2$, equal to or more than $4.0 \times 10^4$ μm$^2$ and equal to or less than $5.0 \times 10^5$ μm$^2$, or equal to or more than $9.0 \times 10^4$ μm$^2$ and equal to or less than $2.5 \times 10^5$ μm$^2$ may be used. As an example, a so-called micro-LED with a size of approximately 320 μm×300 μm may be used as the light-emitting element 114.

1-2. Liquid Crystal Cell

As described above, at least two liquid crystal cells 120 are arranged over the light source 110 in the lighting device 100. The structures of the liquid crystal cells 120 may be the same as or different from each other. The structure of the liquid crystal cells 120 is explained below.

Figure 4A:
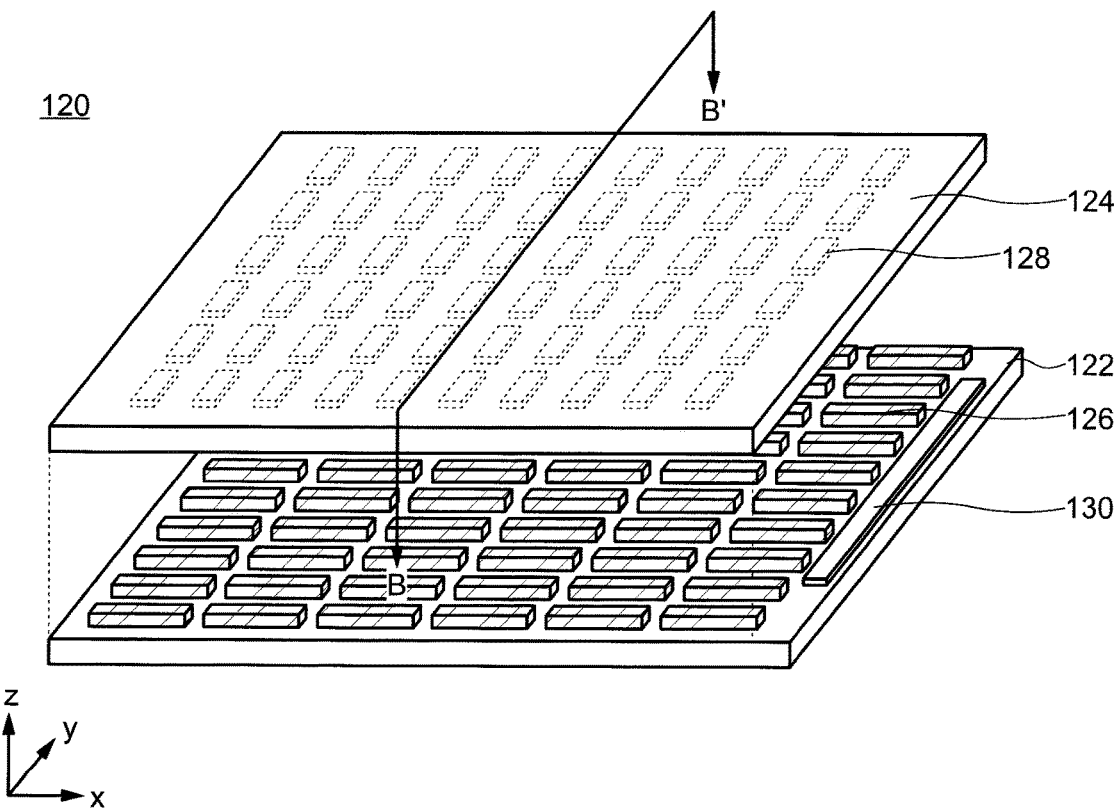
FIG. 4A is a schematic developed and perspective view of a liquid crystal cell of a lighting device according to an embodiment of the present invention.
Figure 4B:
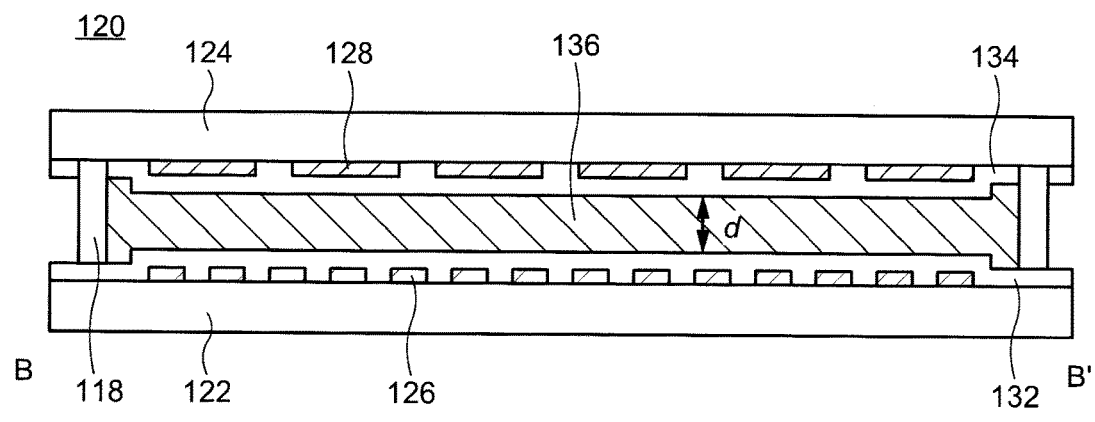
FIG. 4B is a schematic cross-sectional view of a liquid crystal cell of a lighting device according to an embodiment of the present invention.

A schematic developed and perspective view of one liquid crystal cell 120 is shown in FIG. 4A, and a schematic view of a cross section along the chain line B-B' in FIG. 4A is shown in FIG. 4B. As shown in these drawings, the liquid crystal cell 120 has a first substrate 122 and a second substrate 124 opposing the first substrate 122, between which a variety of elements structuring a liquid crystal element (a plurality of first electrodes 126, a plurality of second electrodes 128, a liquid crystal layer 136, a first orientation film 132, a second orientation film 134, and the like) is arranged.

(1) First Substrate and Second Substrate

The first substrate 122 and the second substrate 124 serve as a base material for respectively supporting the plurality of first electrodes 126 and the plurality of second electrodes 128 and also provide a space in which the liquid crystal layer 136 is sealed. The first substrate 122 and the second substrate 124 are preferred to include a material exhibiting high transmittance to the light from the light-emitting elements 114 in order to transmit the light from the light source 110 to realize the lighting function. Therefore, it is preferable to configure the first substrate 122 and the second substrate 124 to include, for example, glass, quartz, or a polymeric material such as a polyimide, a polycarbonate, a polyester, and an acrylic resin.

(2) First Electrode

The plurality of first electrodes 126 is provided over the first substrate 122 so as to be in contact with the first substrate 122 or through an undercoat (not illustrated) which is an optional component (FIG. 4B). The plurality of first electrodes 126 is arranged to be parallel to one side of the first substrate 122. The undercoat may be formed with one or a plurality of films containing a silicon-containing inorganic compound such as silicon nitride and silicon oxide. It is preferred to form the first electrode 126 with a conductive oxide exhibiting high transmittance to visible light such as indium-tin oxide (ITO) and indium-zinc oxide (IZO) in order to provide a high light-transmitting property to the liquid crystal cells 120.

Figure 5A:
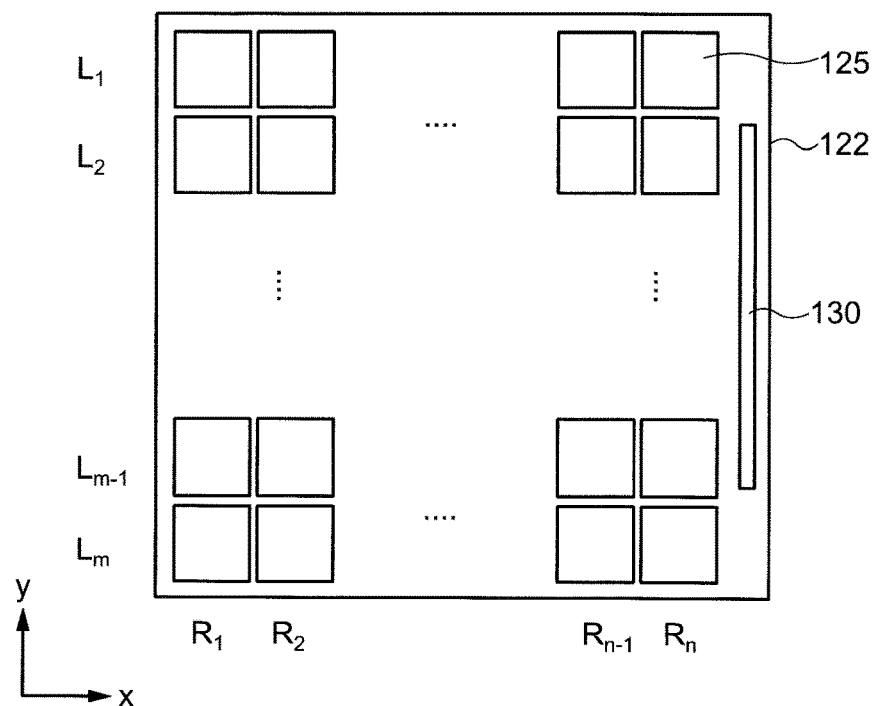
FIG. 5A is a schematic top view of a liquid crystal cell of a lighting device according to an embodiment of the present invention.

In the liquid crystal cell 120, one first electrode group 125 is formed by a plurality of first electrodes 126, and the plurality of first electrode groups 125 is further arranged in a matrix shape with m rows and n columns (FIG. 5A). Thus, each first electrode group 125 overlaps at least one light-emitting element 114, and the number of the plurality of first electrode groups 125 and the number of the depressed portions 112a are identical.

Figure 6:
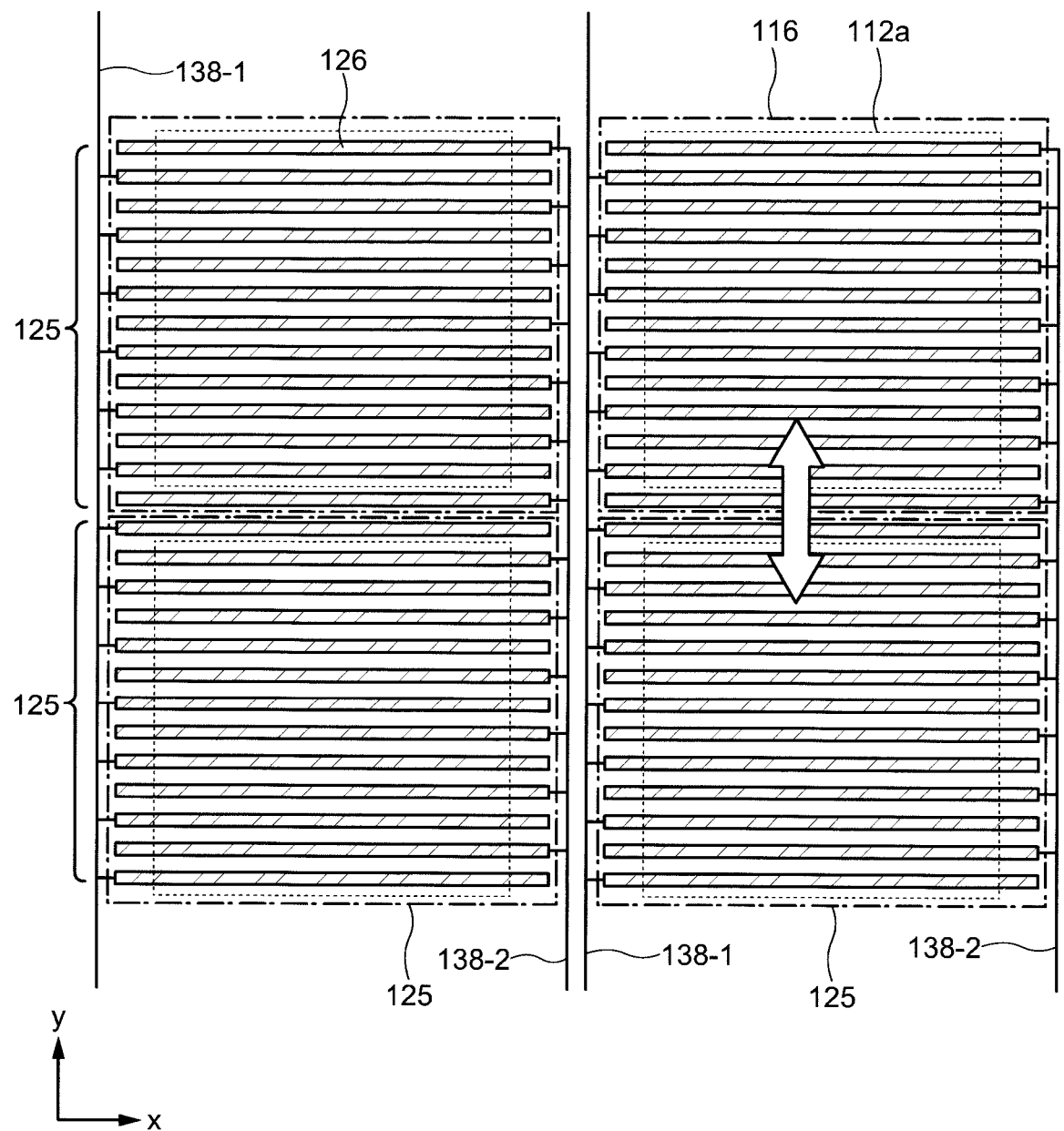
FIG. 6 is a schematic top view of a portion of a liquid crystal cell of a lighting device according to an embodiment of the present invention.

A portion of the plurality of first electrodes 126 is shown in the schematic top view of FIG. 6. In this drawing, four first electrode groups 125 arranged in two rows and two columns are demonstrated. The plurality of first electrodes 126 all extend in the column direction or the row direction. That is, all of the longitudinal directions of the plurality of first electrodes 126 are parallel to each other. In the following explanation, a configuration in which the plurality of first electrodes 126 extends in the row direction (x direction) is described for convenience. In each first electrode group 125, the plurality of first electrodes 126 is arranged in a stripe form. Each first electrode group 125 overlaps one of the plurality of depressed portions 112a, and, therefore, overlaps the illuminated plane 116 of the light output from the corresponding depressed portion 112a. In other words, the depressed portion 112a located in a jth row and a kth column, which is arbitrarily selected from the plurality of depressed portions 112a, overlaps the first electrode group 125 located in the jth row and the kth column, and the light from the light-emitting element 114 arranged in this depressed portion 112a is selectively applied on the first electrode group 125 located in the jth row and the kth column. As a result, the illuminated plane 116 located in the jth row and the kth column overlaps the first electrode group 125 located in the jth row and the kth column. Therefore, it can be said that one first electrode group 125 is constituted by the plurality of first electrodes 126 overlapping one illuminated plane 116. Here, j is a variable selected from a natural number equal to or larger than 1 and equal to or smaller than n, and k is a variable selected from a natural number equal to or larger than 1 and equal to or smaller than m.

Note that although the plurality of first electrodes 126 extends in a stripe shape in the row direction (x direction) in this embodiment, each first electrode 126 may also have a structure bent at one or more locations, while extending in the row direction as a whole. In addition, the extending directions of the first electrodes 126 may also have an angle of approximately 1 to 10° with respect to the x direction.

In each column, the plurality of first electrodes 126 selected every other one (e.g., the odd-numbered first electrodes in the column direction) is connected to a wiring 138-1 and electrically conducts with each other. The remaining first electrodes 126 in each column (e.g., the even-numbered first electrodes in the column direction) are also connected to another wiring 138-2 and electrically conducts with each other. Thus, the plurality of first electrodes 126 can be alternately supplied with different voltages in each column. The wirings 138 are arranged so as not to overlap the depressed portions 112a. That is, each wiring 138 extends between adjacent depressed portions 112a and between adjacent illuminated planes 116. Furthermore, two wirings 138-1 and 138-2 respectively connected to the first electrodes 126 of the adjacent columns extend between the adjacent depressed portions 112a and between these adjacent illuminated planes 116. In other words, two wirings 138-1 and 138-2 respectively connected to the first electrodes 126 of the adjacent columns extend between the adjacent columns. The wirings 138 may be composed of a metal such as aluminum, copper, molybdenum, tantalum, and tungsten and may include the same material as the first electrodes 126.

The length of the first electrode 126 (length in the x direction which is the longitudinal direction) is greater than the length of the depressed portion 112a in the x direction in the xy plane, and therefore, each first electrode 126 straddles the depressed portion 112a. The width of the first electrode 126 (the length in the y direction intersecting the x direction) may be selected from a range, for example, equal to or more than 2 μm and equal to or less than 10 μm, and the distance between the first electrodes 126 adjacent in the column direction may also be selected from a range, for example, equal to or more than 2 μm and equal to or less than 10 μm. As a typical example, the width and the pitch of the first electrode 126 in the column direction may be 5 μm and 10 μm, respectively.

In this embodiment, this configuration allows the plurality of first electrodes 126 selected every other one in the column direction (e.g., the odd-numbered first electrodes 126 in the column direction) to be connected to one of the wiring 138-1 and the wiring 138-2 and the remaining first electrodes 126 (e.g., the even-numbered first electrodes 126 in the column direction) to be connected to the other of the wiring 138-1 and the wiring 138-2 in the plurality of first electrode groups 125 arranged in each column. In addition, these wirings 138 are each connected to a driver circuit 130 described below. As a result, the first electrode groups 125 can be independently driven in each column according to the potentials supplied from the driver circuit 130. Of course, it is also possible to simultaneously drive the first electrode groups 125 in a plurality of columns or all of the columns by connecting the wirings 138 to each other in each column or by applying the same potential thereto. The methods of connecting each of these wirings and applying the potential are described below.

(3) Second Electrode

Figure 5B:
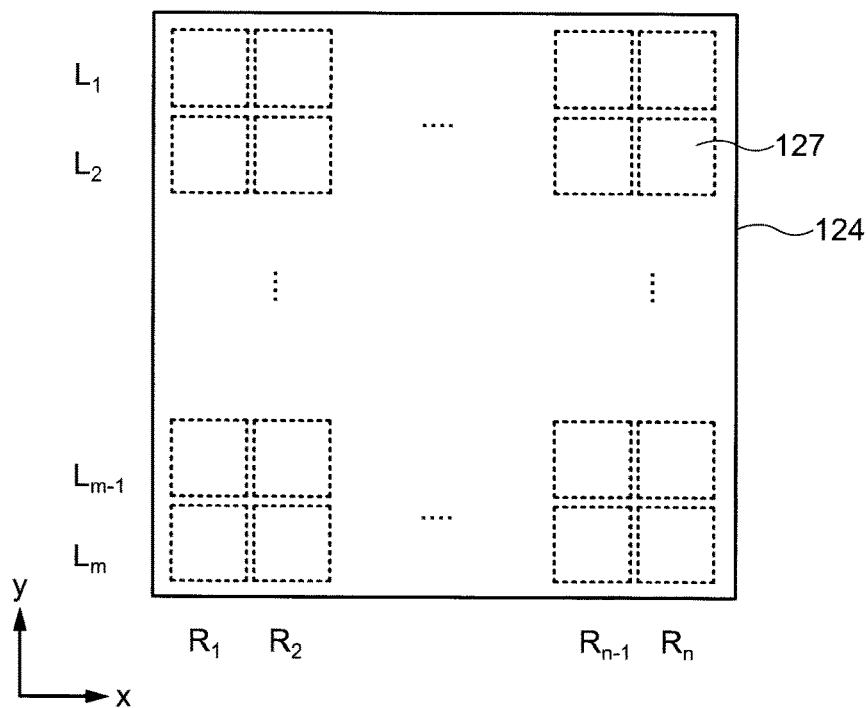
FIG. 5B is a schematic top view of a liquid crystal cell of a lighting device according to an embodiment of the present invention.

The plurality of second electrodes 128 also has the same configuration as the first electrodes 126, but the extending direction thereof is different. Specifically, the plurality of second electrodes 128 is provided over the second substrate 124 so as to be in contact with the second substrate 124 or through an undercoat (not illustrated) which is an optional component (FIG. 4B). The plurality of second electrodes 128 is also arranged to be parallel to one side of the second substrate 124. The first electrodes 126 and the second electrodes 128 are arranged to be sandwiched between the first substrate 122 and the second substrate 124.

plurality of second electrodes 128, and the plurality of second electrode groups 127 is further arranged in a matrix shape with m rows and n columns (FIG. 5B). Thus, each second electrode group 127 overlaps at least one light-emitting element 114, and the number of the plurality of second electrode groups 127 and the number of the plurality of depressed portions 112a are the same as each other.

Figure 7:
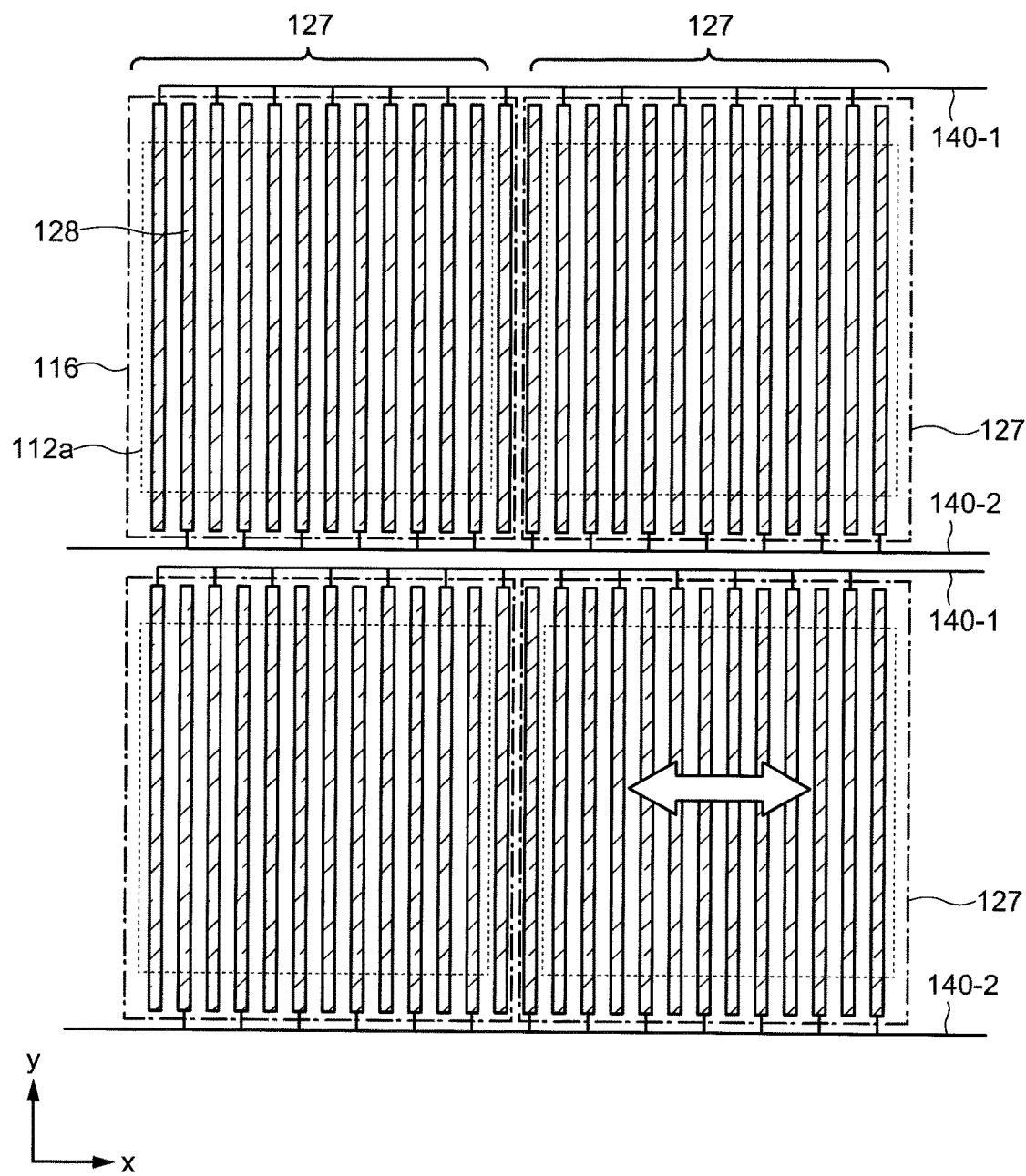
FIG. 7 is a schematic top view of a portion of a liquid crystal cell of a lighting device according to an embodiment of the present invention.

A portion of the plurality of second electrodes 128 is shown in a schematic top view of FIG. 7. In this drawing, four second electrode groups 127 arranged in two rows and two columns are demonstrated. The plurality of second electrodes 128 each extends in the column direction (y direction). That is, all of the longitudinal directions of the plurality of second electrodes 128 are parallel to each other and orthogonal to the longitudinal directions of the plurality of first electrodes 126. In each second electrode group 127, the plurality of second electrodes 128 is arranged in a stripe shape. Each second electrode group 127 overlaps one of the plurality of depressed portions 112a and thus overlaps the corresponding illuminated plane 116. In other words, the depressed portion 112a in the jth row and the kth column, which is arbitrarily selected from the plurality of depressed portions 112a, overlaps the second electrode group 127 located in the jth row and the kth column, and the light from the light-emitting element 114 located in this depressed portion 112a is applied to the second electrode group 127 located in the jth row and the kth column through the first electrodes 126 and the liquid crystal layer 136. As a result, the illuminated plane 116 located in the jth row and the kth column overlaps the second electrode group 127 located in the jth row and the kth column. Therefore, it can be said that one second electrode group 127 is constructed by the plurality of second electrodes 128 overlapping one illuminated plane 116.

Note that, although the plurality of second electrodes 128 extends in a stripe shape in the column direction (y direction) in this embodiment, each second electrode 128 may also have a structure bent at one or a plurality of locations, while extending in the column direction as a whole. Moreover, the extending direction of the second electrode 128 may also have an angle of 1 to 10° with respect to the y direction.

In each row, the plurality of second electrodes 128 selected every other one (e.g., the odd-numbered second electrodes in the row direction) is connected to a wiring 140-1 and electrically conducts with each other. The remaining second electrodes 128 in each row (e.g., the even-numbered second electrodes 128 in the row direction) are also connected to another wiring 140-2 and electrically conduct with each other. Thus, in each row, the plurality of second electrodes 128 can be alternately supplied with different voltages. Similar to the wirings 138, the wirings 140 are also arranged so as not to overlap the depressed portions 112a. That is, each wiring 140 extends between adjacent depressed portions 112a and between adjacent illuminated planes 116. Furthermore, two wirings 140-1 and 140-2 respectively connected to the second electrodes 128 in the adjacent rows extend between the adjacent depressed portions 112a and between the adjacent illuminated planes 116. In other words, two wirings 140-1 and 140-2 respectively connected to the second electrodes 128 in the adjacent rows extend between the adjacent rows.

The length of the second electrode 128 (length in the y direction which is the longitudinal direction) is also larger than the length of the depressed portion 112a in they direction of the xy plane, and therefore, each second electrode 128 also straddles the depressed portion 112a. The width of the second electrode 128 (length in the x direction intersecting the y direction) is also selected from a range, for example, equal to or more than 2 μm and equal to or less than 10 μm, and the distance between the second electrodes 128 adjacent in the row direction may also be selected from a range, for example, equal to or more than 2 μm and equal to or less than 10 μm. As a typical example, the width and the pitch of the second electrodes 128 in the x direction may be 5 μm and 10 μm, respectively.

In this embodiment, this configuration allows the second electrodes 128 selected every other one in the row direction (e.g., the odd-numbered second electrodes 128 in the row direction) to be connected to one of the wiring 140-1 and the wiring 140-2 and the remaining second electrodes 128 (e.g., the even-numbered second electrodes 128 in the row direction) to be connected to the other of the wiring 140-1 and the wiring 140-2 in the plurality of second electrode groups 127 arranged in each row. In addition, these wirings 140 are each connected to the driver circuit 130 described below. With this structure, the second electrode groups 125 can be independently driven in each row according to the potential supplied from the driver circuit 130. Of course, it is also possible to simultaneously drive the second electrode groups 127 in the plurality of rows or all of the rows by connecting the wirings 140 to each other in each row or by applying the same potential thereto. The methods of connecting each of these wirings and applying the potential are described below.

As described above, the first liquid crystal cell 120-1 has the first electrode groups 125 arranged in a matrix shape with m rows and n columns on the first substrate 122 side as well as the second electrode groups 127 arranged in a matrix shape with m rows and n columns on the second substrate 124 side. The first electrode groups 125 can be independently driven column-by-column on the first substrate 122 side, while the second electrode groups 127 can be independently driven row-by-row on the second substrate 123 side. This individual driving method is described later.

The first liquid crystal cell 120-1 and the second liquid crystal cell 120-2 are arranged so that the longitudinal directions of the first electrodes 126 thereof are parallel to each other. In this case, the longitudinal directions of the second electrodes 128 in the first liquid crystal cell 120-1 and the second liquid crystal cell 120-2 are also parallel to each other, and the directions in which the first orientation films 132 orient the liquid crystal molecules (hereinafter, referred to as orientation directions) are also parallel to each other. In this case, a configuration in which the first electrodes 126 thereof overlap each other may also be employed. Conversely, the first liquid crystal cell 120-1 and the second liquid crystal cell 120-2 may be arranged so that the longitudinal directions of the first electrodes 126 thereof are perpendicular to each other. In this case, the longitudinal directions of the second electrodes 128 are also perpendicular to each other, and the orientation directions of the first orientation films 132 are also perpendicular to each other between the first liquid crystal cell 120-1 and the second liquid crystal cell 120-2.

(4) First Orientation Film, Second Orientation Film, and Liquid Crystal Layer

The first orientation film 132 is provided over the plurality of first electrodes 126, while the second orientation film 134 is provided over the plurality of second electrodes 128 (under the second electrodes 128 in FIG. 4B). The first substrate 122 and the second substrate 124 are bonded and fixed with a sealing material 118. The space formed by the first substrate 122, the second substrate 124, and the sealing material 118 is filled with the liquid crystal layer 136.

The first orientation film 132 and the second orientation film 134 contain a polymer such as a polyimide and a polyester, and their surfaces are subjected to a rubbing treatment. The rubbing treatment is performed so that the orientation direction of the first orientation film 132 is perpendicular to the direction in which the first electrodes 126 extend (see the arrow in FIG. 6) and the orientation direction of the second orientation film 134 is perpendicular to the direction in which the second electrodes 128 extend (see the arrow in FIG. 7). Therefore, the orientation direction of the first orientation film 132 and the orientation direction of the second orientation film 134 are orthogonal. Here, the orientation direction is the direction of the long axis of the liquid crystal molecules when they are oriented under the influence of the orientation film. Instead of the rubbing treatment, the orientation directions of the first orientation film 132 and the second orientation film 134 may be produced by photo-orientation. The photo-orientation is a rubbing-less orientation treatment using light, and polarized light in the ultraviolet region is applied to orientation films which have not been subjected to the rubbing treatment from a predetermined direction, for example. This causes a photoreaction in the orientation films, thereby introducing anisotropy to their surface to provide the ability to control liquid crystal orientation.

The liquid crystal layer 136 contains liquid crystal molecules. The structure of the liquid crystal molecules is not limited. Thus, the liquid crystal molecules may be nematic liquid crystal, smectic liquid crystal, cholesteric liquid crystal, or chiral smectic liquid crystal.

The thickness d of the liquid crystal layer 136 (see FIG. 4B), i.e., the distance between the first orientation film 132 and the second orientation film 134, is also arbitrarily determined, but is preferred to be greater than the pitch of the first electrodes 126 or the second electrodes 128. For example, the thickness of the liquid crystal layer 136 may be preferably set to be equal to or more than 2 times and equal to or less than 10 times, equal to or more than 2 times and equal to or less than 5 times, or equal to or more than 2 times and equal to or less than 3 times the pitch of the first electrodes 126 or the second electrodes 128. A specific thickness of the liquid crystal layer 136 may be selected from a range, for example, equal to or more than 20 μm and equal to or less than 60 μm or equal to or more than 20 μm and equal to or less than 50 μm. Although not illustrated, spacers may be provided in the liquid crystal layer 136 to maintain this thickness throughout the lighting device 100. Note that, if the thickness of the liquid crystal layer 136 described above is employed in a liquid crystal display device, the high responsiveness required for displaying moving images cannot be obtained, and it is difficult to realize the functions as a liquid crystal display device.

(5) Other Components

The driver circuit 130 is provided over the first substrate 122 to generate signals for illumination and supply them to the first electrodes 126 and the second electrodes 128 (FIG. 4A and FIG. 5A). The driver circuit 130 may be fabricated over the first substrate 122 by appropriately combining a variety of patterned conductive films, semiconductor films, and insulating films or by mounting an IC chip with an integrated circuit formed over a semiconductor substrate over the first substrate 122. Alternatively, the driver circuit 130 may not be provided over the first substrate 122, but an IC chip may be provided as the driver circuit 130 over a connector such as a flexible printed circuit board (FPC) connected to the wirings 138 and 140 extending from the first electrodes 126 and the second electrodes 128.

2. Operation Principle

As described above, the light emitted from the light-emitting element 114 provided in each depressed portion 112a of the reflective plate 112 is selectively applied to one first electrode group 125, passes through the liquid crystal layer 136, and is further applied to one second electrode group 127. In addition, each first electrode group 125 and each second electrode group 127 are respectively provided with the plurality of first electrodes 126 and the plurality of second electrodes 128 arranged in a stripe shape. Therefore, the liquid crystal layer 136 functions as a sort of liquid crystal lens by controlling the voltages applied to the plurality of first electrodes 126 and the plurality of second electrodes 128 respectively included in each first electrode group 125 and each second electrode group 127. As a result, since the spread of the light output from each depressed portion 112a can be individually controlled, the illuminated region of the light extracted from the light source 110 through the two liquid crystal cells 120 can be controlled in a diverse and arbitrary manner. Hereinafter, the operation principle and driving method of the lighting device 100 are explained. Here, the "illuminated region" refers to as a region where the light is applied onto an object when the lighting device 100 is driven. However, the illuminated region varies depending on the angle between the travelling direction of the light and the surface on the object and the distance between the lighting device 100 and the object. Therefore, the "illuminated region" is defined as a region where the light from the lighting device 100 is applied on a plane perpendicular to the normal line of the main surface of the second substrate 124 of the liquid crystal cell 120.

2-1. Non-Driving State

Figure 8A:
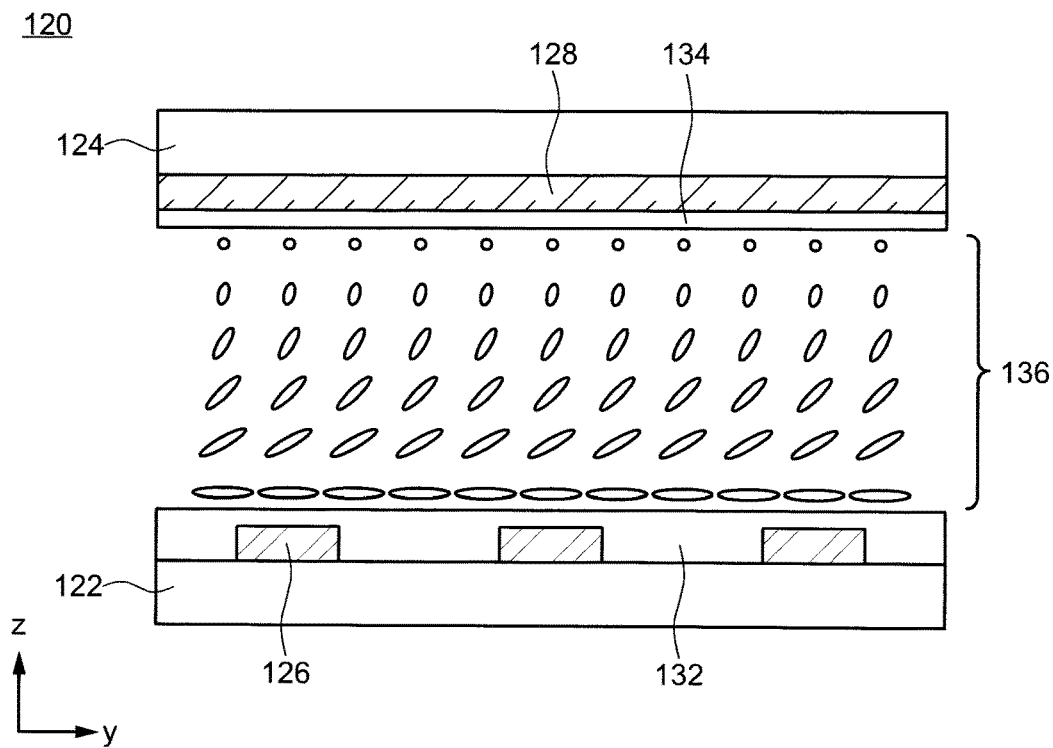
FIG. 8A is a schematic cross-sectional view of a portion of a liquid crystal cell of a lighting device according to an embodiment of the present invention.
Figure 8B:
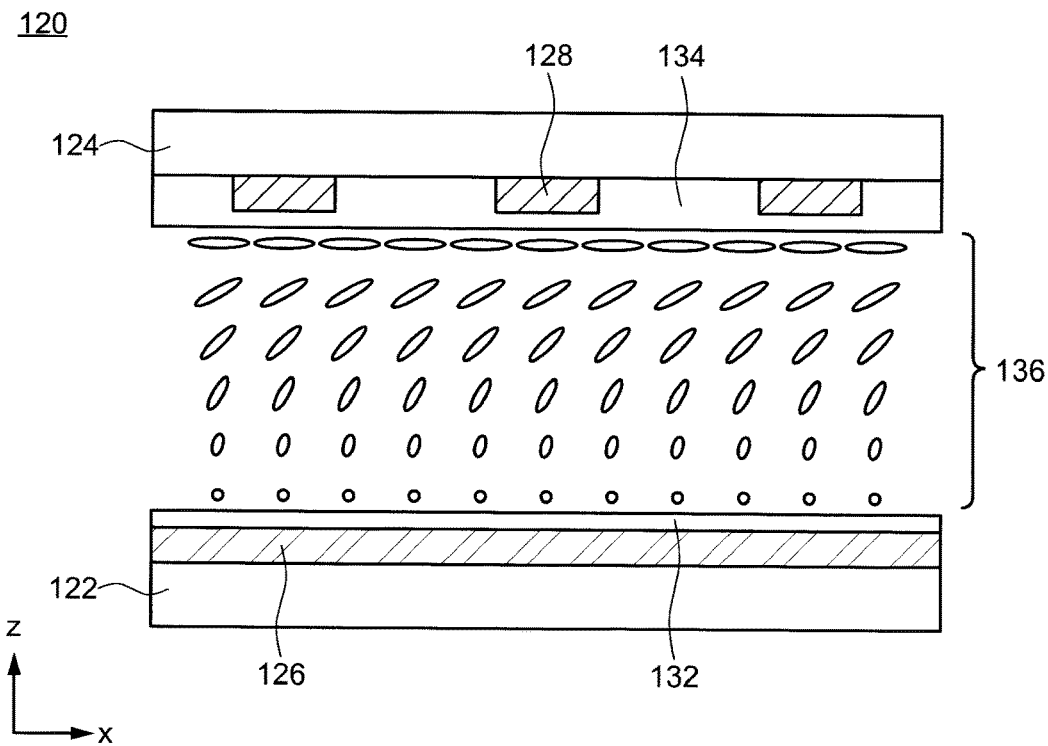
FIG. 8B is a schematic cross-sectional view of a portion of a liquid crystal cell of a lighting device according to an embodiment of the present invention.

FIG. 8A and FIG. 8B show schematic views of the cross section of the liquid crystal cell 120 in a non-driving state. FIG. 8A is a schematic view observed from the row direction (x direction), while FIG. 8B is a schematic view observed from the column direction (y direction). In FIG. 8A and FIG. 8B, the liquid crystal molecules are schematically depicted as ellipses.

As described above, the orientation directions of the first orientation film 132 and the second orientation film 134 are respectively orthogonal to the directions in which the plurality of first electrodes 126 and the plurality of second electrodes 128 extend. Therefore, when the liquid crystal cells 120 are not driven, that is, when no voltage is applied to the plurality of first electrodes 126 and the plurality of second electrodes 128, the orientation of the liquid crystal molecules is not affected by the electric field and is determined by the orientation directions. As a result, at the vicinity of the first electrodes 126, the liquid crystal molecules are oriented with their longitudinal axes along the direction (y direction) perpendicular to the direction (x direction) in which the first electrodes 126 extend. On the other hand, at the vicinity of the second electrodes 128, the liquid crystal molecules are oriented with their longitudinal axes along the direction (x direction) perpendicular to the direction (y direction) in which the second electrodes 128 extend. Therefore, the orientation direction of the liquid crystal molecules rotates about the z direction as a center axis when it approaches the second substrate 124 from the first substrate 122 and is twisted by 90°.

2-2. Driving State

In the driving state, a pulsed alternating voltage (alternating square wave) is applied to the plurality of first electrodes 126 of either one or both of the first liquid crystal cell 120-1 and the second liquid crystal cell 120-2 so that the phase is inverted between adjacent first electrodes 126. Similarly, a pulsed alternating voltage (alternating square wave) is applied to the plurality of second electrodes 128 of either one or both of the first liquid crystal cell 120-1 and the second liquid crystal cell 120-2 so that the phase is inverted between adjacent second electrodes 128. In each liquid crystal cell 120, the frequency of the alternating voltages is the same. The alternating voltage may be selected from a range equal to or more than 5 V and equal to or less than 50 V or equal to or more than 5 V and equal to or less than 30 V, for example. The application of the alternating voltage generates an electric field (transverse electric field) between adjacent first electrodes 126 and adjacent second electrodes 128 as respectively shown by the arrows in FIG. 9A and FIG. 9B. Meanwhile, an electric field (vertical electric field) is also generated between the first electrodes 126 and the second electrodes 128. However, as described above, the thickness d of the liquid crystal layer 136 is larger than the distance between adjacent first electrodes 126 and between adjacent second electrodes 128. Therefore, the vertical electric field is significantly smaller than the transverse electric field, and each liquid crystal molecule is oriented according to the transverse electric field.

Figure 9A:
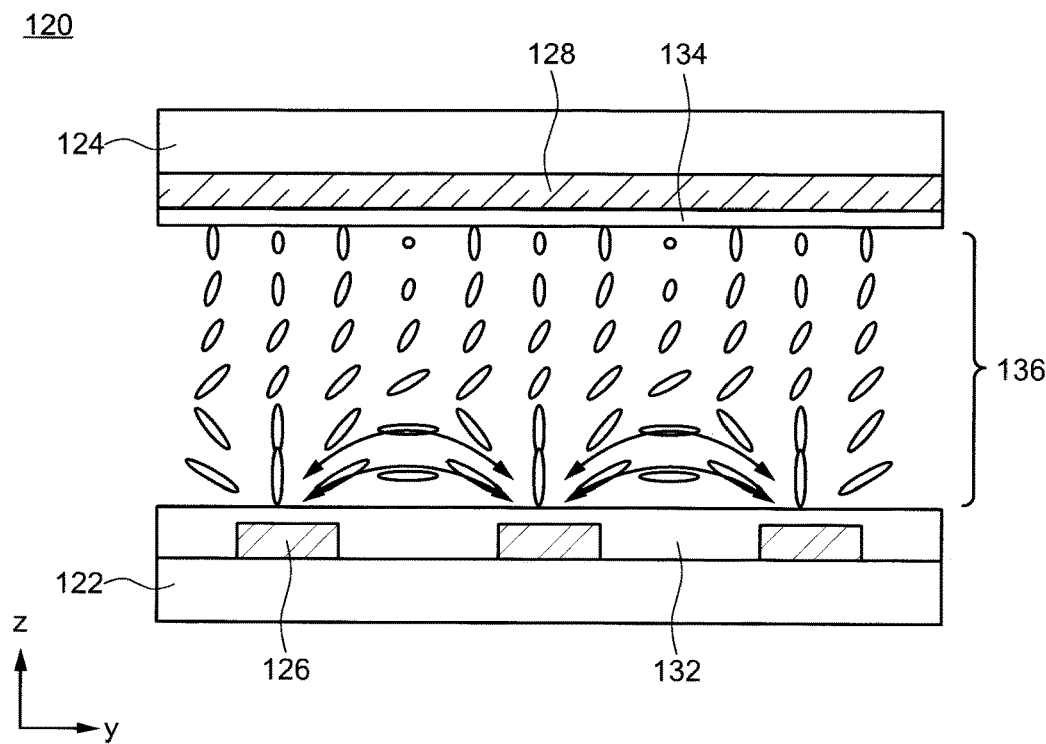
FIG. 9A is a schematic cross-sectional view of a portion of a liquid crystal cell of a lighting device according to an embodiment of the present invention.
Figure 9B:
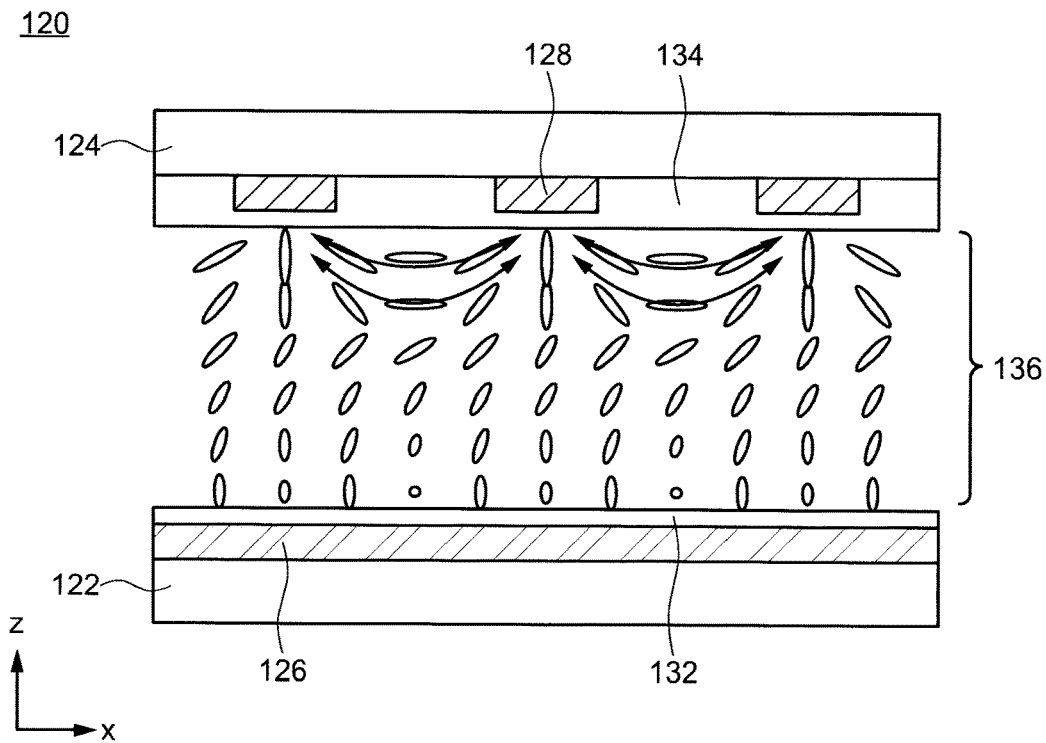
FIG. 9B is a schematic cross-sectional view of a portion of a liquid crystal cell of a lighting device according to an embodiment of the present invention.

When the transverse electric field is generated in the liquid crystal layer 136, the liquid crystal molecules located approximately midway between the adjacent first electrodes 126 maintain their initial orientation state on the first substrate 122 side, because the direction of the transverse electric field is almost parallel to the first substrate 122. However, since the direction of the electric field tilts in the z direction when it approaches the first electrodes 126, the liquid crystal molecules also tilt in the z direction and their angle (tilt angle) increases. As a result, the liquid crystal molecules in the liquid crystal layer 136 on the first substrate 122 side are oriented in an upward convex arc (FIG. 9A). The same is applied to the second substrate 124 side. The liquid crystal molecules located approximately midway between the adjacent second electrodes 128 maintain their initial orientation state because the direction of the transverse electric field is approximately parallel to the second substrate 124. However, since the direction of the electric field tilts in the z direction as it approaches the second electrodes 128, the liquid crystal molecules also tilt in the z direction and their angle (tilt angle) increases. Accordingly, the liquid crystal molecules in the liquid crystal layer 136 on the second substrate 124 side are oriented in a downward convex arc (FIG. 9B).

Figure 10:
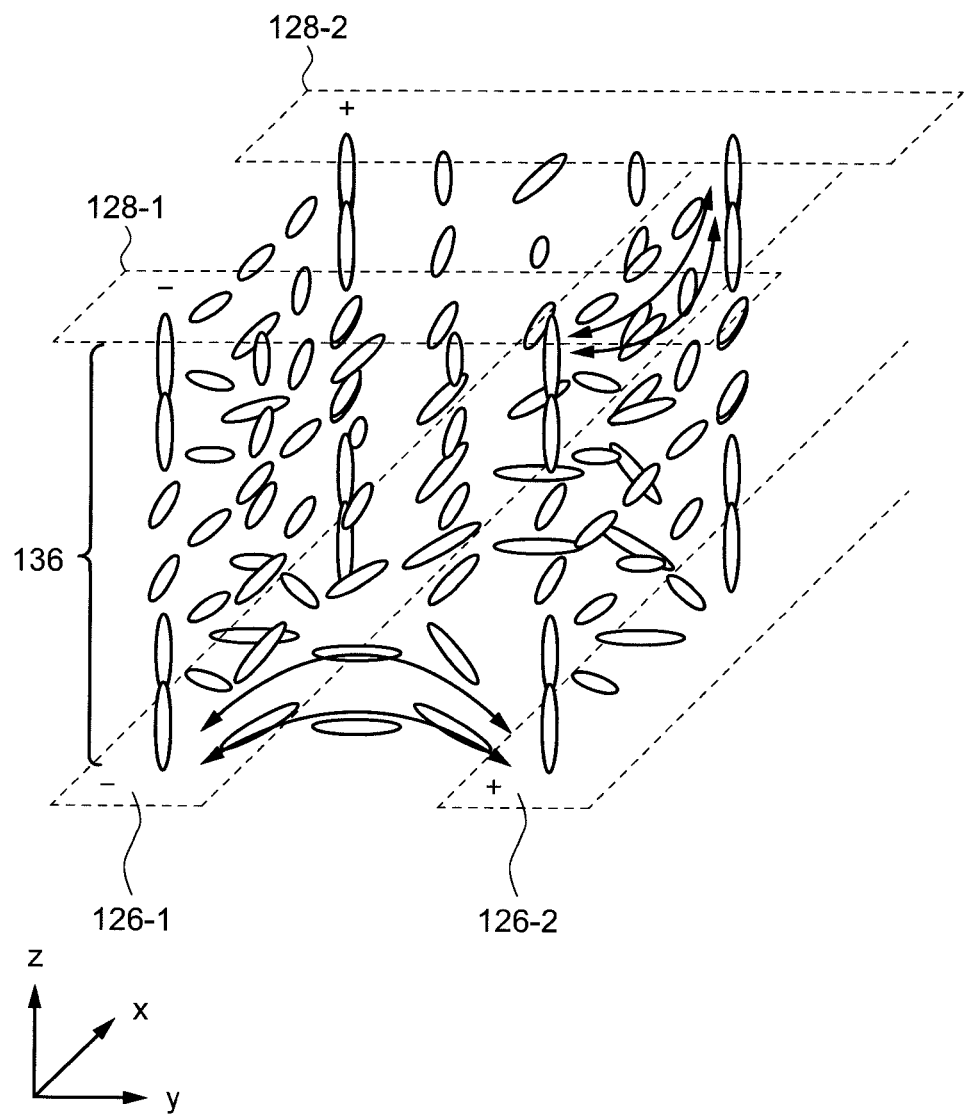
FIG. 10 is a schematic perspective view for explaining an operation principle of a liquid crystal cell of a lighting device according to an embodiment of the present invention.
Figure 11:
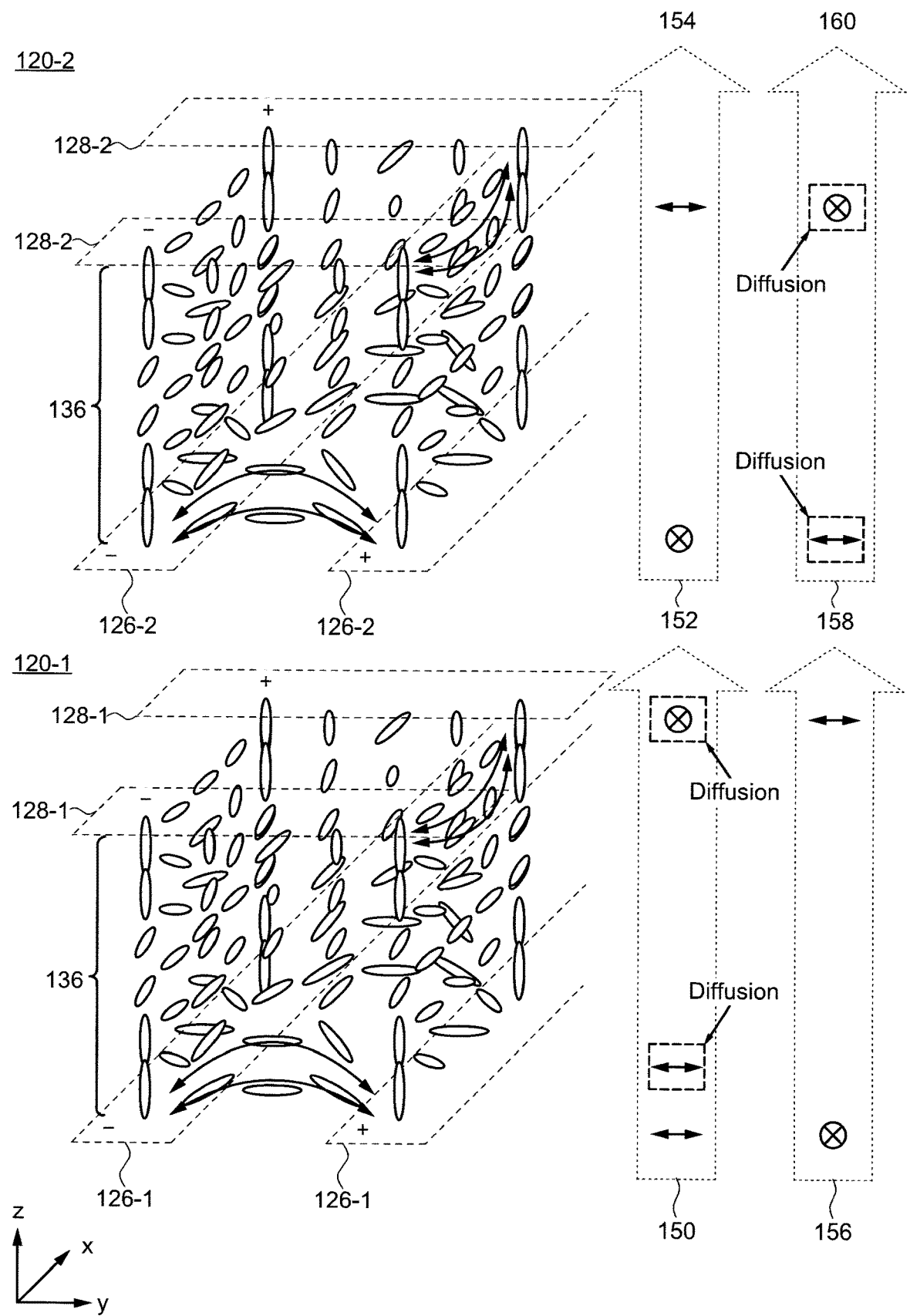
FIG. 11 is a schematic perspective view for explaining an operation principle of a liquid crystal cell of a lighting device according to an embodiment of the present invention.

Due to the orientation change of the liquid crystal molecules, the light incident on the liquid crystal layer 136 diffuses according to the refractive index distribution of the arc-oriented liquid crystal molecules on the first substrate side 122 and further diffuses according to the refractive index distribution of the arc-oriented liquid crystal molecules on the second substrate 124 side. As a result, the liquid crystal cell 120 functions as a lens diffusing light. This light diffusion mechanism is explained in detail using FIG. 10 and FIG. 11. FIG. 10 is a schematic perspective view showing the orientation of the liquid crystal molecules shown in FIG. 9A and FIG. 9B, and FIG. 11 is a schematic view showing the behavior of the light passing through the two liquid crystal cells 120. The following explanation uses, as a model, an example in which the extending directions of the first electrodes 126 are parallel to each other and the extending directions of the second electrodes 128 extends are also parallel to each other between the two liquid crystal cells 120.

As described above, when a pulsed alternating voltage is applied to the plurality of first electrodes 126 so that the phase is inverted between adjacent first electrodes 126 and to the plurality of second electrodes 128 so that the phase is inverted between adjacent second electrodes 128, the transverse electric fields orthogonal to each other are generated on the first electrode 126 side and the second electrode 128 side as shown in FIG. 10. As a result, the liquid crystal molecules in the liquid crystal layer 138 are oriented convexly upward between the adjacent first electrodes 126 on the first substrate 122 side and convexly downward between the adjacent second electrodes 128 on the second substrate 124 side. Furthermore, the orientation of the liquid crystal molecules is twisted by 90° as it approaches from the first electrode 126 to the second electrode 128.

As shown in FIG. 11, the light emitted from the light source 110 first enters the first liquid crystal cell 120-1. This light has a polarization component 150 in the y direction (straight arrow in the drawing) and a polarization component 156 in the x direction (circled symbol with a cross in the drawing). Hereafter, the y directional and x-directional polarization components of the light before entering the liquid crystal cell 120 are respectively referred to as S and P components for convenience, and these terms will be used regardless of the change in polarization axis.

Since the liquid crystal molecules are oriented along the y direction on the first electrode 126 side, the liquid crystal layer 136 has a refractive index distribution in the y direction. Therefore, the S component 150 incident on the liquid crystal layer 136 diffuses in the y direction due to the refractive index distribution in the y direction on the first electrode 126 side. When passing through the liquid crystal layer 136, this light is optically rotated by the twist of the orientation of the liquid crystal molecules, and the polarization axis thereof changes to the x direction. Since the liquid crystal layer 136 has a refractive index distribution in the x direction on the second electrode 128 side, this light is further diffused in the x direction. As a result, when the S component 150 passes through the liquid crystal layer 136 of the first liquid crystal cell 120-1, this component becomes a S component 152 diffused in the x direction and the y direction.

On the other hand, the refractive index distribution exists in the y direction on the first electrode 126 side. Therefore, the P component 156 incident on the first liquid crystal cell 120-1 is not affected by the refractive index distribution but is optically rotated by the twist of the orientation of the liquid crystal molecules without being diffused so that the polarization axis is changed to the y direction. In addition, since the refractive index distribution on the second electrode 128 side exists in the x direction, the P component 156 whose polarization axis has been changed to the y direction is not affected by the refractive index distribution. As a result, the P component 156 is optically rotated but is not diffused so as to become a P component 158 when passing through the liquid crystal layer 136 of the first liquid crystal cell 120-1.

Next, the light which has passed through the first liquid crystal cell 120-1 is considered. As described above, the longitudinal directions of the first electrodes 126 are parallel to each other and the longitudinal directions of the second electrodes 128 are also parallel to each other between the first liquid crystal cell 120-1 and the second liquid crystal cell 120-2 in this model. Therefore, in the liquid crystal layer 136 of the second liquid crystal cell 120-2, there is a refractive index distribution in the y direction on the first electrode 126 side and a refractive index distribution in the x direction on the second electrode 128 side.

As described above, the S component 150 becomes the S component 152 diffused in the x direction and the y direction when passing through the first liquid crystal cell 120-1. This S component 152 does not diffuse on the first electrode 126 side of the second liquid crystal cell 120-2 because its polarization axis is orthogonal to the direction of the refractive index distribution. The S component 152 is optically rotated according to the twist of the orientation of the liquid crystal molecules, and its polarization axis is changed to the y direction when passing through the liquid crystal layer 136. However, since the refractive index distribution is in the x direction on the second electrode 128 side, this component is not affected by the refractive index distribution. As a result, although the S component 152 is optically rotated by the second liquid crystal cell 120-2, it does not diffuse to become a S component 154. In summary, the S component 150 emitted from the light source 110 is optically rotated by the first liquid crystal cell 120-1 while being diffused in the x direction and the y direction so as to become the S component 152, and is then optically rotated by the second liquid crystal cell 120-2 without being diffused to eventually become a S component 154 diffused in the x direction and they direction.

On the other hand, the P component 158 incident on the liquid crystal layer 136 of the second liquid crystal cell 120-2 diffuses in the y direction according to the refractive index distribution in the y direction on the first electrode 126 side. This light is optically rotated by the twist of the orientation of the liquid crystal molecules so that its polarization axis is changed to the x direction when passing through the liquid crystal layer 136. The light is then diffused in the x direction because the liquid crystal layer 136 has the refractive index distribution in the x direction on the second electrode 128 side. As a result, the P component 158 is optically rotated and is simultaneously diffused in the x direction and the y direction to become a P component 160 when passing through the second liquid crystal cell 120-2. In summary, the P component 156 emitted from the light source 110 is optically rotated by the first liquid crystal cell 120-1 without being diffused, and is then optically rotated by the second liquid crystal cell 120-2 while being diffused in the x direction and the y direction to eventually become a P component 160 diffused in the x direction and they direction.

Since the degree of orientation of the liquid crystal molecules can be controlled by the voltages applied to the first electrodes 126 and the second electrodes 128, the degree of light diffusion can also be controlled by the voltages applied to the first electrodes 126 and the second electrodes and 128. Therefore, in accordance with the mechanism described above, the degree of the diffusion of the light applied onto each first electrode group 125 and each second electrode group 127 can be independently controlled by the voltages applied to the first electrodes 126 and second electrodes 128.

Note that the light diffusion is controlled by the transverse electric fields generated between adjacent first electrodes 126 and between adjacent second electrodes 128. Therefore, the light diffusion can be performed as long as a potential difference is provided between adjacent first electrodes 126 and/or between adjacent second electrodes 128 in each liquid crystal cell 120. Hence, a constant voltage may be applied to the plurality of first electrodes 126 so that the voltage is different between the adjacent first electrodes 126, or an alternating voltage may be provided to the plurality of first electrodes 126 selected every other one while providing a constant voltage to the remaining first electrodes 126. The same is applied to the second electrodes 128.

3. Light Distribution Control

Figure 12:
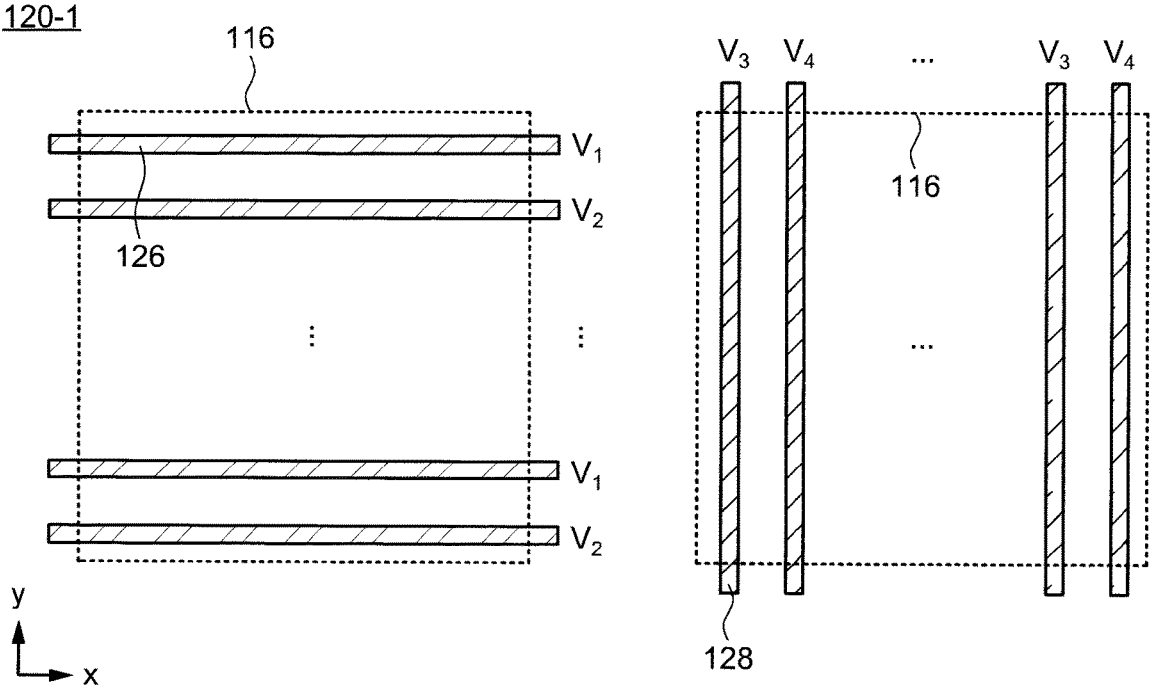
FIG. 12 is a schematic top view of a portion of a liquid crystal cell of a lighting device according to an embodiment of the present invention.
Figure 12:
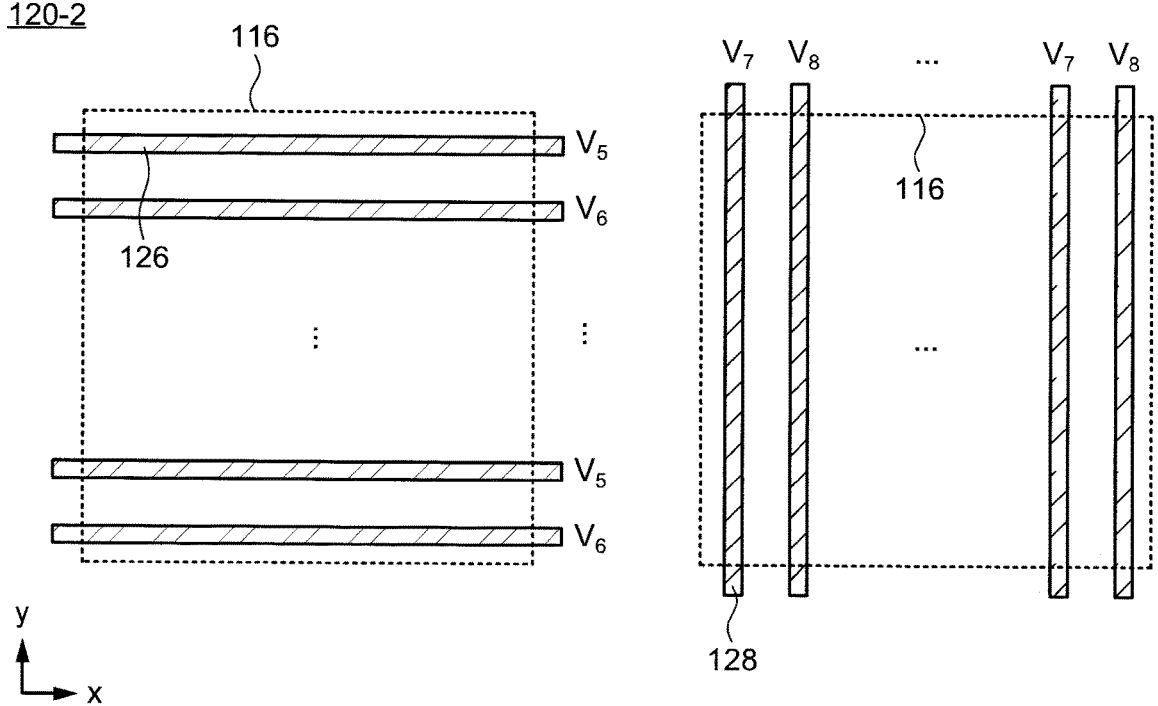

By using the mechanism described above, the illuminated region of the light source 110 can be arbitrarily controlled. This feature is explained below. In the following explanation, it is assumed that, as shown in FIG. 12, an alternating voltage $V_1$ is applied to the plurality of first electrodes 126 selected every other one, while an alternating voltage $V_2$ is applied to the remaining first electrodes 126 in the first liquid crystal cell 120-1. In addition, it is assumed that an alternating voltage $V_3$ is applied to the plurality of second electrodes 128 selected every other one, while an alternating voltage $V_4$ is applied to the remaining second electrodes 128 in the first liquid crystal cell 120-1. In the second liquid crystal cell 120-2, it is assumed that an alternating voltage $V_5$ is applied to the plurality of first electrodes 126 selected every other one, while an alternating voltage $V_6$ is applied to the remaining first electrodes 126. In addition, it is assumed that an alternating voltage $V_7$ is applied to the selected second electrodes 128 selected every other one, while an alternating voltage $V_8$ is applied to the remaining second electrodes 128 in the second liquid crystal cell 120-2. In this model, the first electrodes 126 are parallel to each other, and the second electrodes 128 are also parallel to each other between the two liquid crystal cells 120.

3-1. Non-Driving State of Liquid Crystal Cells

Figure 13A:
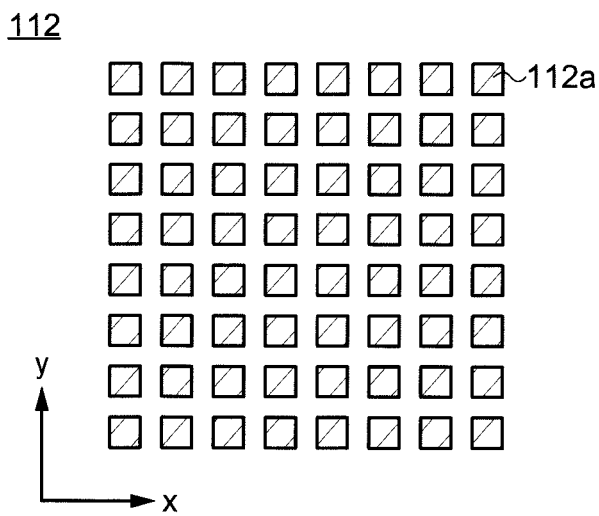
FIG. 13A is a schematic top view of a light source of a lighting device according to an embodiment of the present invention.
Figure 13B:
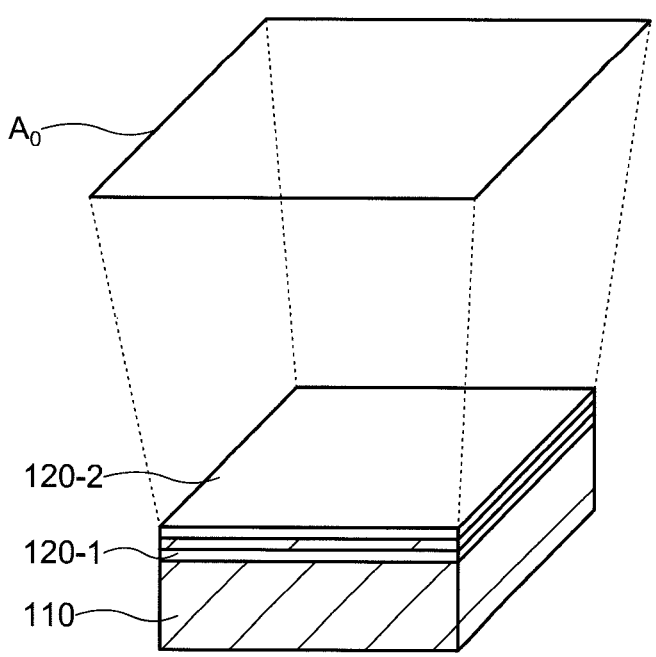
FIG. 13B is a schematic perspective view of a lighting device according to an embodiment of the present invention.

When the liquid crystal cells 120 are in a non-driving state, no electric field is generated between the first electrodes 126 and between the second electrodes 128. Therefore, since there is no refractive index distribution in the liquid crystal layer 136, the S component 150 and the P component 152 do not experience any diffusion effect, although they are optically rotated by each liquid crystal cell 120. Thus, when all of the light-emitting elements 114 provided in the plurality of depressed portions 112a are turned on as shown in FIG. 13A, for example, the light does not greatly spread when passing through the two liquid crystal cells 120, and only reflects the diffusion of the light output from each depressed portion 112a. As a result, in the xy plane, the illuminated region $A_0$ of the light source 110 is almost similar to the shape of the light source 110 in the xy plane (FIG. 13B).

Figure 14A:
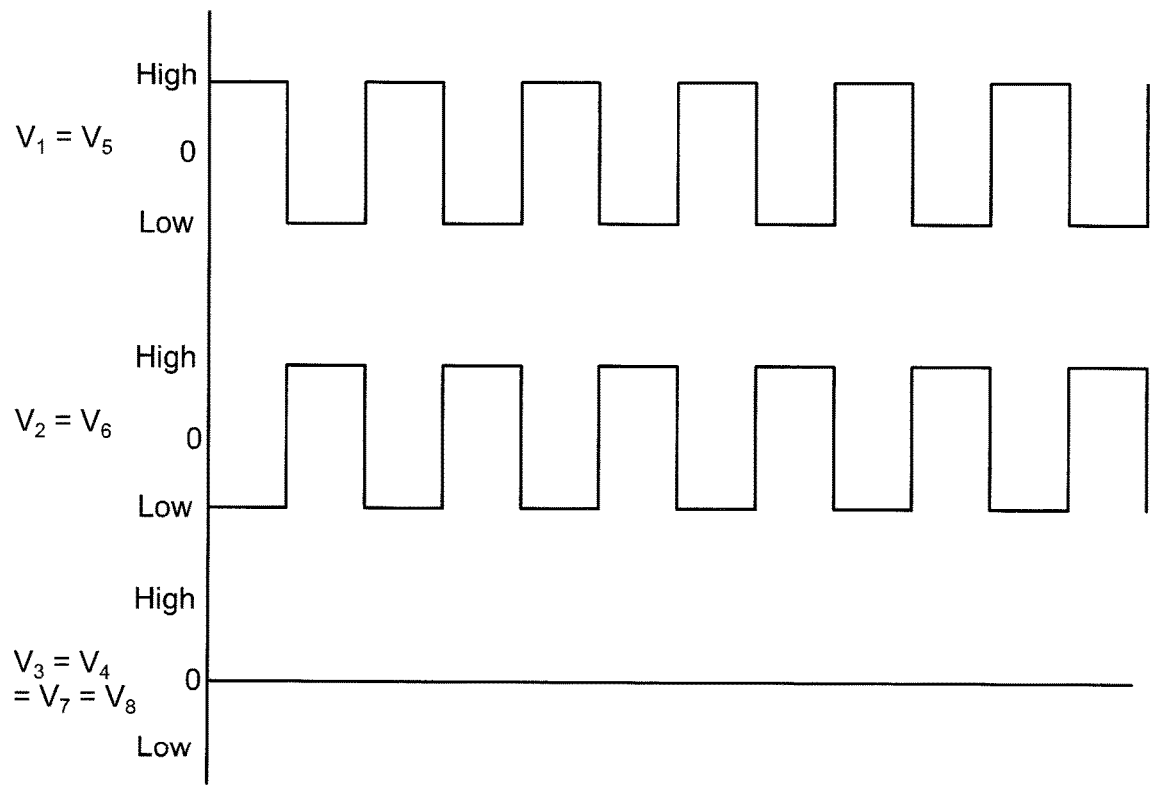
FIG. 14A is a timing chart of a lighting device according to an embodiment of the present invention.

3-2. Driving State of Liquid Crystal Cells (1) Selective Diffusion in y Direction As an example, a case where the liquid crystal cells 120 are driven according to the timing chart in FIG. 14A is considered. Here, in each of the first liquid crystal cell 120-1 and the second liquid crystal cell 120-2, an alternating voltage is applied to the plurality of first electrodes 126 so that the phase is inverted between adjacent first electrodes 126, and a constant voltage or no voltage is applied to the plurality of second electrodes 128. The constant voltage may be 0 V or an intermediate potential relative to the aforementioned alternating voltage.

When the liquid crystal cells 120 are driven in this manner, the S component 150 of the light from the light source 110 diffuses in the y direction while its polarization axis is changed to the x direction by the liquid crystal layer 136 in the first liquid crystal cell 120-1 as can be understood from FIG. 11. Since there is no electric field between the second electrodes 128, this light is emitted from the first liquid crystal cell 120-1 without being diffused on the second electrode 128 side to become the S component 152 diffused in the y direction. This S component 152 is not affected by the refractive index distribution when it enters the second liquid crystal cell 120-2 because the refractive index distribution caused by the transverse electric field generated between the first electrodes 126 of the second liquid crystal cell 120-2 is in the y direction. In addition, since there is no electric field between the second electrodes 128, this S component 152 is optically rotated without being diffused. In summary, the S component 150 becomes the S component 154 diffused in the y direction when passing through the two liquid crystal cells 120.

On the other hand, the P component 156 of the light from the light source 110 is not affected by the refractive index distribution because the transverse electric field is in the y direction on the first electrode 126 side of the first liquid crystal cell 120-1. Furthermore, since there is no electric field between the second electrodes 128, there is no refractive index distribution on the second electrode 128 side. Therefore, the P component 156 is not diffused but is optically rotated according to the twist of the orientation of the liquid crystal molecules in the liquid crystal layer 136 to become the P component 158. When this P component 158 enters the second liquid crystal cell 120-2, this component is diffused in the y direction by the refractive index distribution in the y direction on the first electrode 126 side, while the polarization axis is changed to the x direction by the liquid crystal layer 136. This light is emitted from the second liquid crystal cell 120-2 without being diffused on the second electrode 128 side because there is no electric field between the second electrodes 128. In summary, the P component 156 becomes the P component 160 diffused in the y direction when passing through the two liquid crystal cells 120.

Figure 14B:
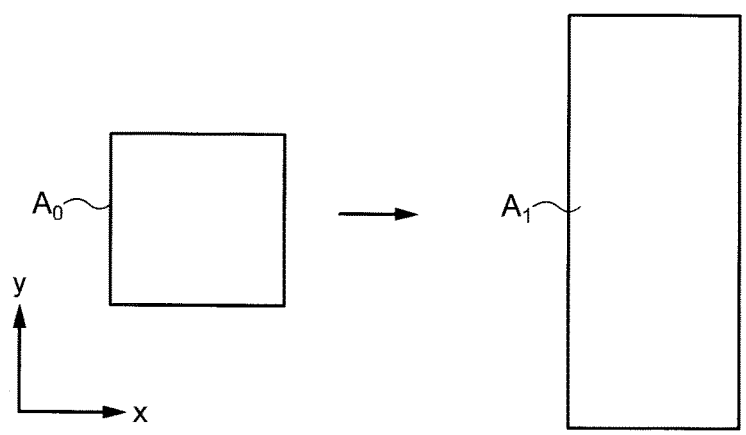
FIG. 14B is a schematic plane view of a region (hereinafter, referred to as an illuminated region) irradiated with light from a lighting device according to an embodiment of the present invention.
Figure 15A:
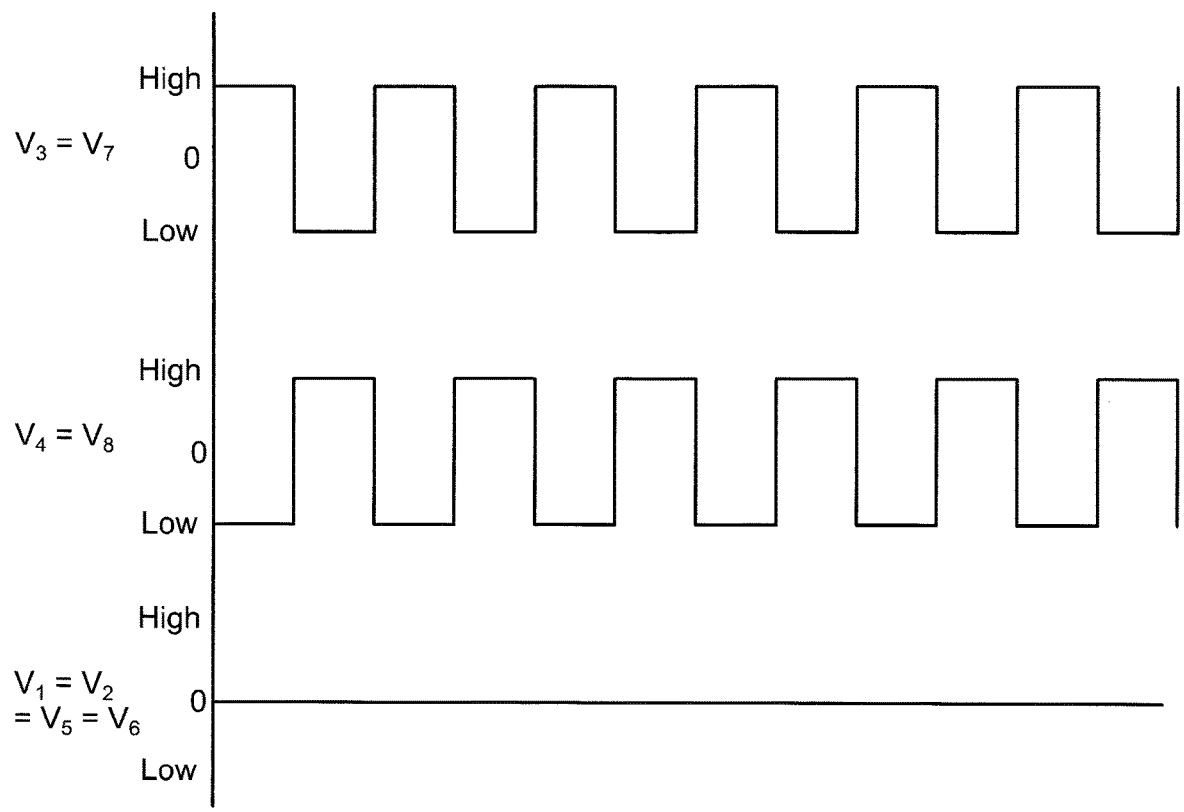
FIG. 15A is a timing chart of a lighting device according to an embodiment of the present invention.
Figure 15B:
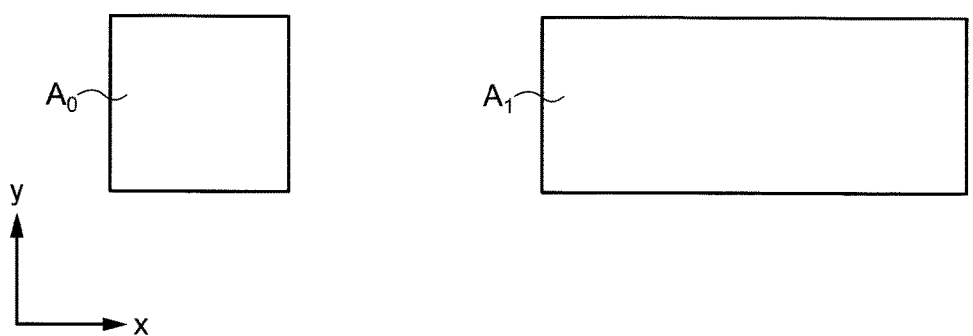
FIG. 15B is a schematic plane view of an illuminated region of a lighting device according to an embodiment of the present invention.

By the above mechanism, the light from the light source 110 is diffused only in they direction. Therefore, the lighting device 100 provides an illuminated region $A_1$ diffused in the y direction compared with the illuminated region A 0 formed when the two liquid crystal cells 120 are not driven (FIG. 14B). Without going into detail, in the case of obtaining an illuminated region selectively diffused in the x direction, the liquid crystal cells 120 are driven so that, in each of the first liquid crystal cell 120-1 and the second liquid crystal cell, an alternating voltage is applied to the plurality of second electrodes 128 to allow the phase to be inverted between adjacent second electrodes 128, while applying a constant voltage or no voltage to the plurality of first electrodes 126 (FIG. 15A and FIG. 15B).

(2) Diffusion in x Direction and y Direction

Figure 16A:
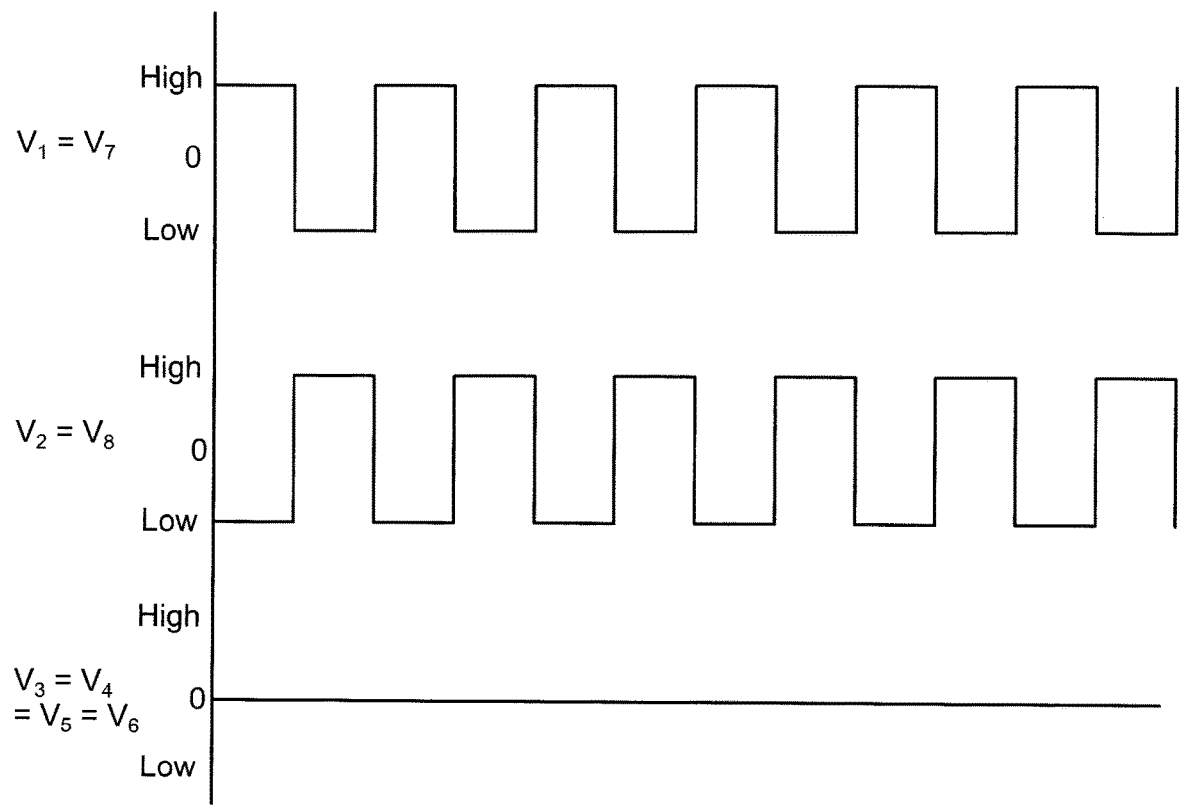
FIG. 16A is a timing chart of a lighting device according to an embodiment of the present invention.

As another example, a case where the liquid crystal cells 120 are driven according to the timing chart in FIG. 16A is considered. Here, in the first liquid crystal cell 120-1, an alternating voltage is applied to the plurality of first electrodes 126 so that the phase is inverted between adjacent first electrodes 126, while a constant voltage or no voltage is applied to the plurality of second electrodes 128. On the other hand, in the second liquid crystal cell 120-2, a constant voltage or no voltage is applied to the plurality of first electrodes 126, while an alternating voltage is applied to the second electrodes 128 so that the phase is inverted between adjacent second electrodes 128. The constant voltage may be 0 V or an intermediate potential with respect to the aforementioned alternating voltage.

As can be understood from FIG. 11, when the liquid crystal cells 120 are operated in this manner, the S component 150 of the light from the light source 110 is diffused in the y direction in the first liquid crystal cell 120-1 due to the refractive index distribution in the y direction on the first electrode 126 side and is optically rotated by the liquid crystal layer 136 to become S component 152. When the S component 152 enters the second liquid crystal cell 120-2, the S component 152 is optically rotated by the liquid crystal layer 136 and the polarization axis thereof is changed to the y direction since there is no refractive index distribution on the first electrode 126 side. However, since the refractive index distribution on the second substrate 124 side is in the x direction, this component is not diffused. In summary, the S component 150 becomes the S component 154 diffused only in the y direction when passing through the two liquid crystal cells 120.

On the other hand, the P component 156 of the light from the light source 110 is not affected by the refractive index distribution because the transverse electric field on the first electrode 126 side of the first liquid crystal cell 120-1 is in the y direction. In addition, since there is no electric field between the second electrodes 128, there is no refractive index distribution on the second electrode 128 side. Therefore, the P component 156 is not diffused but is optically rotated according to the twist of the orientation of the liquid crystal molecules in the liquid crystal layer 136 to become the P component 158 whose polarization axis is in the y direction. When this P component 158 enters the second liquid crystal cell 120-2, this P component 158 is optically rotated while being diffused in the x direction to become the P component 160 because, although there is no refractive index distribution on the first electrode 126 side, there is a refractive index distribution in the x direction on the second electrode 128 side. In summary, the P component 156 becomes the P component 160 diffused only in the x direction when passing through the two liquid crystal cells 120.

Figure 16B:
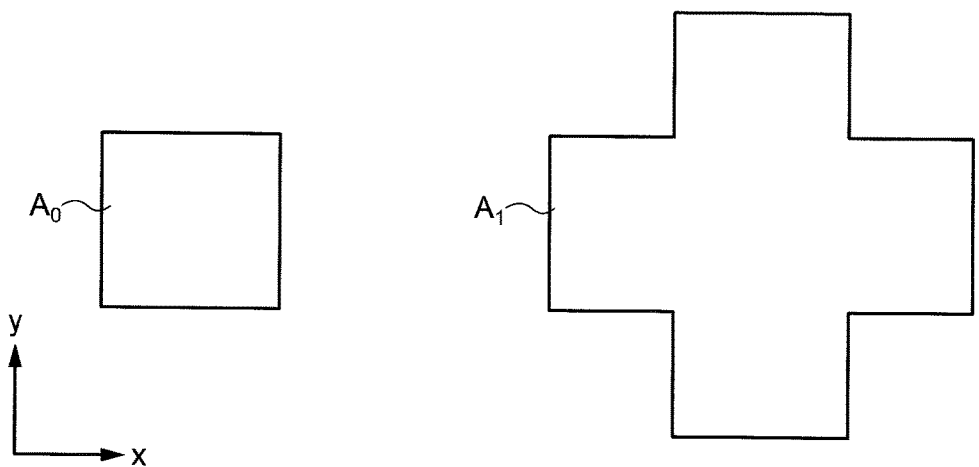
FIG. 16B is a schematic plane view of an illuminated region of a lighting device according to an embodiment of the present invention.

By the above mechanism, the S component 150 and the P component 156 of the light from the light source 110 are selectively diffused in the y direction and the x direction, respectively. Therefore, unlike the illuminated region $A_0$ formed when the two liquid crystal cells 120 are not driven, the lighting device 100 provides a cross-shaped illuminated region $A_1$ (FIG. 16B).

(3) Asymmetric Diffusion in x Direction and y Direction

Figure 17A:
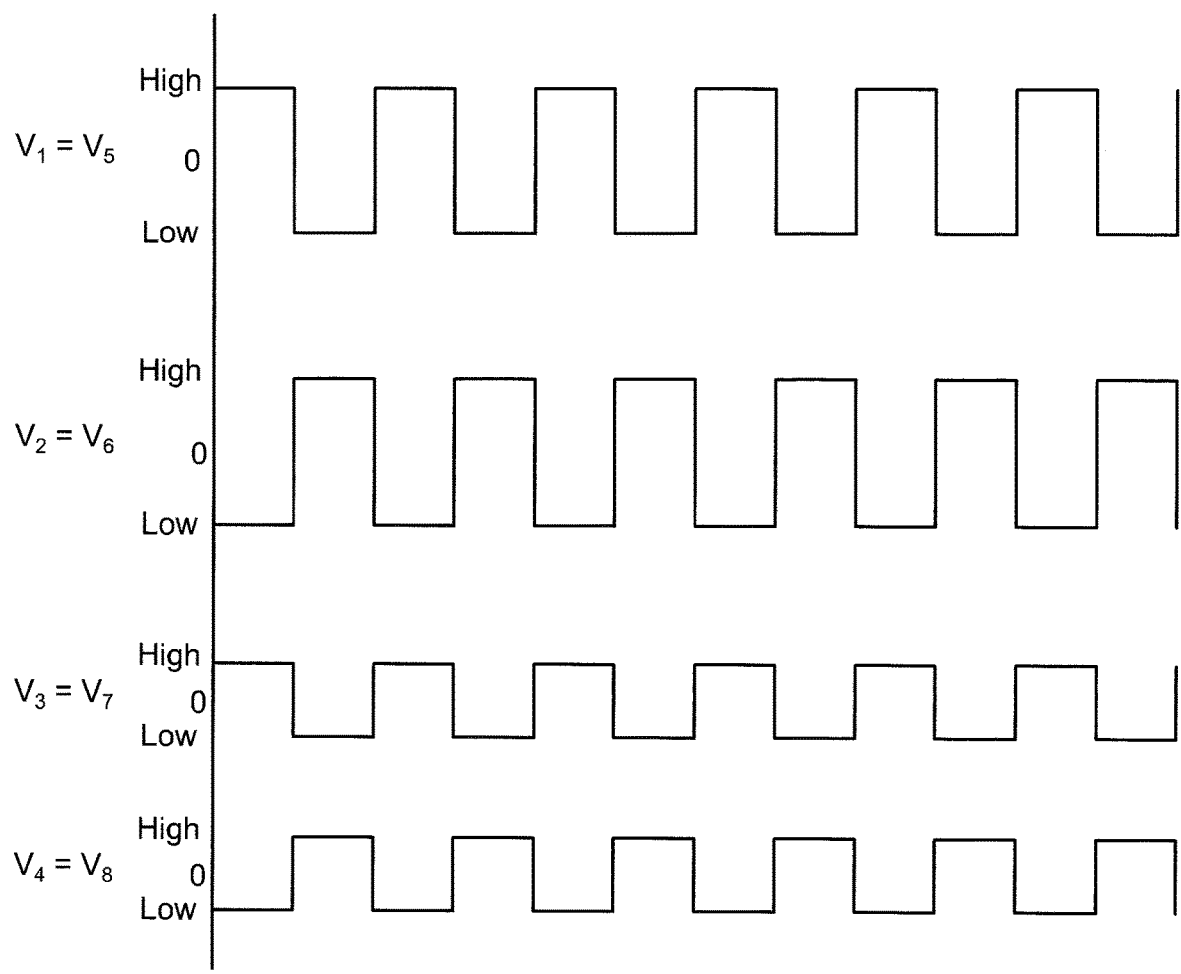
FIG. 17A is a timing chart of a lighting device according to an embodiment of the present invention.

As another example, a case where the liquid crystal cells 120 are driven according to the timing chart shown in FIG. 17A is considered. Here, in the two liquid crystal cells 120, an alternating voltage is supplied to the plurality of first electrodes 126 so that the phase is inverted between adjacent first electrodes 126, while an alternating voltage is supplied to the plurality of second electrodes 128 so that the phase is inverted between adjacent second electrodes 128. However, the voltages supplied to the plurality of first electrodes 126 and the plurality of second electrodes 128 are different in magnitude. Here, an example is used for explanation where the former is larger than the latter.

As can be understood from FIG. 11, when the liquid crystal cells 120 are driven in this manner, the S component 150 of the light from the light source 110 is optically rotated while being diffused in the y direction due to the refractive index distribution in the y direction on the first electrode 126 side and is also diffused in the x direction due to the refractive index distribution in the x direction on the second electrode 128 side in the first liquid crystal cell 120-1. However, since the voltage applied to the first electrodes 126 is greater than the voltage applied to the second electrodes 128, this light becomes the S component 152 largely diffused more in the y direction. This S component 152 is not diffused but is optically rotated in the second liquid crystal cell 120-2. In summary, the S component 150 becomes the S component 154 largely diffused more in the y direction than in the x direction.

On the other hand, the P component 156 of the light from the light source 110 is optically rotated without being diffused in the first liquid crystal cell 120-1 to become the P component 158. When this P component 158 enters the second liquid crystal cell 120-2, this component is optically rotated and is simultaneously diffused in the y direction due to the refractive index distribution on the first electrode 126 side and in the x direction due to the refractive index distribution on the second electrode 128 side. However, since the voltage applied to the first electrodes 126 is greater than the voltage applied to the second electrodes 128, this component becomes the P component 160 largely diffused more in the y direction. In summary, the P component 156 also becomes the P component 160 largely diffused more in they direction than in the x direction.

Figure 17B:
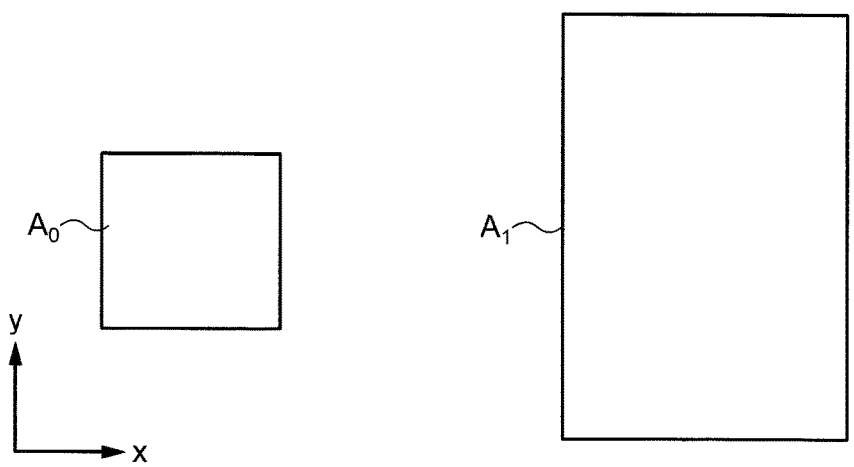
FIG. 17B is a schematic plane view of an illuminated region of a lighting device according to an embodiment of the present invention.

Due to the above mechanism, the S component 150 and the P component 156 of the light from the light source 110 are each diffused in the y direction largely more than in the x direction. Therefore, the lighting device 100 provides an illuminated region $A_1$ greatly expanded more in the y direction compared to the illuminated region $A_0$ formed when the two liquid crystal cells 120 are not driven (FIG. 17B).

As described above, the implementation of the embodiment of the present invention enables the light from the light source 110 to be arbitrarily controlled, leading to the production of illuminated regions with a variety of shapes.

Second Embodiment

In this embodiment, a driving method of the lighting device 100 different from the driving method described in the First Embodiment is explained. An explanation of the structures the same as or similar to those described in the First Embodiment may be omitted.

In the driving method of the lighting device 100 according to the present embodiment, a part of the plurality of light-emitting elements 114 is driven (local dimming). This allows the illuminated region to be changed to more diverse shapes and also reduces power consumption.

Figure 18A:
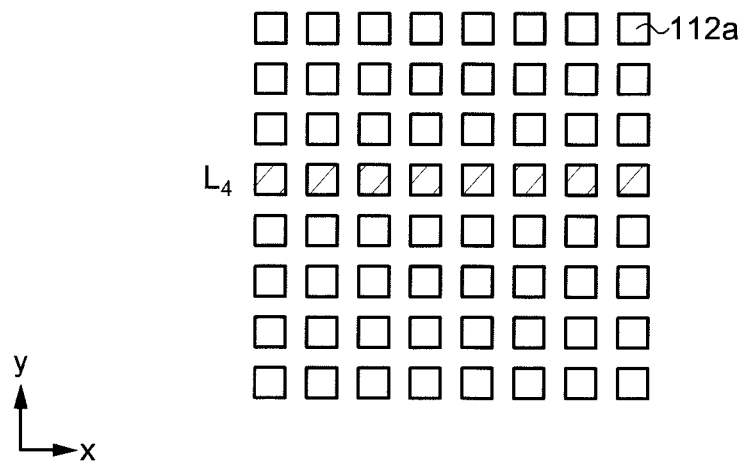
FIG. 18A is a schematic top view of a light source of a lighting device according to an embodiment of the present invention.
Figure 18B:
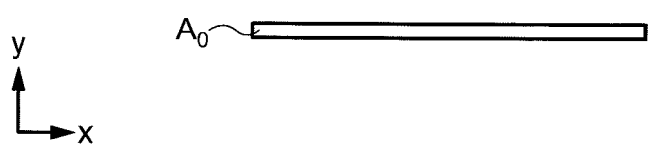
FIG. 18B is a schematic plane view of an illuminated region of a lighting device according to an embodiment of the present invention.

As an example, a model shown in FIG. 18A is considered where only a part of the light-emitting elements 114 is driven while the other light-emitting elements 114 are not turned on. Here, the light-emitting elements 114 in the depressed portions 112a located in the fourth row (1-4) among the depressed portion 112a arranged in a matrix of 8 rows and 8 columns are turned on. When the two liquid crystal cells 120 are not driven, the illuminated region $A_0$ of the light source 110 in the xy plane is approximately similar to the shape of the light source 110 in the xy plane. Therefore, as shown in FIG. 18B, the illuminated region $A_0$ is linear.

Figure 18C:
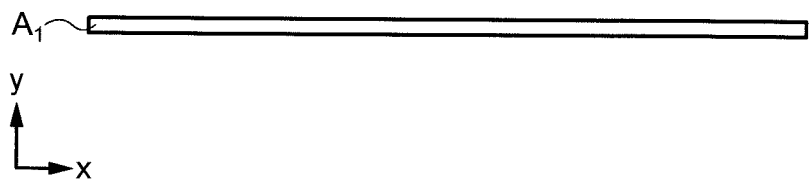
FIG. 18C is a schematic plane view of an illuminated region of a lighting device according to an embodiment of the present invention.

In this state, the liquid crystal cells 120 are driven to selectively diffuse the light in the x direction. Specifically, the light emitted from the light source 110 is selectively diffused in the x direction, i.e., the row direction, by driving the liquid crystal cells 120 according to the timing chart shown in FIG. 15A. As a result, it is possible to provide an illuminated region $A_1$ enlarged in the x direction compared with the illuminated region $A_0$ (FIG. 18C). Although not illustrated, the light can also be diffused in the y direction by driving the liquid crystal cells 120 as appropriate, thereby providing illuminated regions with arbitral shapes using the light from the light source 110.

Thus, by performing the local dimming in this manner, the illuminated region of the light source 110 can also be controlled, which allows the formation of illuminated regions with more diverse shapes. In addition, since only a part of the light-emitting elements 114 can be selectively driven, power consumption can be reduced.

Third Embodiment

In this embodiment, a driving method of the lighting device 100 different from the driving methods described in the First and Second Embodiments is explained. An explanation of the structures the same as or similar to those described in the First and Second Embodiments may be omitted.

In the driving method of the lighting device 100 described in this embodiment, the local dimming is performed similar to the Second Embodiment. At the same time, the liquid crystal cells 120 are partially driven. That is, a portion of the plurality of first electrode groups 125 and second electrode groups 127 provided in the liquid crystal cells 120 is selectively driven, which enables further reduction of power consumption and more diverse light-distribution control.

Figure 19A:
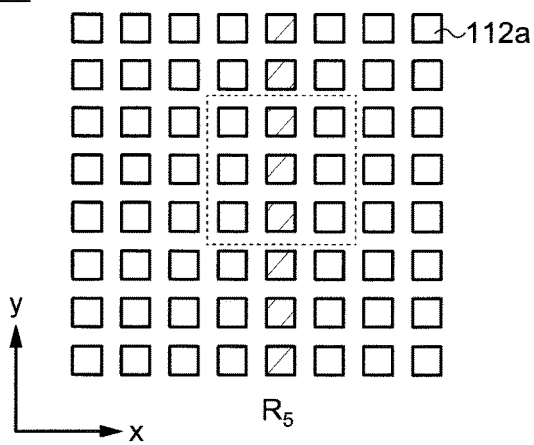
FIG. 19A is a schematic top view of a light source of a lighting device according to an embodiment of the present invention.
Figure 19B:
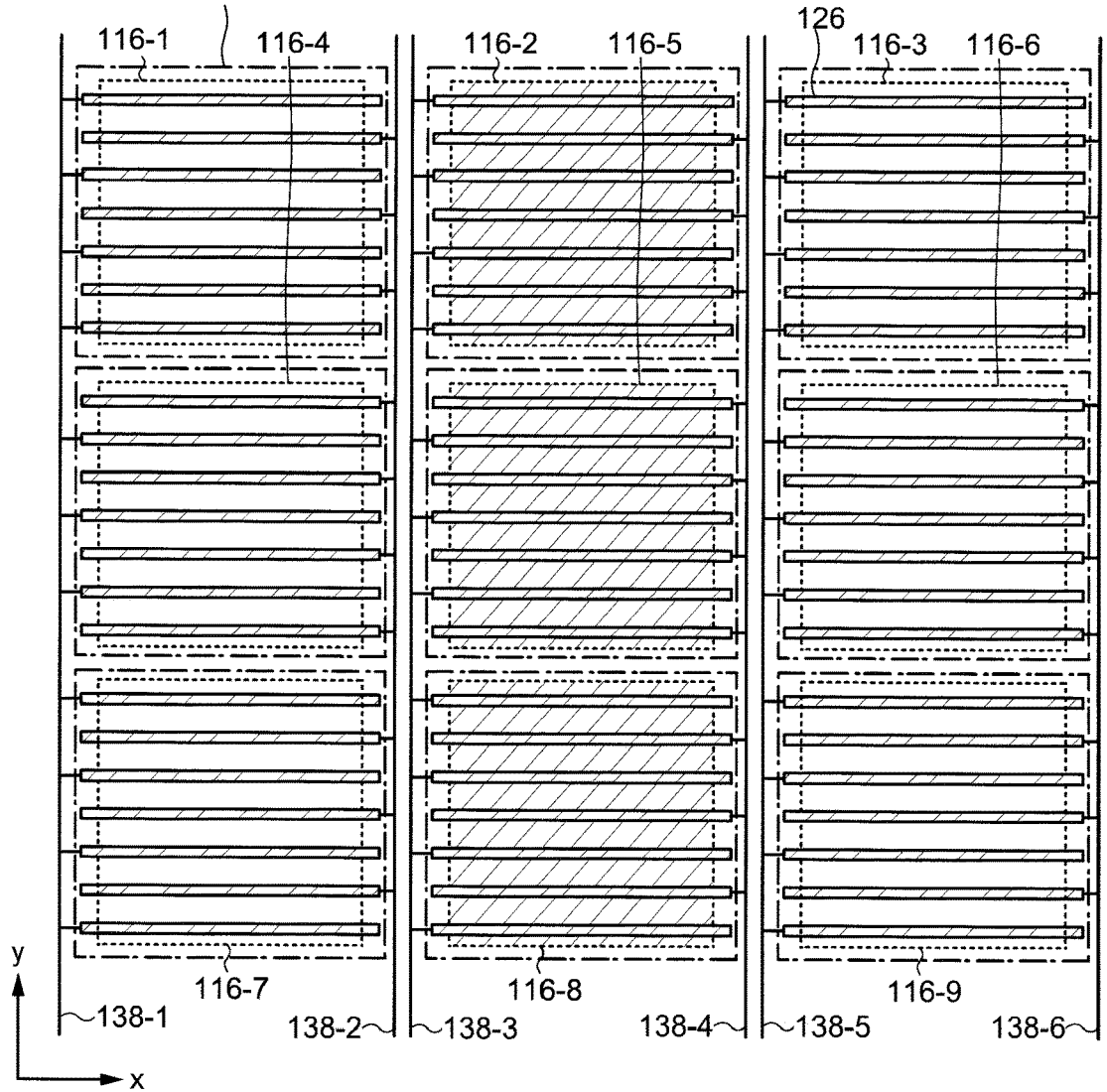
FIG. 19B is a schematic top view of a portion of a liquid crystal cell of a lighting device according to an embodiment of the present invention.
Figure 20:
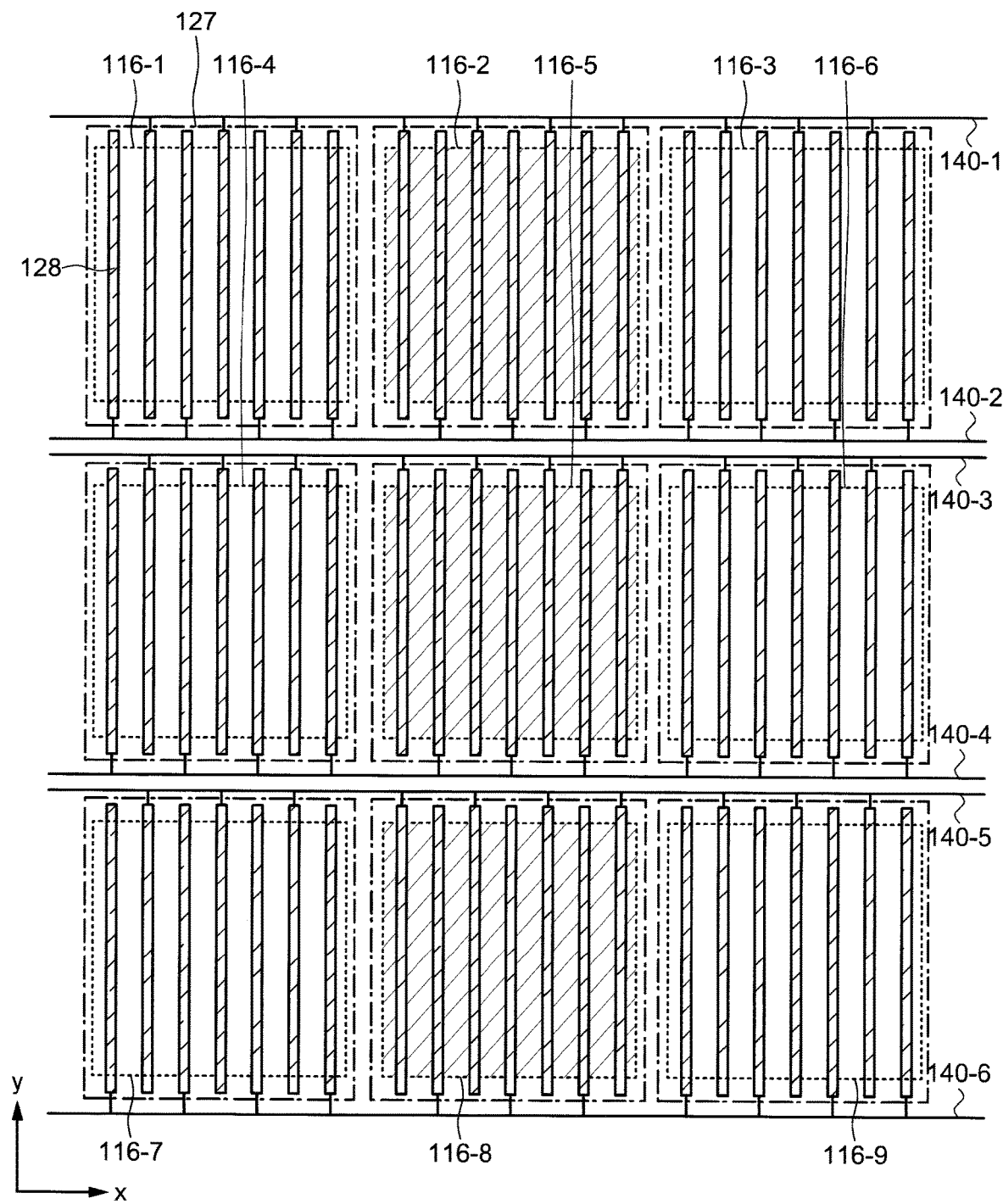
FIG. 20 is a schematic top view of a portion of a liquid crystal cell of a lighting device according to an embodiment of the present invention.

As an example, a model is considered in which the light-emitting elements 114 provided in the depressed portions 112a located in the fifth row $R_5$ among the depressed portions 112a arranged in a matrix shape with 8 rows and 8 columns are turned on as shown in FIG. 19A. Schematic enlarged views of the plurality of first electrode groups 125 and second electrode groups 127 in the area surrounded by the dotted line in FIG. 19A are respectively illustrated in FIG. 19B and FIG. 20. In FIG. 19B, the plurality of first electrodes 126 overlapping the illuminated plane 116, which is provided by the light-emitting element 114 disposed in one depressed portion 112a, constitutes one first electrode group 125 (see FIG. 6). Similarly, in FIG. 20, the plurality of second electrodes 128 overlapping the illuminated plane 116, which is provided by the light-emitting element 114 disposed in one depressed portion 112a, constitutes one second electrode group 127 (see FIG. 6). Among the nine illuminated planes 116-1 to 116-9 depicted in FIG. 19B and FIG. 20, the illuminated planes where the light-emitting elements 114 are turned on are three hatched illuminated planes 116-2, 116-5, and 116-8.

In this state, the two liquid crystal cells 120 are driven using the first electrodes 126 and second electrodes 128 overlapping the illuminated plane 116 provided by one of the depressed portions 112a in which the illuminating light-emitting element 114 is disposed. For example, the illuminated plane 116-5 is selected, and the first electrodes 126 and the second electrodes 128 overlapping this illuminated plane 116-5 are driven according to the timing chart shown in FIG. 15A. In accordance with the timing chart in FIG. 15A, in the two liquid crystal cells 120, the second electrodes 128 located between the wirings 140-3 and 140-4 among the wirings 140-1 to 140-6 are applied with an alternating voltage so that the phases are inverted between adjacent second electrodes 128, while applying a constant voltage of 0 V to the other second electrodes 128. The constant voltage of 0 V is also applied to the first electrodes 126 of the two liquid crystal cells 120.

Figure 21:
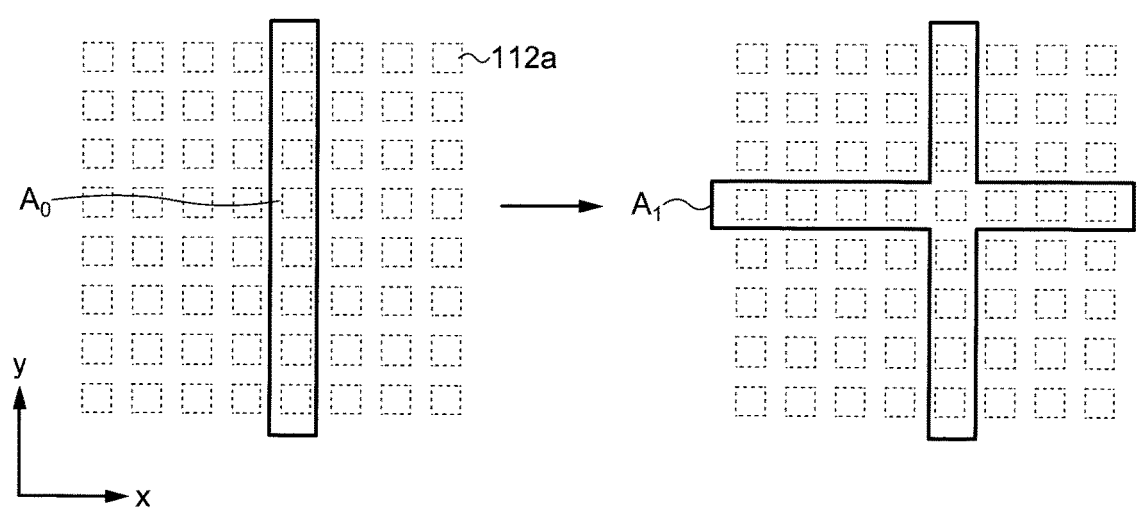
FIG. 21 represents a schematic top view of a light source and a schematic plane view of an illuminated region of a lighting device according to an embodiment of the present invention.

By driving the liquid crystal cell 120 in this manner, the illuminated region $A_0$, which is linearly formed in the y direction when the liquid crystal cells 120 are not driven, is partially extended in the x direction to obtain a cross-shaped illuminated region $A_1$ as shown in FIG. 21. Such a deformation of the illuminated region can be achieved by driving only a portion of the second electrodes 128, which also results in a reduction of power consumption of the liquid crystal cells 120.

Figure 22A:
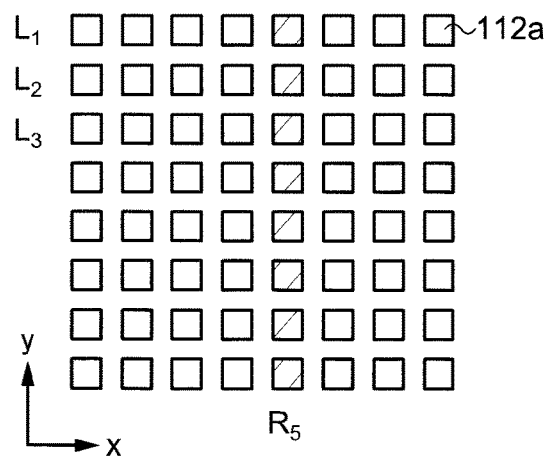
FIG. 22A is a schematic top view of a light source of a lighting device according to an embodiment of the present invention.
Figure 22B:
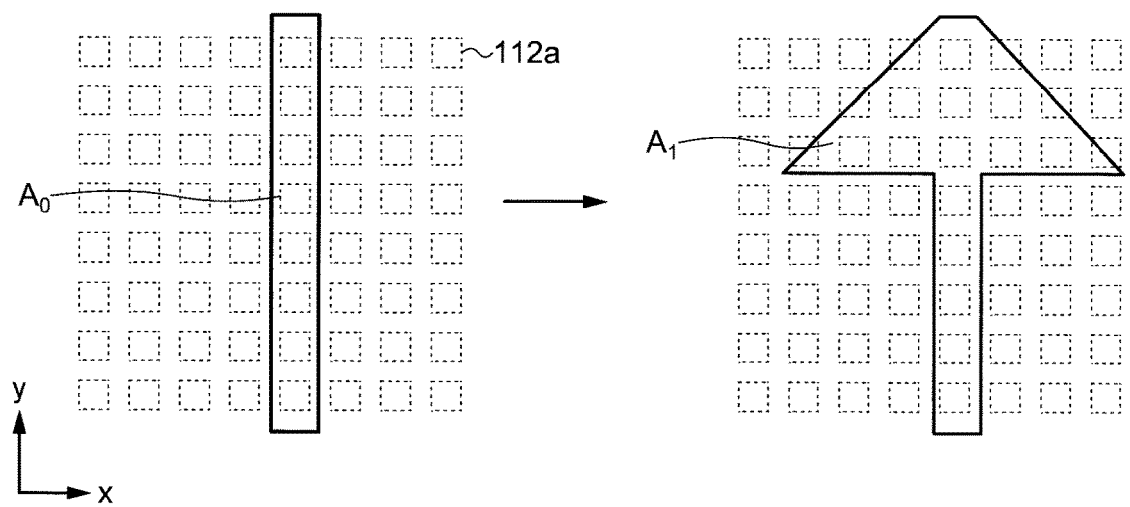
FIG. 22B is a schematic plane view of an illuminated region of a lighting device according to an embodiment of the present invention.

Alternatively, the illuminated region can be changed to a variety of shapes by varying the voltage applied to the second electrodes 128 according to the timing chart in FIG. 15A. For example, as shown in FIG. 22A, all of the light-emitting elements 114 arranged in the depressed portions 112a in the fifth row $R_5$ are turned on, while the second electrodes 128 overlapping the depressed portions 112a in the first row $L_1$ to the third row $L_3$ are driven according to the timing chart in FIG. 15A. At this time, the voltage applied to the second electrodes 128 is increased in the order from the first row $L_1$ to the third row $L_3$, by which the linearly formed illuminated region $A_0$ can be transformed into an arrow-shaped illuminated region $A_1$ as shown in FIG. 22B.

By controlling the voltages applied to the first electrode groups 125 and the second electrode groups 127 on a row-by-row or column-by-column basis, the power consumption can be reduced, and the illuminated region can be arbitrarily transformed into a variety of shapes.

Fourth Embodiment

In this embodiment, a driving method of the lighting device 100 different from the driving methods described in the First to Third Embodiments is explained. An explanation of the structures the same as or similar to those described in the First to Third Embodiments may be omitted.

In the driving method of the lighting device 100 described in this embodiment, when the liquid crystal cells 120 are partially driven, a row (hereinafter, referred to as a driving row) overlapping the depressed portions 112a from which the target light for diffusion is output, and the rows (hereinafter, referred to as non-driving adjacent rows), which are adjacent to the driving row and overlap the depressed portions 112a having the light-emitting elements 114a that are not driven or output the light that is not a target for diffusion, are synchronized. This synchronization is carried out so that there is no potential difference between the first electrodes 126 in the driving row and two wirings 138 arranged between the non-driving rows or between the first electrodes 126 in the driving row and the first electrodes 126 in the non-driving adjacent rows. Alternatively, a column (hereinafter, referred to as a driving column) overlapping the depressed portions 112a from which the target light for diffusion is output, and the columns (hereinafter, referred to as non-driving adjacent columns), which are adjacent to the driving column and overlap the depressed portions 112a having the light-emitting elements 114a that are not driven or output the light that is not a target for diffusion, are synchronized. This synchronization is carried out so that there is no potential difference between the second electrodes 128 in the driving column and two wirings 140 arranged between the non-driving columns or between the second electrodes 128 in the driving column and the second electrodes 128 in the non-driving adjacent columns.

Figure 23A:
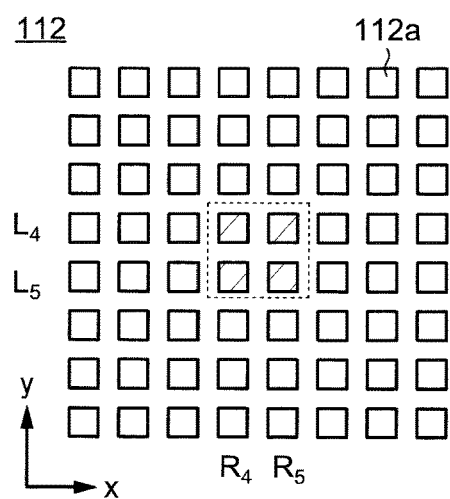
FIG. 23A is a schematic top view of a light source of a lighting device according to an embodiment of the present invention.
Figure 23C:
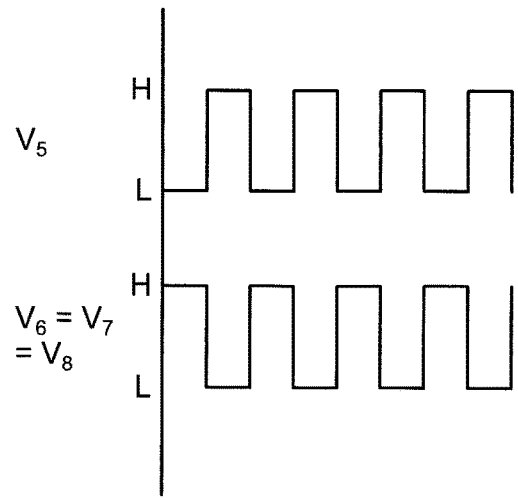
FIG. 23C is a timing chart of a lighting device according to an embodiment of the present invention.
Figure 23B:
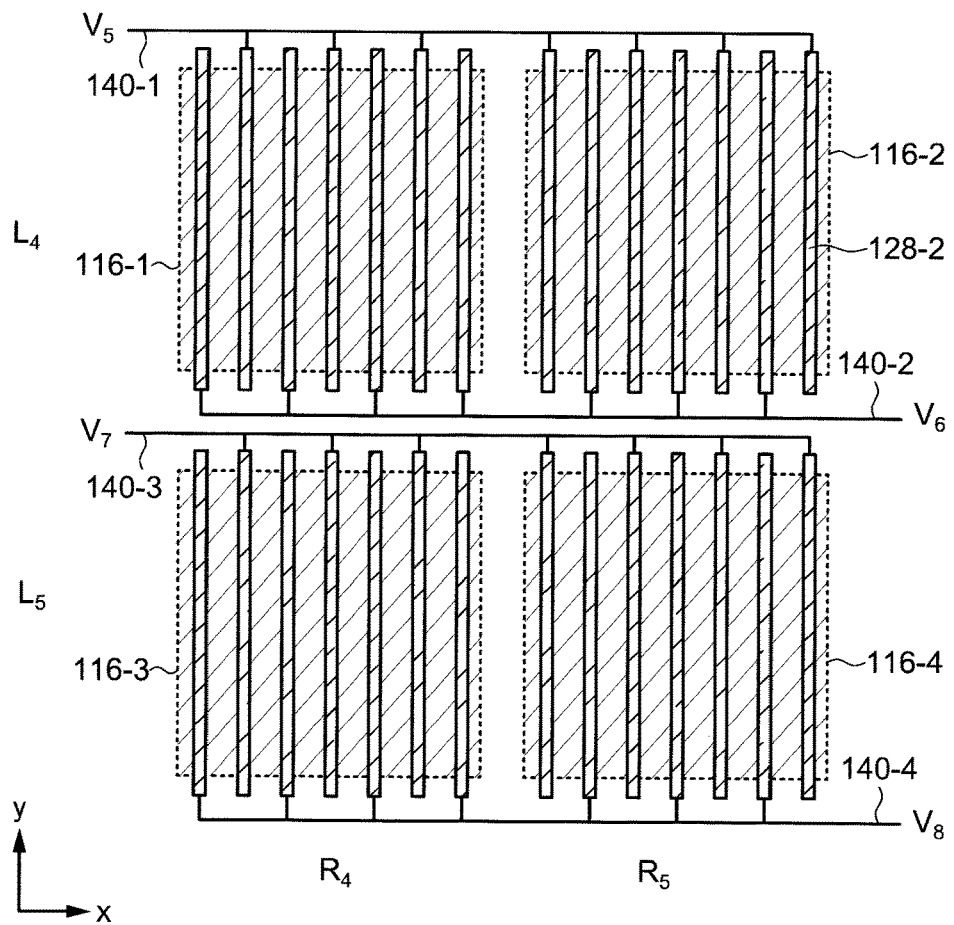
FIG. 23B is a schematic top view of a portion of a liquid crystal cell of a lighting device according to an embodiment of the present invention.

As an example, a case is considered in which the reflective plate 112 has the depressed portions 112a arranged in 8 rows and 8 columns, and light is emitted from the light-emitting elements 114 in the depressed portions 112a of the fourth column $R_4$ and the fifth column $R_5$ in the fourth row La and the fourth column $R_4$ and the fifth column $R_5$ in the fifth row $L_5$ as shown in FIG. 23A. Here, it is assumed that only the light from the light-emitting elements 114 in the two depressed portions 112a in the fourth row $L_4$ is selectively diffused in the x direction. A schematic top view of the second electrodes 128 in the area surrounded by the dotted line in FIG. 23A is shown in FIG. 23B. According to the timing chart shown in FIG. 15A for diffusing the light in the x direction, among the second electrodes 128 of the two liquid crystal cells 120, the second electrode groups 127 in the fourth row $L_4$ (the second electrode groups 127 overlapping the illuminated planes 116-1 and 116-2 in FIG. 23B), which is a driving row, is applied with alternating voltages $V_5$ and $V_6$ with different phases to each other, while a constant voltage or no voltage is applied to the first electrodes 126. With this driving method, the light incident on the illuminated planes 116-1 and 116-2 is diffused in the x direction.

However, if the voltages $V_7$ and $V_8$ of the wirings 140 connected to the second electrodes 128 of the fifth row $L_5$ which is the non-driving adjacent row are kept constant, a potential difference is also generated between the two wirings 140 located between the driving row $L_4$ and the non-driving adjacent row $L_5$ (here, wirings 140-2 and 140-3). Similarly, a potential difference is also generated between the second electrodes 128 in the fourth row $L_4$ and the second electrodes 128 in the fifth row $L_5$. These potential differences cause the liquid crystal molecules in the liquid crystal layer 136 to produce a downwardly convexed refractive index distribution in the y direction between the fourth row $L_4$ and the fifth row $L_5$. As a result, a lens effect is also generated in the liquid crystal layer 136 between the fourth row $L_4$ and the fifth row $L_5$, and the direction of this refractive index distribution is orthogonal to that of the lens effect of the liquid crystal layer 136 over the fourth row $L_4$. Hence, a part of the light applied to the driving row is also diffused in the unintended y direction, which inhibits precise light distribution control.

Hence, in this embodiment, the wirings 140 between the driving row and the non-driving adjacent row are synchronized with each other in each liquid crystal cell 120. In the example demonstrated in FIG. 23C, the wiring 140-3 connected to the second electrodes 128 in the fifth row $L_5$, which is the non-driving adjacent row, and located between the driving row $L_4$ and the non-driving adjacent row $L_5$ and the wiring 140-2 connected to the second electrodes 128 in the fourth row $L_4$, which is the driving row, and located between the driving row $L_4$ and the non-driving row $L_5$ are synchronized with each other. As a result, there is no potential difference between the wirings 140-2 and 140-3 located between the driving row and the non-driving adjacent row and between the second electrodes 128 in the driving row and the second electrodes 128 in the non-driving adjacent row, by which the generation of the refractive index distribution is suppressed in the liquid crystal layer 136 between the driving row and the non-driving adjacent row. However, all of the second electrodes 128 in the non-driving adjacent row $L_5$ are synchronized with each other because the light is not diffused in the non-driving adjacent row $L_5$. Therefore, the other wiring 140-4 connected to the second electrodes 128 in the non-driving adjacent row $L_5$ are also synchronized with the wiring 140-3. As a result, the generation of the refractive index distribution is suppressed in the non-driving adjacent rows and also between the wiring 140-2 or the second electrodes 128 in the driving row La and the second electrodes 128 in the non-driving adjacent line $L_5$, by which unintended light diffusion can be suppressed and precise light distribution can be performed.

Figure 24A:
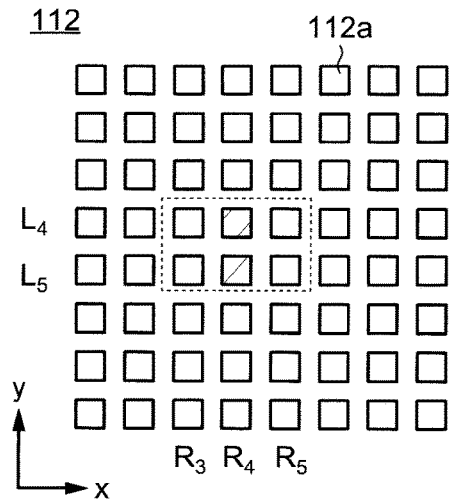
FIG. 24A represents a schematic top view of a light source of a lighting device according to an embodiment of the present invention.
Figure 25:
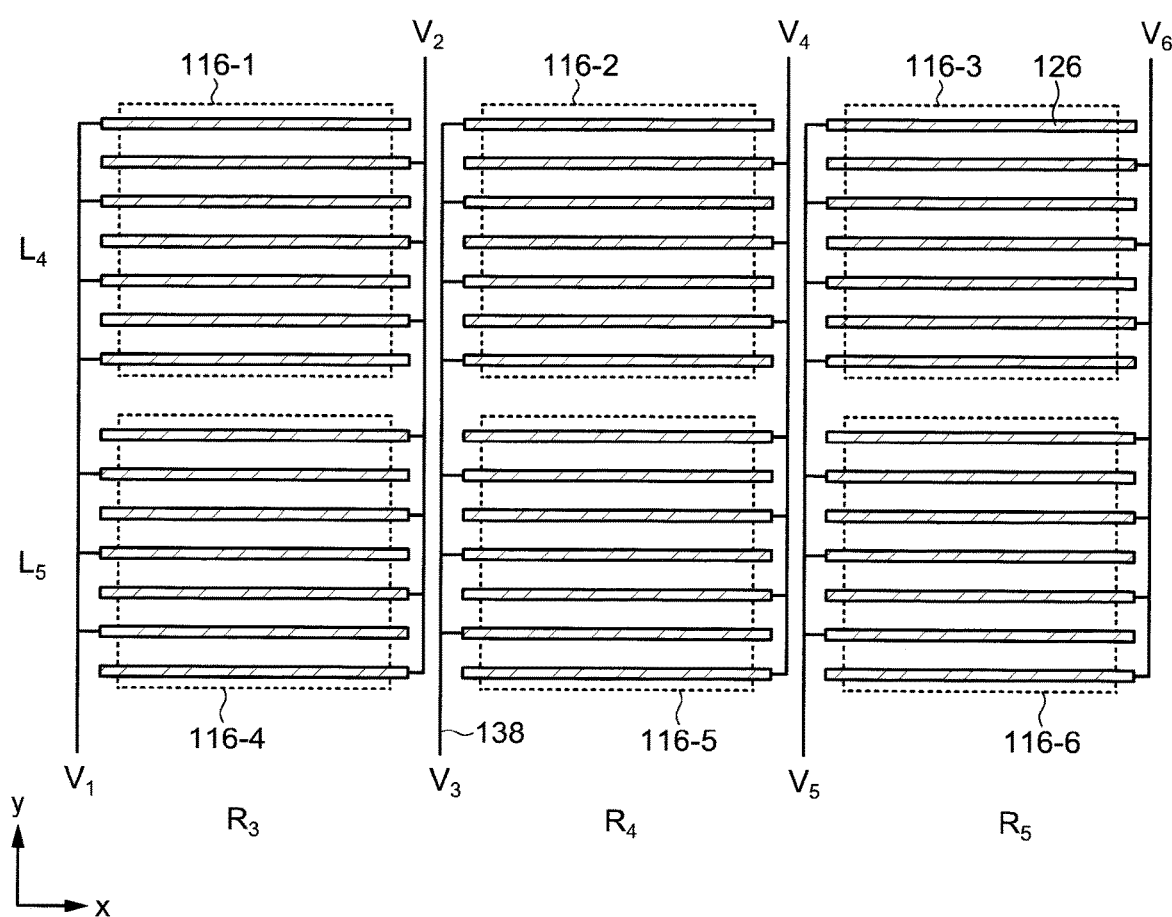
FIG. 25 is a schematic top view of a portion of a liquid crystal cell of a lighting device according to an embodiment of the present invention.
Figure 26:
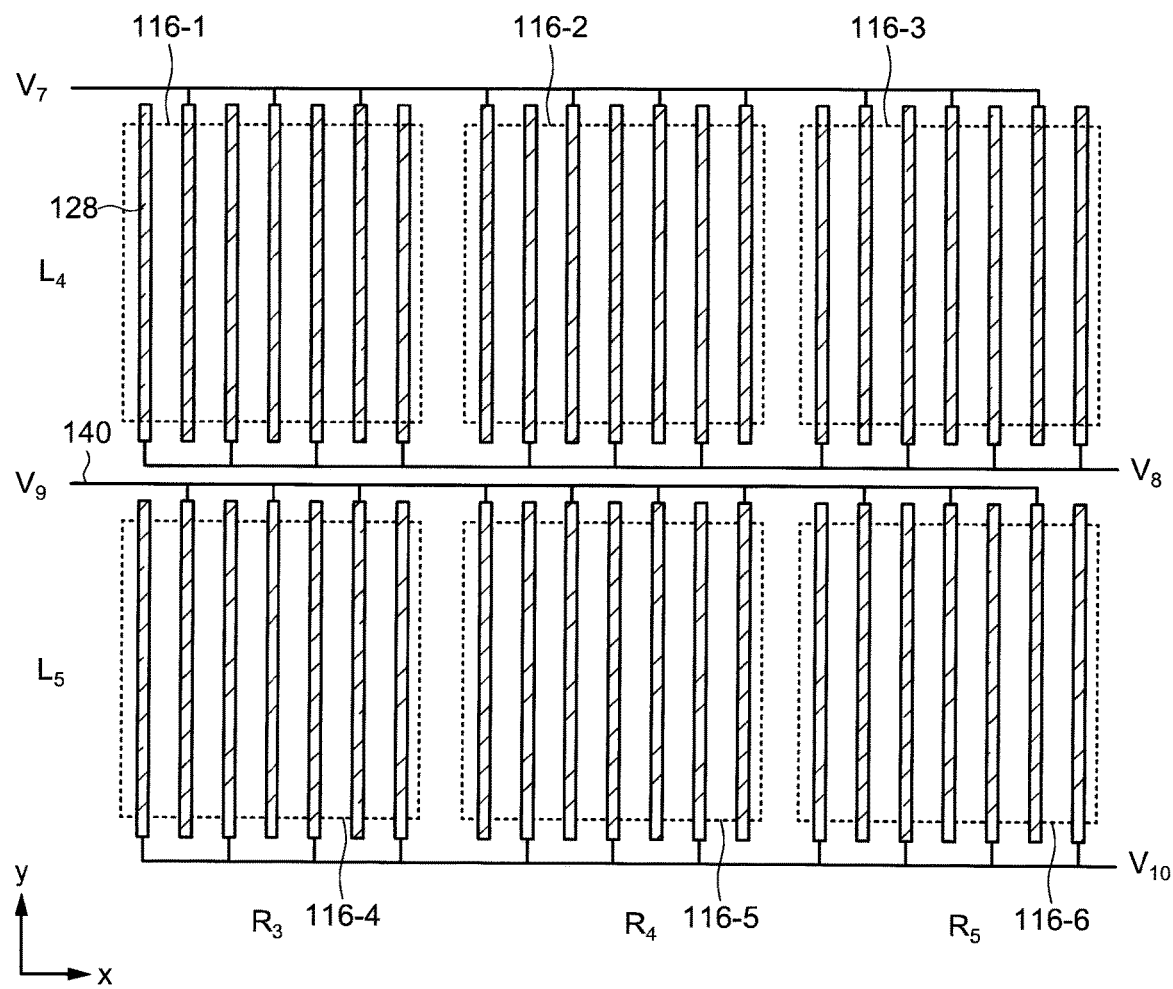
FIG. 26 is a schematic top view of a portion of a liquid crystal cell of a lighting device according to an embodiment of the present invention.

As another example, a case is explained in which light is emitted from the light-emitting elements 114 in the depressed portions 112a of the fourth row La in the fourth column $R_4$ and the fourth column $R_4$ in the fifth row $L_5$ as shown in FIG. 24A, and this light is diffused in the y direction. The arrangements of the first electrodes 126 and the second electrodes 128 in the region surrounded by the dotted rectangle in FIG. 24A are respectively shown in FIG. 25 and FIG. 26. In FIG. 25 and FIG. 26, the light from the depressed portions 112a gives illuminated planes 116-2 and 116-5.

Figure 24B:
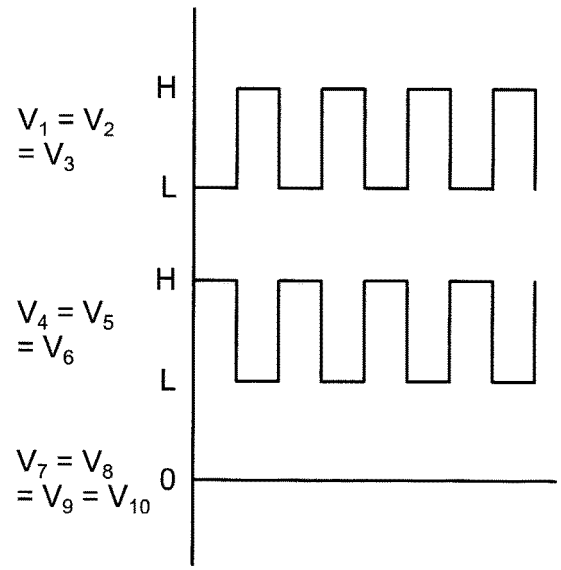
FIG. 24B is a timing chart of a lighting device according to an embodiment of the present invention.

In this case, all of the first electrodes 126 in the third column $R_3$, which is the non-driving adjacent column, are synchronized with the first electrodes 126 selected every other one in the fourth column Ra, which is the driving column, in each liquid crystal cell 120 as shown in FIG. 24B. Similarly, all of the first electrodes 126 in the fifth column $R_5$, which is the non-driving adjacent column, are synchronized with the first electrodes 126 selected every other one in the fourth column, which is the driving column. Specifically, an alternating voltage $V_3$ is applied to the first electrodes 126 selected every other one, while an alternating voltage $V_4$ inversed in phase with respect to the alternating voltage $V_3$ is applied to the other first electrodes 126 in the fourth column Ra. In the third column $R_3$, alternating voltages $V_1$ and $V_2$ with the same voltage and phase as the alternating voltage $V_3$ are applied. On the other hand, alternating voltages $V_5$ and $V_6$ with the same voltage and phase as the alternating voltage $V_4$ are applied in the fifth column. Note that, since the light is not diffused in the x direction, a constant voltage or no voltage is applied to all of the second electrodes 128 in the liquid crystal cell 120. As a result, since there is no potential difference between the wirings 138 disposed between the fourth column and the third column and between the wirings 138 disposed between the fourth column and the fifth column, the generation of the refractive index distribution causing the diffusion of the light in the x direction can be suppressed. Accordingly, unintended light diffusion can be prevented, and precise light distribution can be performed.

Figure 24C:
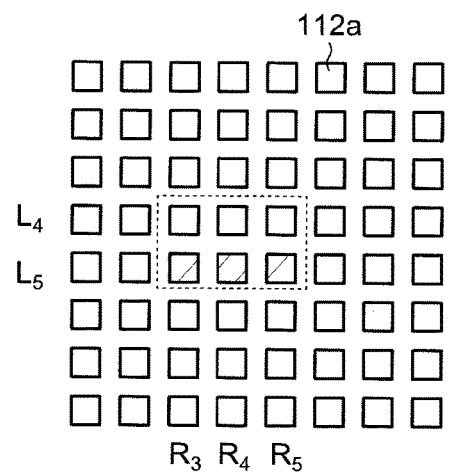
FIG. 24C represents a schematic top view of a light source of a lighting device according to an embodiment of the present invention.

As another example, a case is explained in which the light is emitted from the light-emitting elements 114 in the depressed portions 112a of the fourth column $R_4$ to the sixth column $R_6$ in the fifth row $L_5$ as shown in FIG. 24C, and this light is diffused in the x direction. The arrangements of the first electrodes 126 and the second electrodes 128 in the region surrounded by the dotted rectangle in FIG. 24C are also respectively shown in FIG. 25 and FIG. 26, and the light from the depressed portions 112a forms the illuminated planes 116-4 to 116-6 in FIG. and FIG. 26 in this case.

Figure 24D:
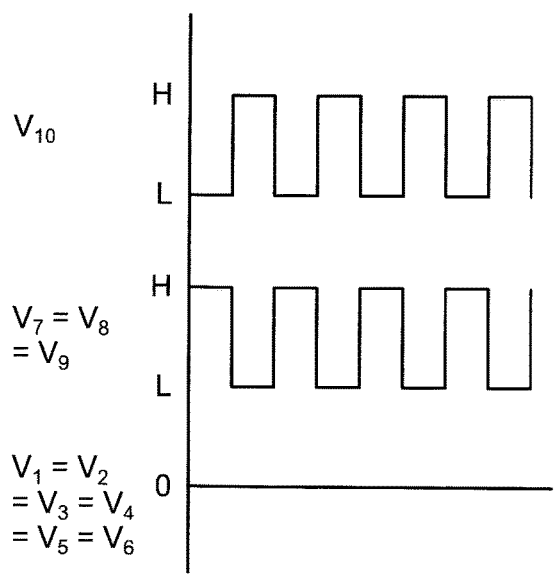
FIG. 24D is a timing chart of a lighting device according to an embodiment of the present invention.

In this case, all of the second electrodes 128 in the fourth row La, which is the non-driving adjacent row, are synchronized with the second electrodes 128 in the fifth row $L_5$, which is the driving row, in each liquid crystal cell 120 as shown in FIG. 24D. Specifically, an alternating voltage $V_9$ is applied to the second electrodes 128 selected every other one, while an alternating voltage $V_{10}$ inverted in phase with respect to the alternating voltage $V_9$ is applied to the other second electrodes 128 in the fifth row. Furthermore, alternating voltages $V_7$ and $V_8$ with the same voltage and phase as the alternating voltage $V_9$ are applied in the fourth row $L_4$. Note that, since the light is not diffused in the y direction, a constant voltage or no voltage is applied to all of the first electrodes 126 in each liquid crystal cell 120. As a result, since there is no potential difference between the wirings 140 disposed between the fourth row $L_4$ and the fifth row $L_5$, the generation of the refractive index distribution causing the diffusion of the light in the y direction can be suppressed. Accordingly, unintended light diffusion can be suppressed, and precise light distribution can be performed.

Fifth Embodiment

In this embodiment, two modified examples of the lighting device 100 described in the First Embodiment are explained. An explanation of the structures the same as or similar to those described in the First to Fourth Embodiments may be omitted.

1. Modified Example 1

1-1. Structure

In the lighting device 100 described in the First Embodiment, the plurality of first electrodes 126 in one column does not conduct with the first electrodes 126 in other columns (e.g., adjacent columns) and is independently controlled from the first electrodes 126 in the other columns (see FIG. 6). Similarly, the plurality of second electrodes 128 in one row does not conduct with the second electrodes 128 in other rows (e.g., adjacent rows) and is independently controlled from the second electrodes 128 in the other rows (see FIG. 7).

Figure 27:
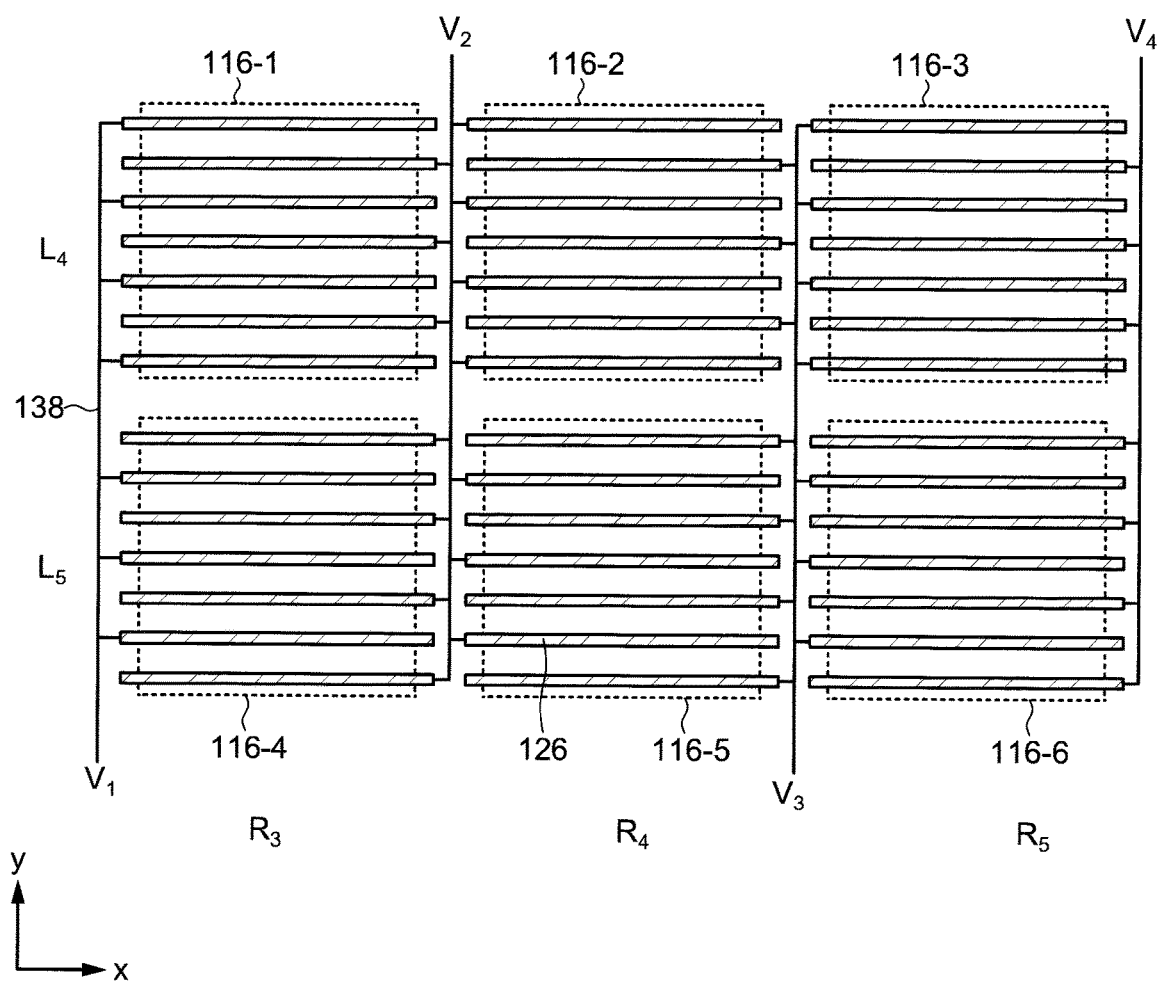
FIG. 27 is a schematic top view of a portion of a liquid crystal cell of a lighting device according to an embodiment of the present invention.

In contrast, in this modified example, the plurality of first electrodes 126 selected every other one in one column (e.g., fourth column $R_4$) is electrically connected to and conducts with the plurality of first electrodes 126 selected every other one in the adjacent column (e.g., third column $R_3$) in at least one of the liquid crystal cells 120 as shown in FIG. 27. Other first electrodes 126 in this one column (i.e., fourth column $R_4$) may conduct with the plurality of first electrodes 126 selected every other one in the opposite adjacent column (i.e., fifth column $R_5$).

Figure 28:
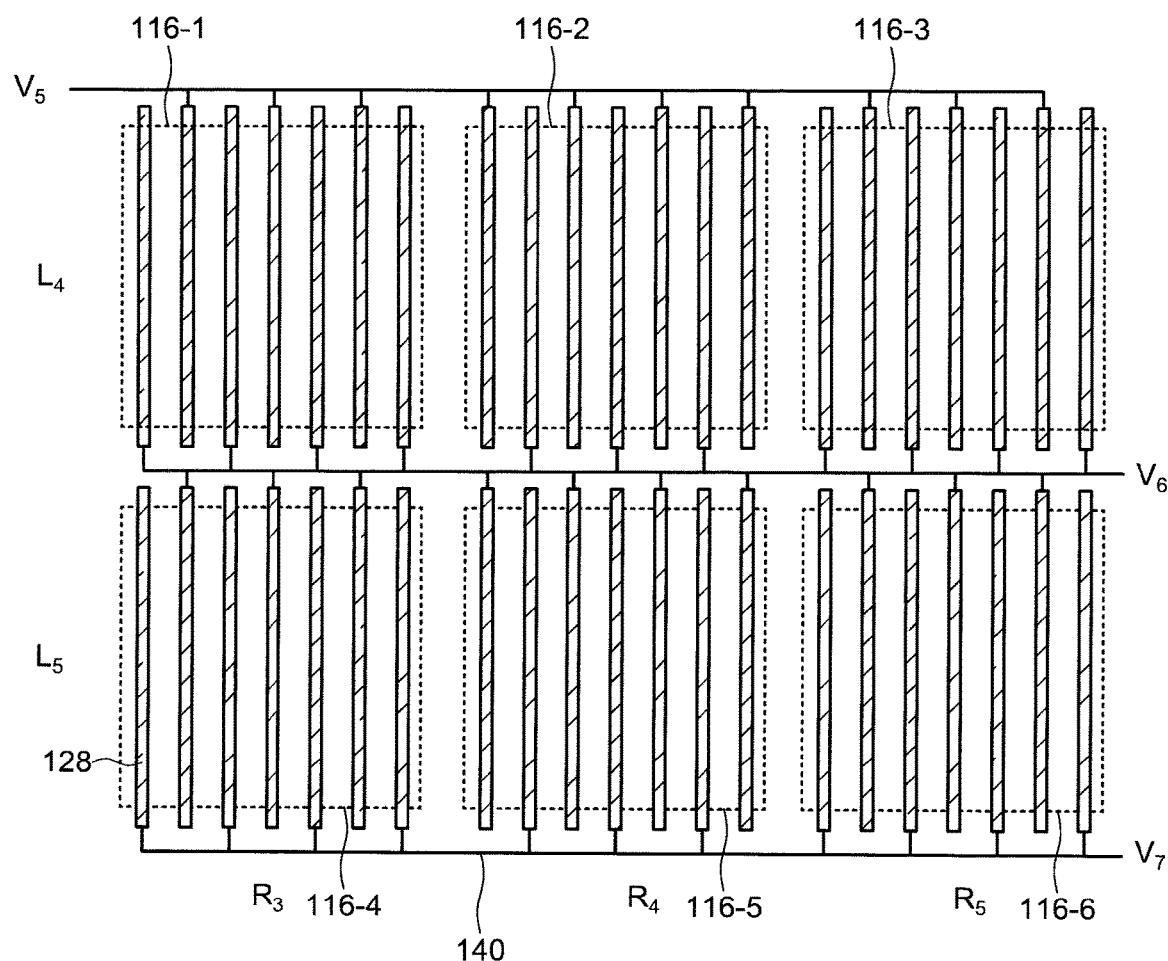
FIG. 28 is a schematic top view of a portion of a liquid crystal cell of a lighting device according to an embodiment of the present invention.

Furthermore, or alternatively, the plurality of second electrodes 128 selected every other one in one row (e.g., fourth row La) is electrically connected to and conducts with the plurality of second electrodes 128 selected every other one in the adjacent row (e.g., fifth row $L_5$) in at least one of the liquid crystal cells 120 as shown in FIG. 28. Other second electrodes 128 in this one row (i.e., fourth row La) may conduct with the plurality of second electrodes 128 selected every other one in the opposite adjacent row (i.e., third row $L_3$ which is not illustrated).

These connections enable the reduction in number of the wirings 138 and 140, which increases the degree of freedom in designing the liquid crystal cell 120. In addition, since the distances between adjacent rows and columns can be reduced, the lighting device 100 can be miniaturized.

1-2. Driving Method

Figure 29A:
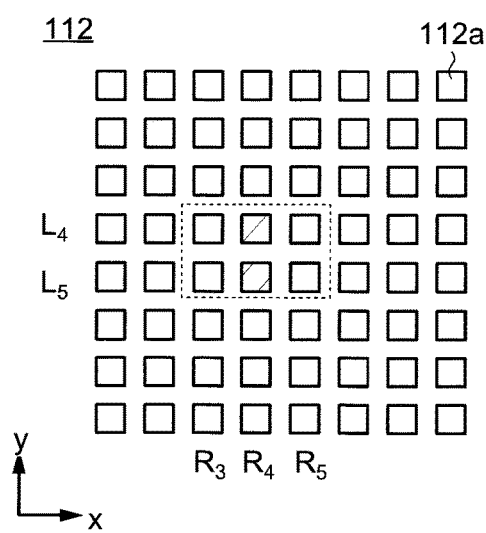
FIG. 29A represents a schematic top view of a light source of a lighting device according to an embodiment of the present invention.
Figure 29B:
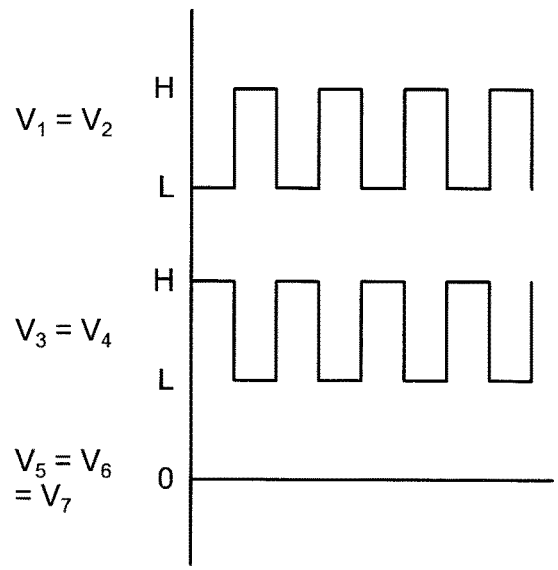
FIG. 29B is a timing chart of a lighting device according to an embodiment of the present invention.

An example of the driving method of the liquid crystal cell 120 according to the first modified example is explained. Here, a case is considered in which the reflective plate 112 has the depressed portions 112a arranged in 8 rows and 8 columns as shown in FIG. 29A, the light is emitted from the light-emitting elements 114 from the depressed portions 112a of the fourth column $R_4$ in the fourth row $L_4$ and the fourth column $R_4$ in fifth row $R_5$, and this light is diffused in the y direction. FIG. 27 schematically shows the arrangement of the first electrodes 126 and the wirings 138 connected thereto in the region surrounded by the dotted line in FIG. 29A, and the light-emitting elements 114 form the illuminated planes 116-2 and 116-5. In order to diffuse the light in the y direction, alternating voltages $V_2$ and $V_3$ with different phases are applied to the first electrodes 126 of the fourth column $R_4$, which is the driving column, among the first electrodes 126 of the two liquid crystal cells 120, while a constant voltage or no voltage is applied to the second electrodes 128 according to the timing chart of FIG. 14A (FIG. 29B). As a result, the light incident on the illuminated planes 116-2 and 116-5 can be diffused in the y direction.

At this time, all of the first electrodes 126 in the third column $R_3$, which is one of the non-driving adjacent columns, may be synchronized with the plurality of first electrodes 126 selected every other one in the fourth column $R_4$ in order to suppress unintended light diffusion. Similarly, all of the first electrodes 126 in the fifth column $R_5$, which is the other non-driving adjacent column, may be synchronized with the other plurality of first electrodes 126 selected every other one in the fourth column $R_4$. In this modified example 1, since the plurality of first electrodes 126 selected every other one in the fourth column Ra, which is the driving column, and the plurality of first electrodes 126 selected every other one in the third column $R_3$, which is the non-driving adjacent column, conduct with each other, an alternating voltage $V_1$ with the same voltage and phase as the alternating voltage $V_2$ may be applied to the remaining first electrodes 126 in the third column $R_3$. Similarly, since the remaining first electrodes 126 in the fourth column $R_4$ and the plurality of first electrodes 126 selected every other one in the fifth column $R_5$, which is the non-driving adjacent column, conduct with each other, an alternating voltage $V_4$ with the same voltage and phase as the alternating voltage $V_3$ may be applied to the remaining first electrodes 126 in the fifth column $R_5$ (FIG. 29B). When the liquid crystal cells 120 are driven in this manner, the contribution of the refractive index distribution between the first electrodes 126 in two adjacent columns is significantly decreased. As a result, unintended light diffusion can be suppressed.

Figure 29C:
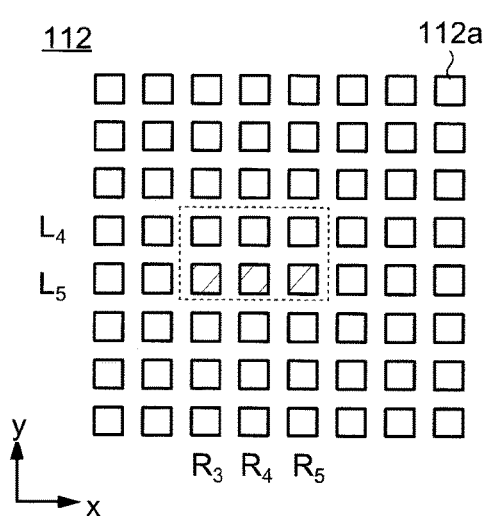
FIG. 29C represents a schematic top view of a light source of a lighting device according to an embodiment of the present invention.
Figure 29D:
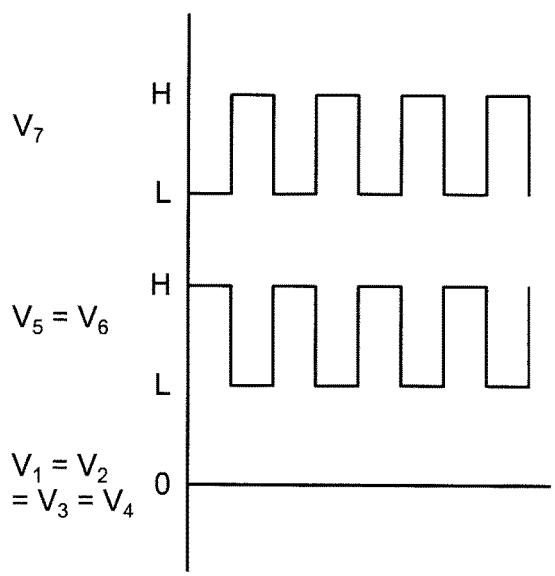
FIG. 29D is a timing chart of a lighting device according to an embodiment of the present invention.

As another example, a case is considered in which the reflective plate 112 has the depressed portions 112a arranged in 8 rows and 8 columns, and light is emitted from the light-emitting elements 114 in the depressed portions 112a of the third column $R_3$ to the fifth column $R_5$ in the fifth row $L_5$ and is diffused in the x direction as shown in FIG. 29C. FIG. 28 schematically shows the arrangement of the second electrodes 128 and the wirings 140 connected thereto in the region surrounded by the dotted line in FIG. 29C, where the light-emitting elements 114 form the illuminated planes 116-4 to 116-6. In order to diffuse the light in the x direction, alternating voltages $V_6$ and $V_7$ with different phases from each other are applied to the second electrodes 128 in the fifth row $L_5$, which is the driving row, among the second electrodes 128 in the two liquid crystal cells 120, while a constant voltage or no voltage is applied to the first electrodes 126 according to the timing chart shown in FIG. 15A (FIG. 29D). Accordingly, the light on the illuminated planes 116-4 to 116-6 is diffused in the x direction.

At this time, the second electrodes 128 in the fourth row $L_4$, which is the non-driving adjacent row, may be synchronized with the plurality of second electrodes 128 selected every other one in the fifth row $L_5$ in order to suppress unintended diffusion. In this modified example 1, since the plurality of second electrodes 128 selected every other one in the fifth row $L_5$, which is the driving row, and the plurality of second electrodes 128 selected every other one in the fourth row $L_4$, which is the non-driving adjacent row, conduct with each other, an alternating voltage $V_5$ with the same voltage and phase as the alternating voltage $V_6$ may be applied to the remaining second electrodes 128 in fourth row $L_4$ (FIG. 29D). When the liquid crystal cells 120 are driven in this manner, the contribution of the refractive index distribution between the second electrodes 128 in two adjacent rows is significantly decreased. As a result, unintended light diffusion can be suppressed.

2. Modified Example 2

2-1. Structure

Figure 30:
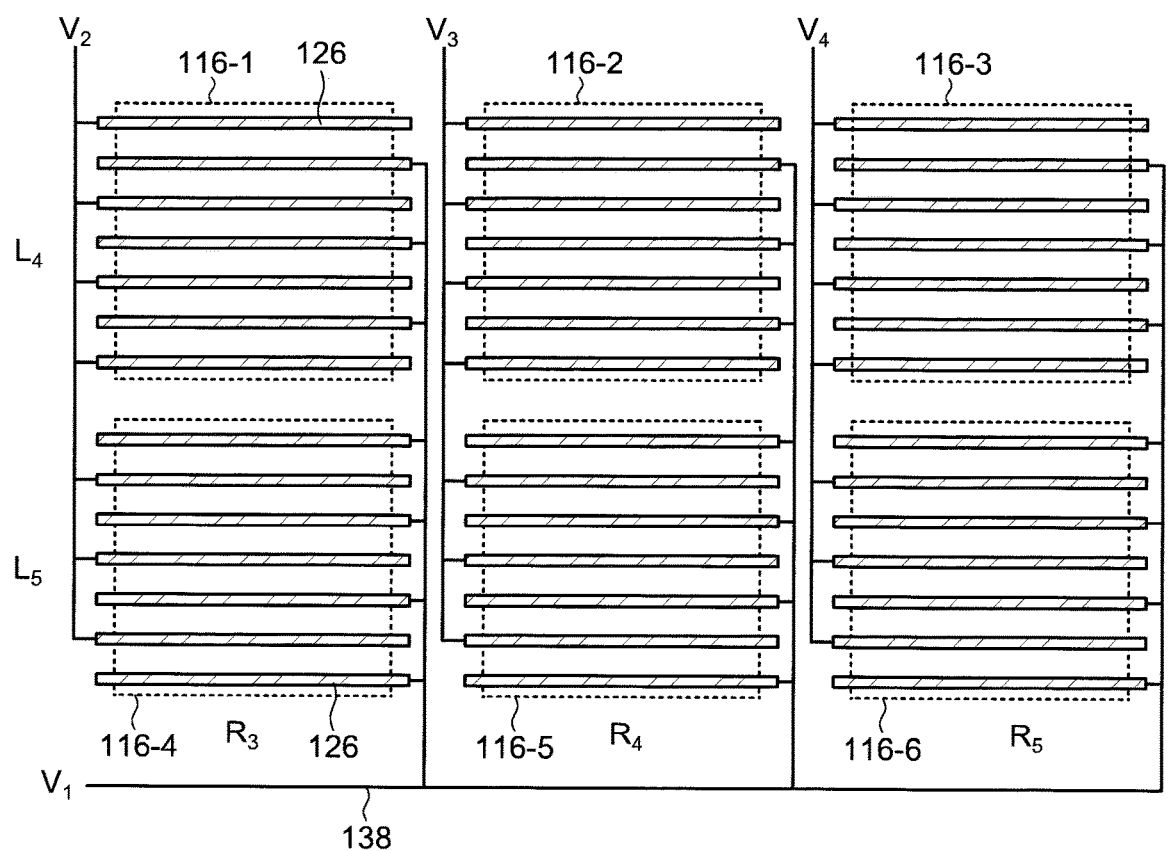
FIG. 30 is a schematic top view of a portion of a liquid crystal cell of a lighting device according to an embodiment of the present invention.
Figure 31:
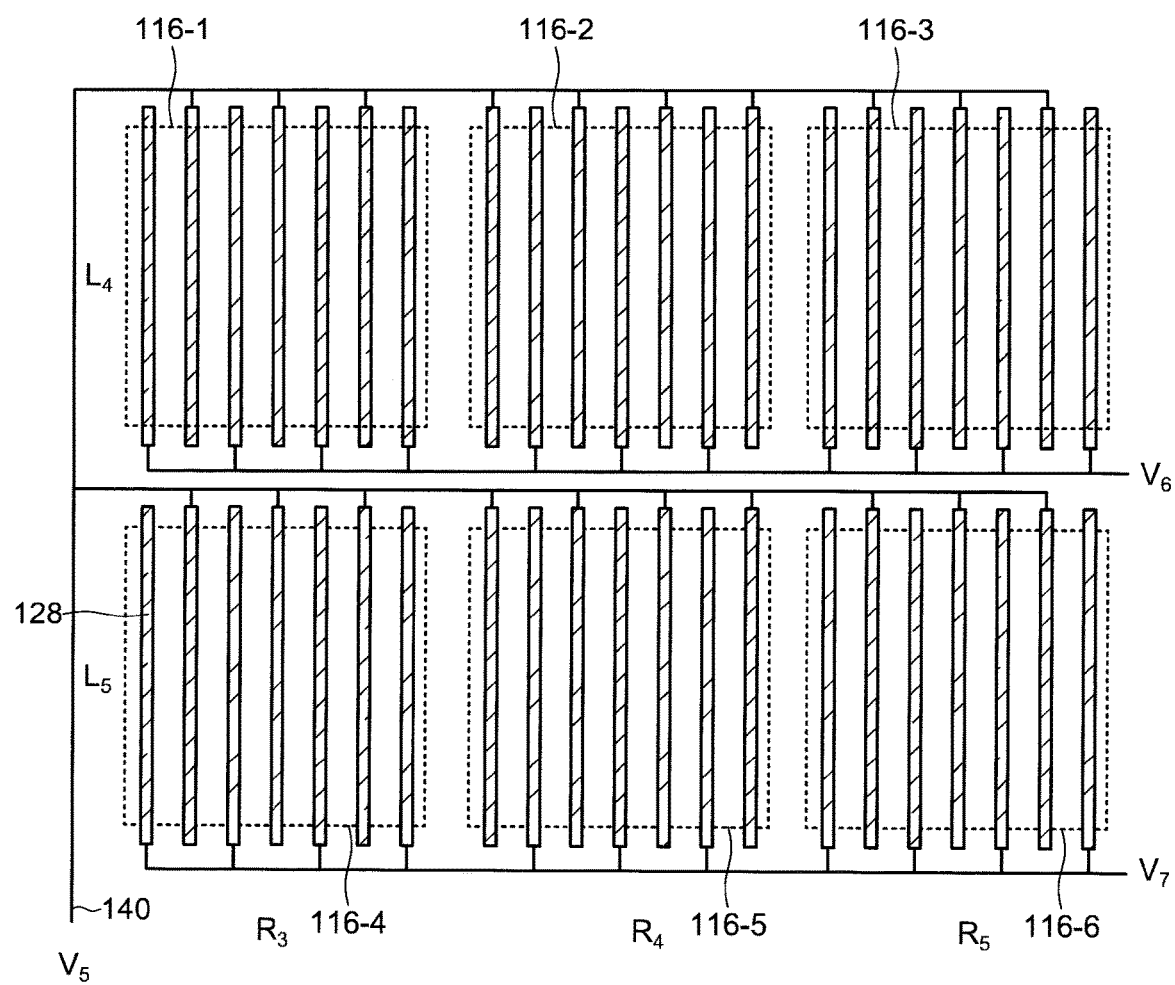
FIG. 31 is a schematic top view of a portion of a liquid crystal cell of a lighting device according to an embodiment of the present invention.

In the lighting device 100 of the present modified example 2, the plurality of first electrodes 126 selected every other one in each column is electrically connected to and conducts with each other via the wiring 138 in at least one of the two liquid crystal cells 120 as shown in FIG. 30. The remaining first electrodes 126 are independently controlled in each row. Further or alternatively, the plurality of second electrodes 128 selected every other one in each row is electrically connected to and conducts with each other via the wiring 140 in at least one of the two liquid crystal cells 120 as shown in FIG. 31. The remaining second electrodes 128 are independently controlled in each row. Similar to the modified example 1, the number of wirings 138 and 140 can be reduced by adopting this connection, thereby improving the degree of freedom in designing the liquid crystal cells 120. In addition, since the distances between adjacent rows and columns can be reduced, the lighting device 100 can be miniaturized.

2-2. Driving Method

Figure 32A:
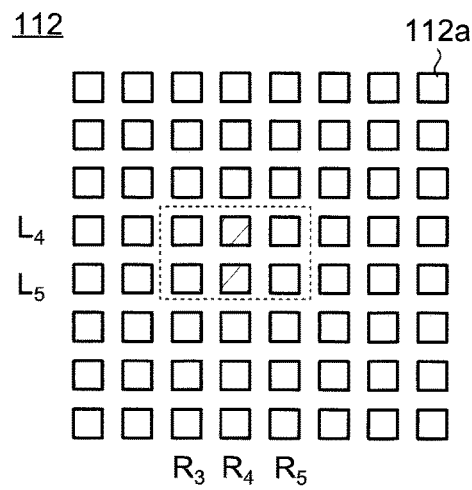
FIG. 32A is a schematic top view of a light source of a lighting device according to an embodiment of the present invention.
Figure 32B:
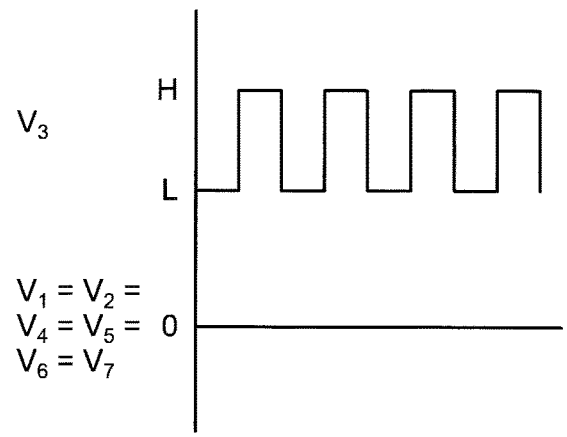
FIG. 32B is a timing chart of a lighting device according to an embodiment of the present invention.

An example of the driving method of the liquid crystal cells 120 in the present modified example 2 is explained below. Here, a case is considered in which the reflective plate 112 has the depressed portions 112a arranged in 8 rows and 8 columns, and light is emitted from the light-emitting elements 114 in the depressed portions 112a of the fourth column $R_4$ in the fourth row La and the fifth row $L_5$ and is diffused in the y direction as shown in FIG. 32A. FIG. 30 schematically shows the arrangement of the first electrodes 126 and the wirings 138 connected thereto in the region surrounded by the dotted line in FIG. 32A, where the light-emitting elements 114 form the illuminated planes 116-2 and 116-5. A constant voltage $V_1$ is applied to the plurality of the first electrodes 126 selected every other one in the fourth column Ra, which is the driving column, among the first electrodes 126 in two liquid crystal cells 120, while an alternating voltage $V_3$ is applied to the remaining first electrodes 126 in order to diffuse the light in the y direction. A constant voltage or no voltage is applied to the second electrodes 128 (FIG. 32B). By this driving method, the light incident on the illuminated planes 116-2 and 116-5 is diffused in the y direction.

At this time, the first electrodes 126 selected every other one in the third column $R_3$ and the fifth column $R_5$, which are the non-driven adjacent columns, may be synchronized with the plurality of first electrodes 126 selected every other one in the fourth column $R_4$ in order to suppress unintended diffusion. In this modified example, since the plurality of first electrodes 126 selected every other one in the non-driving adjacent columns conducts with the plurality of first electrodes 126 selected every other one in the fourth column Ra, which is the driving column, and applied with a constant voltage, a constant voltage $V_2$ or $V_4$ with the same voltage as the constant voltage $V_1$ may be applied to the remaining first electrodes 126 in each non-driving adjacent column (FIG. 32B). When the liquid crystal cells 120 are driven in this manner, the contribution of the refractive index distribution between the first electrodes 126 in two adjacent columns is significantly reduced. As a result, unintended light diffusion can be suppressed.

Figure 32C:
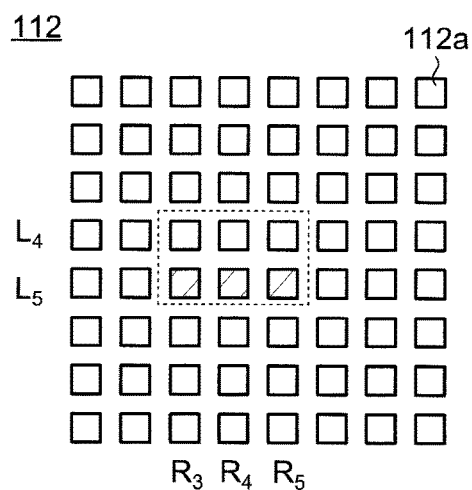
FIG. 32C is a schematic top view of a light source of a lighting device according to an embodiment of the present invention.
Figure 32D:
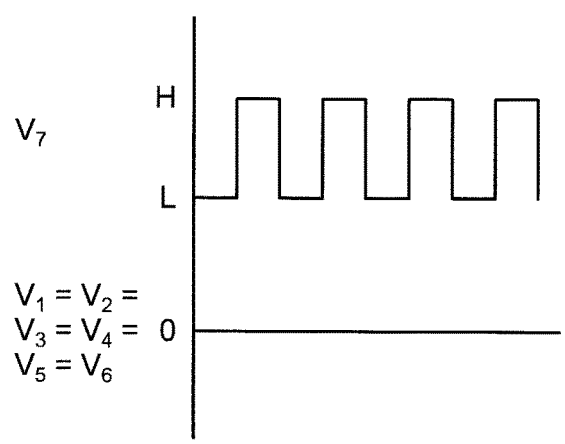
FIG. 32D is a timing chart of a lighting device according to an embodiment of the present invention.

As another example, a case is considered in which the reflective plate 112 has the depressed portions 112a arranged in 8 rows and 8 columns, and light is emitted from the light-emitting elements 114 in the depressed portions 112a of the third column $R_3$ to the fifth column $R_5$ of the fifth row $L_5$ and is diffused in the x direction as shown in FIG. 32C. FIG. 31 schematically shows the arrangement of the second electrodes 128 and the wirings 140 connected thereto in the region surrounded by the dotted line in FIG. 32C, where the light-emitting elements 114 form the illuminated planes 116-4 to 116-6. In order to diffuse the light in the x direction, a constant voltage $V_5$ is applied to the plurality of the second electrodes 128 selected every other one in the fifth column $L_5$, which is the driving row, among the second electrodes 128 in the two liquid crystal cells 120, while an alternating voltage $V_7$ is applied to the remaining second electrodes 128. A constant voltage or no voltage is applied to the first electrodes 126 (FIG. 32D). With this driving method, the light incident on the illuminated planes 116-4 to 116-6 is diffused in the x direction.

At this time, the second electrodes 128 in the fourth row $L_4$, which is the non-driving adjacent row, may be synchronized with the plurality of second electrodes 128 selected every other one in the fifth row $L_5$ in order to suppress unintended diffusion. In this modified example, since the plurality of second electrodes 128 selected every other one in the non-driving adjacent rows conducts with the plurality of second electrodes 128 selected every other one in the fifth row $L_5$, which is the driving row, and applied with a constant voltage, a constant voltage $V_6$ with the same voltage as the constant voltage $V_6$ may be applied to the remaining second electrodes 128 in the non-driving adjacent rows (FIG. 32D).

When the liquid crystal cells 120 are driven in this manner, the contribution of the refractive index distribution between the second electrodes 128 in two adjacent rows is significantly decreased. As a result, unintended light diffusion can be suppressed.

Sixth Embodiment

In this embodiment, modified examples 3 and 4 of the lighting device 100 described in the First Embodiment are explained. An explanation of the structures the same as or similar to those described in the First to Fifth embodiments may be omitted. 1. Modified Example 3

Figure 33A:
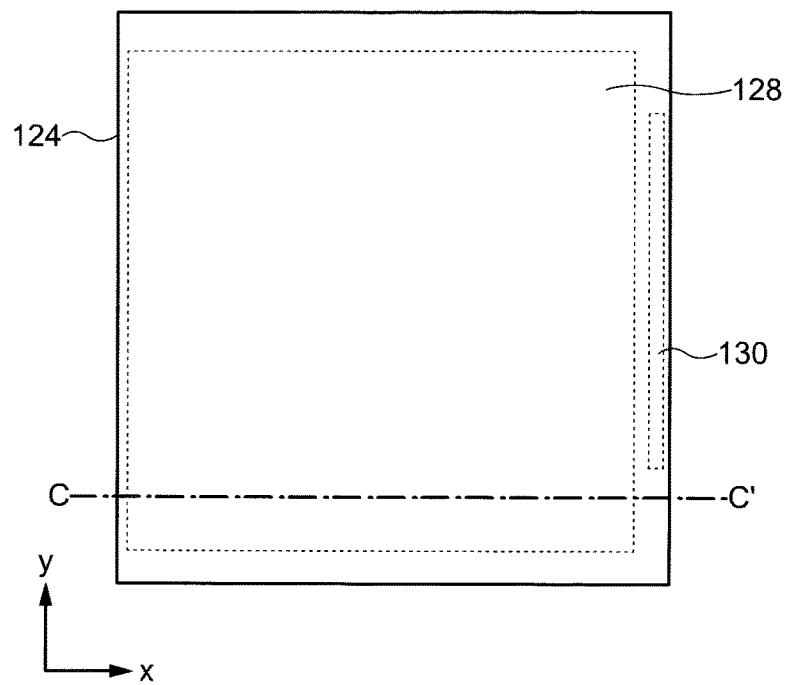
FIG. 33A is a schematic top view of a liquid crystal cell of a lighting device according to an embodiment of the present invention.
Figure 33B:
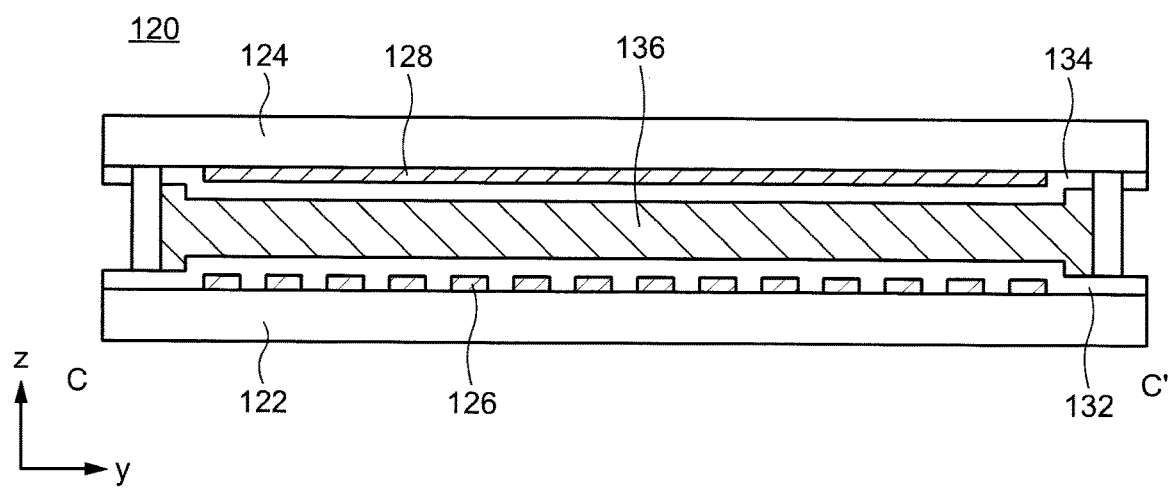
FIG. 33B is a schematic cross-sectional view of a liquid crystal cell of a lighting device according to an embodiment of the present invention.

The lighting device 100 according to the modified example 3 differs from the lighting device 100 described in the First Embodiment in that, as shown in FIG. 33A and the schematic view of the cross section along the chain line C-C' thereof (FIG. 33B), a single second electrode 128 overlapping all of the depressed portions 112*a* is provided in at least one of the liquid crystal cells 120. The single second electrode 128 overlaps the plurality or all of the first electrode groups 125. In this case, the light diffusion occurs only on the first electrode 126 side because the refractive index distribution cannot be formed on the second electrode 128 side of each liquid crystal layer 136. Therefore, in this modified example 3, it is preferable to configure the lighting device 100 so that the extending directions of the first electrodes 126 are orthogonal to each other between the first liquid crystal cell 120-1 and the second liquid crystal cell 120-2. When this modified example 3 is employed, patterning of the second electrode 128 is no longer necessary, by which the manufacturing process can be shortened, and the lighting device 100 can be produced at a lower cost.

2. Modified Example 4

Figure 34A:
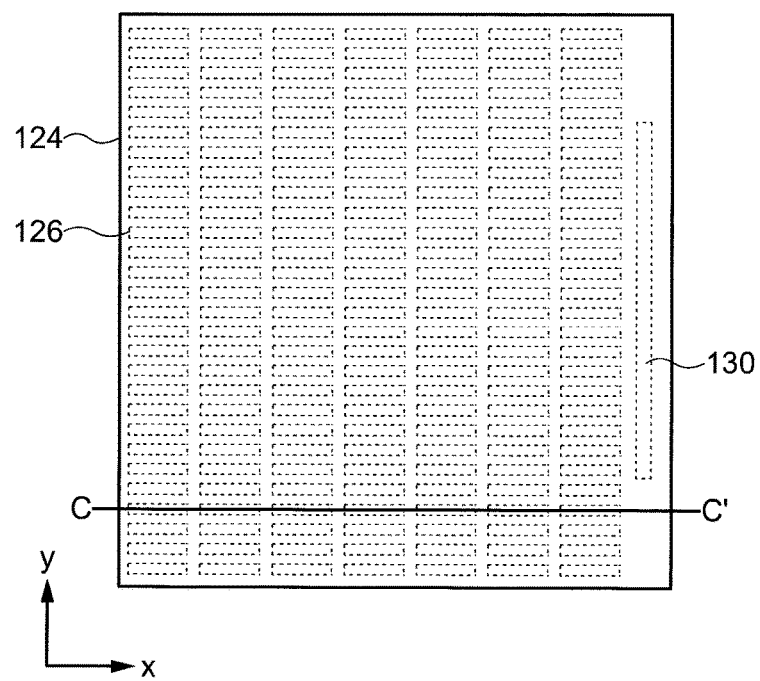
FIG. 34A is a schematic top view of a liquid crystal cell of a lighting device according to an embodiment of the present invention.
Figure 34B:
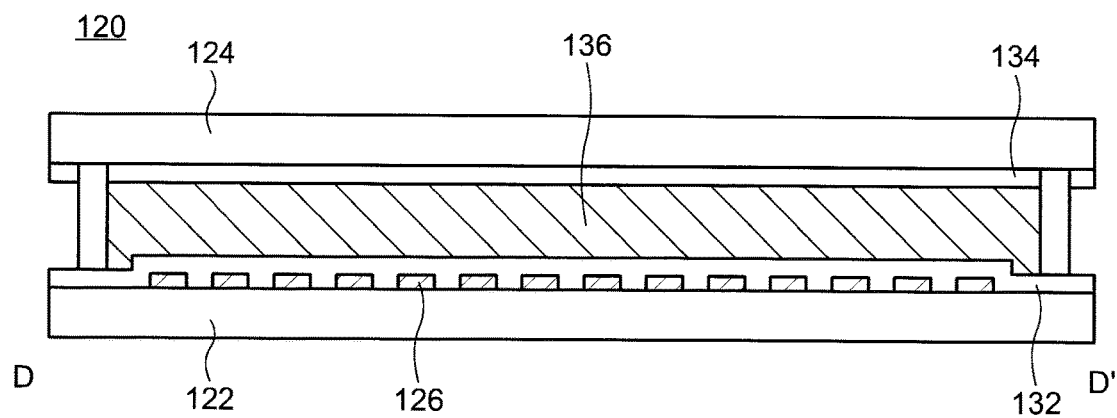
FIG. 34B is a schematic cross-sectional view of a liquid crystal cell of a lighting device according to an embodiment of the present invention.

The lighting device 100 according to the modified example 4 differs from the lighting device 100 described in the First Embodiment in that, as shown in FIG. 34A and the schematic view of the cross section along the chain line D-D' thereof (FIG. 34B), no second electrode 128 is provided in at least one of the liquid crystal cells 120. In this case, the light diffusion also occurs only on the first electrode 126 side since the refractive index distribution cannot be formed on the second electrode 128 side of each liquid crystal layer 136. Therefore, in this modified example 3, it is preferable to configure the lighting device 100 so that the extending directions of the first electrodes 126 are orthogonal to each other between the first liquid crystal cell 120-1 and the second liquid crystal cell 120-2. When this modified example 4 is employed, the fabrication process of the second electrode 128 becomes unnecessary, by which the manufacturing process can be shortened, and the lighting device 100 can be provided at a lower cost. In addition, since the absorption of light by the second electrode 128 is completely eliminated, the power consumption of the lighting device 100 can be reduced.

Seventh Embodiment

In this embodiment, modified examples 5 and 6 of the lighting device 100 described in the First Embodiment are explained. An explanation of the structures the same as or similar to those described in the First to Sixth embodiments may be omitted.

1. Modified Example 5

Figure 35A:
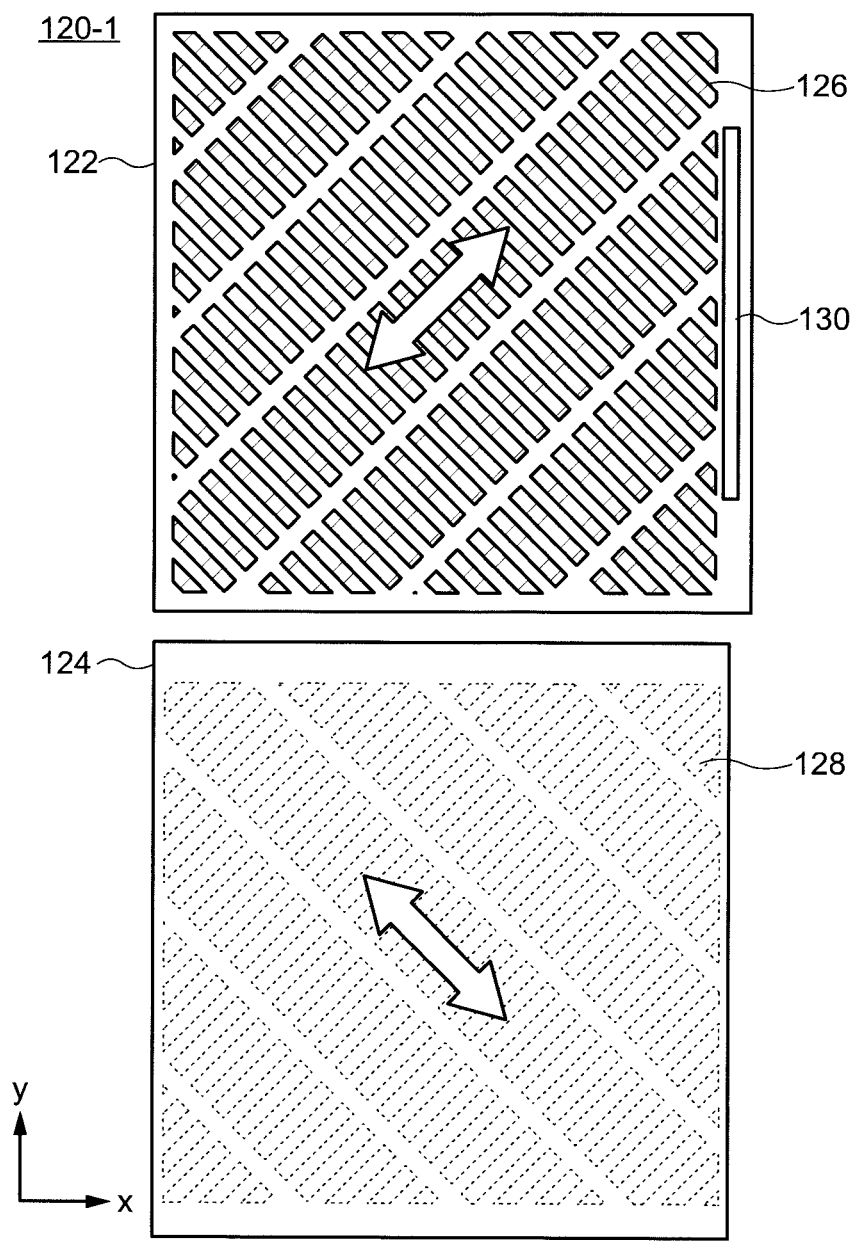
FIG. 35A is a schematic top view of a liquid crystal cell of a lighting device according to an embodiment of the present invention.
Figure 35B:
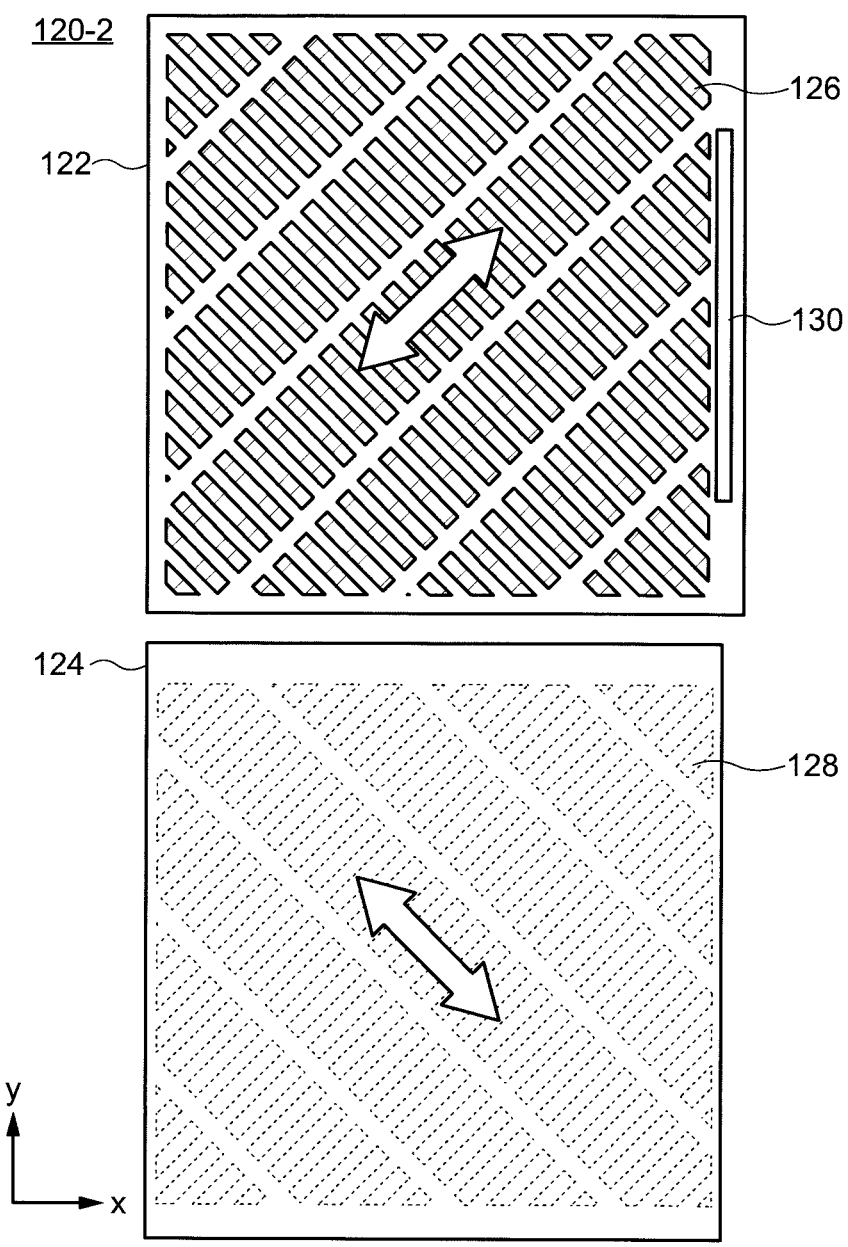
FIG. 35B is a schematic top view of a liquid crystal cell of a lighting device according to an embodiment of the present invention.

Schematic plan views of the first substrate 122 and the second substrate 124 of the first liquid crystal cell 120-1 of the lighting device 100 according to the modified example 5 are shown in FIG. 35A, while schematic plan views of the first substrate 122 and the second substrate 124 of the second liquid crystal cell 120-2 are shown in FIG. 35B. As shown in these drawings, the plurality of first electrodes 126 is arranged so that the longitudinal direction thereof is inclined from at least one side of the first substrate 122 in at least one of the liquid crystal cells 120 of the lighting device 100 according to the modified example 5. The angle (first angle) between the longitudinal direction of the first electrodes 126 and the one side of the first substrate 122 may be arbitrarily set, for example, at equal to or more than 5° and equal to or less than 85° or equal to or more than 30° and equal to or less than 60°, and is typically 45°. Similar to the lighting device 100 described in the First Embodiment, the orientation direction of the first orientation film 132 is perpendicular to the longitudinal direction of the first electrodes 126 (see the white arrow).

Similarly, in each liquid crystal cell 120, the plurality of second electrodes 128 is arranged so that the longitudinal direction thereof is inclined from at least one side of the second substrate 124. The angle (second angle) between the longitudinal direction of the second electrodes 128 and the one side of the second substrate 124 may also be set arbitrarily, for example, at equal to or more than 5° and equal to or less than 85 or equal to or more than 30° and equal to or less than 60°, and is typically 45°. Similar to the first orientation film 132, the orientation direction of the second orientation film 134 is perpendicular to the longitudinal direction of the second electrodes 128 (see the white arrow).

In each liquid crystal cell 120, the first electrodes 126 and the second electrodes 128 are arranged so that their longitudinal directions are orthogonal to each other. Note that the longitudinal directions of the first electrodes 126 are parallel or perpendicular to each other between the first liquid crystal cell 120-1 and the second liquid crystal cell 120-2. Similarly, the longitudinal directions of the second electrodes 128 are parallel or perpendicular to each other between the first liquid crystal cell 120-1 and the second liquid crystal cell 120-2. Therefore, when the first substrate 122 and the second substrate 124 are each rectangular, it is preferred to set the first angle and the second angles at 45° to minimize the projected area in the xy plane.

Figure 36A:
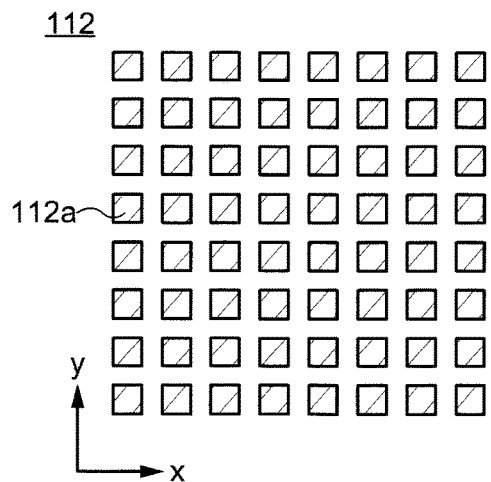
FIG. 36A is a schematic top view of a light source of a lighting device according to an embodiment of the present invention.
Figure 36B:
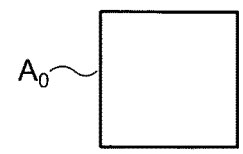
FIG. 36B is a schematic plane view of an illuminated region of a lighting device according to an embodiment of the present invention.
Figure 36C:
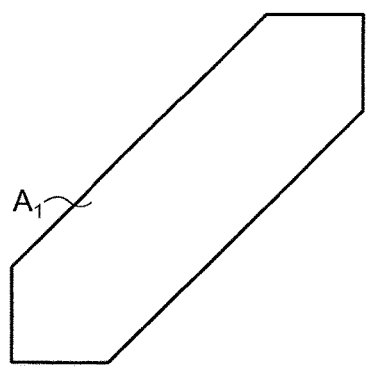
FIG. 36C is a schematic plane view of an illuminated region of a lighting device according to an embodiment of the present invention.
Figure 36D:
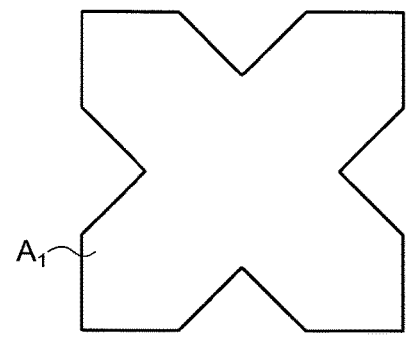
FIG. 36D is a schematic plane view of an illuminated region of a lighting device according to an embodiment of the present invention.
Figure 36E:
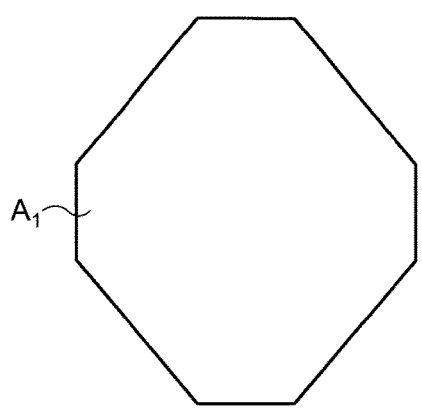
FIG. 36E is a schematic plane view of an illuminated region of a lighting device according to an embodiment of the present invention.
Figure 36F:
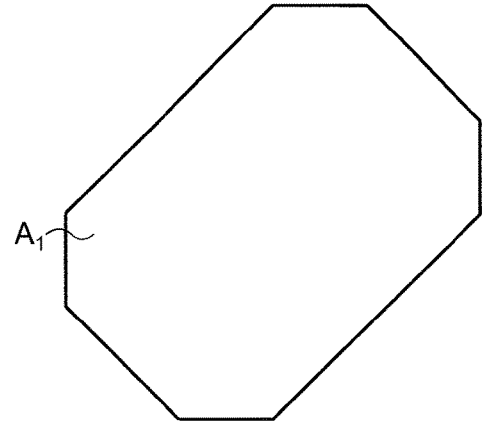
FIG. 36F is a schematic plane view of an illuminated region of a lighting device according to an embodiment of the present invention.

Employment of the aforementioned arrangement allows both the plurality of first electrodes 126 and the plurality of second electrodes 128 to be inclined from the row direction (x direction) and the column direction (y direction) of the depressed portions 112*a* in the first electrode group 125 and the second electrode group 127 overlapping each depressed portion 112*a*. Thus, it is possible to diffuse the light from the light-emitting elements 114 disposed in the depressed portions 112*a* in the direction inclined from the row direction and the column direction. For example, as shown in FIG. 36A, when all of the light-emitting elements 114 disposed in each of the depressed portions 112*a* arranged in a matrix of 8 rows and 8 columns emit light, a rectangular illuminated region $A_0$ reflecting the matrix shape is obtained when the liquid crystal cells 120 are not driven (FIG. 36B). In contrast, when the liquid crystal cells 120 are driven as appropriate, the light can be diffused in directions inclined from the x direction and the y direction (i.e., in the first direction and/or second direction), resulting in the formation of illuminated regions $A_1$ with a variety of shapes as shown in FIG. 36C to FIG. 36F.

Figure 37A:
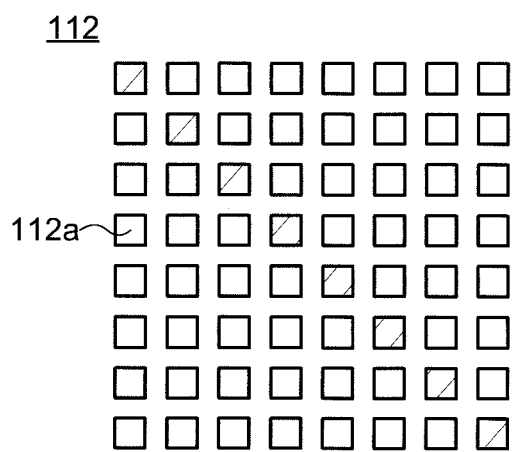
FIG. 37A is a schematic top view of a light source of a lighting device according to an embodiment of the present invention.
Figure 37B:
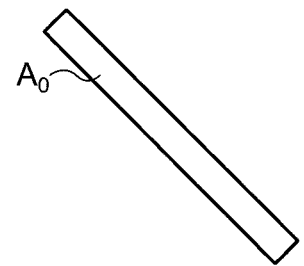
FIG. 37B is a schematic plane view of an illuminated region of a lighting device according to an embodiment of the present invention.
Figure 37C:
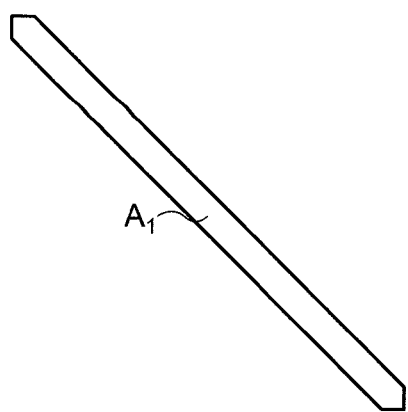
FIG. 37C is a schematic plane view of an illuminated region of a lighting device according to an embodiment of the present invention.

Furthermore, it is also possible to apply the local dimming described in the Second Embodiment. For example, as shown in FIG. 37A, when light is output from the depressed portions 112a along the diagonal among the depressed portions 112a arranged in a matrix of 8 rows and 8 columns, it is possible to obtain an illuminated region $A_1$ expanded in a direction inclined from the x direction and the y direction (FIG. 37C) compared with the illuminated region $A_0$ obtained when the liquid crystal cells 120 are not driven (FIG. 36B).

2. Modified Example 6

Figure 38A:
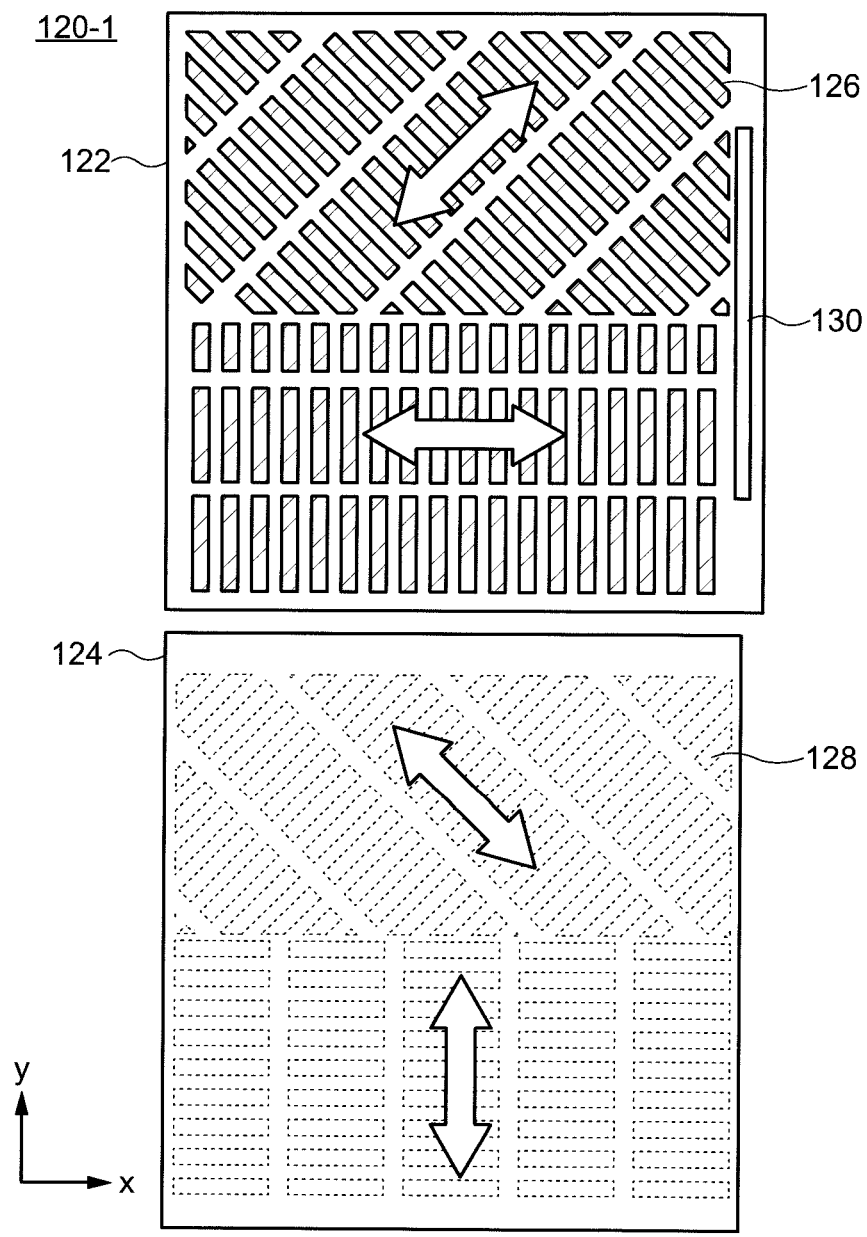
FIG. 38A is a schematic top view of a liquid crystal cell of a lighting device according to an embodiment of the present invention.
Figure 38B:
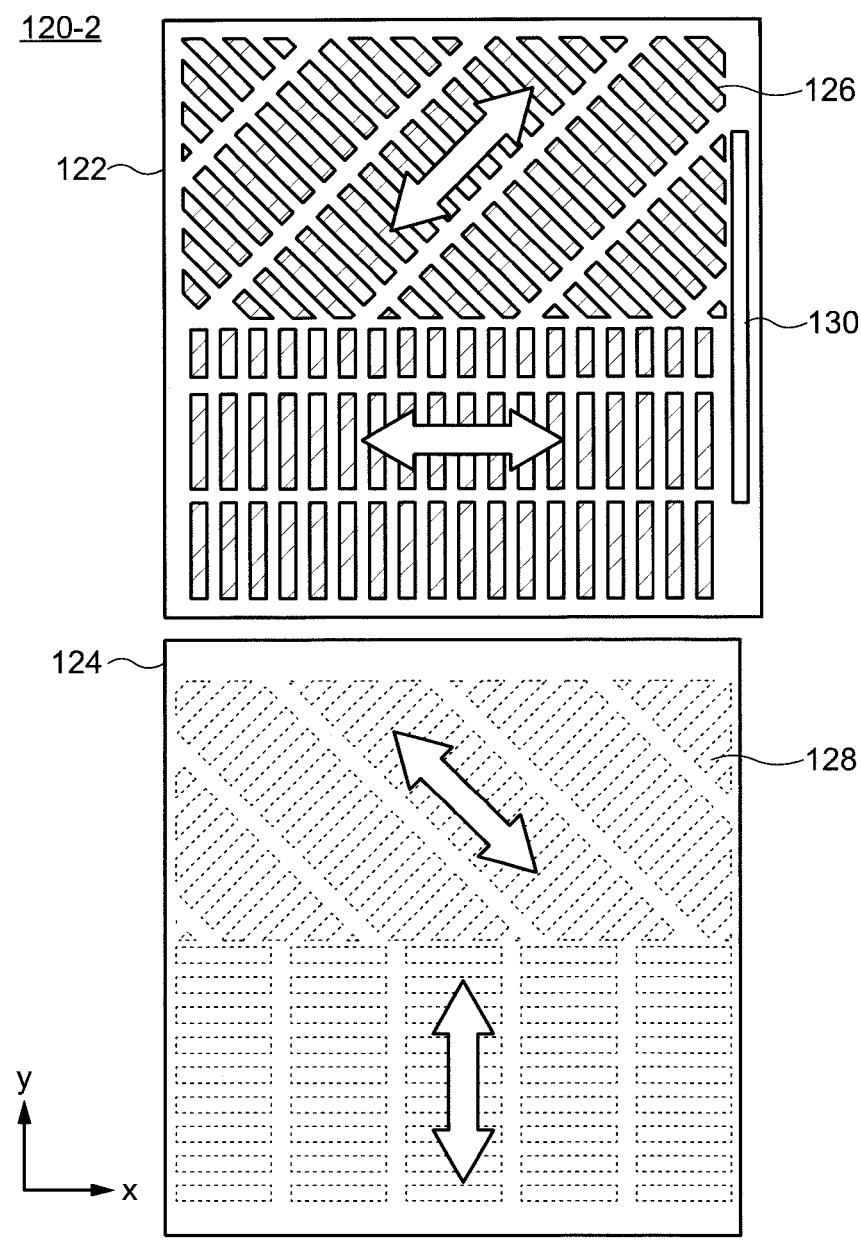
FIG. 38B is a schematic top view of a liquid crystal cell of a lighting device according to an embodiment of the present invention.

Schematic plan views of the first substrate 122 and the second substrate 124 of the first liquid crystal cell 120-1 of the lighting device 100 of the modified example 6 are shown in FIG. 38A, while schematic plan views of the first substrate 122 and the second substrate 124 of the second liquid crystal cell 120-2 are shown in FIG. 38B. As shown in these drawings, the first substrate 122 is divided into two regions in at least one liquid crystal cell 120 in the lighting device 100 of the modified example 6. The first electrodes 126 are arranged in one region (first region) so that the longitudinal direction thereof is parallel to at least one side of the first substrate 122, whereas the first electrodes 126 are arranged in the other region (second region) so that the longitudinal direction thereof is inclined from that side similar to the modified example 5.

Similarly, the second substrate 124 is also divided into two regions. The second electrodes 128 are arranged in one region (third region) so that the longitudinal direction thereof is parallel to at least one side of the second substrate 124, whereas the second electrodes 128 are arranged in the other region (fourth region) so that the longitudinal direction thereof is inclined from that edge, similar to the modified example 5.

In each liquid crystal cell 120, the first regions and the third region overlap each other, and the second region and the fourth region overlap each other. Furthermore, the longitudinal direction of the first electrodes 126 is orthogonal to the longitudinal direction of the second electrodes 128. The longitudinal directions of the first electrodes 126 are parallel or perpendicular to each other, and the longitudinal directions of the second electrodes 128 are also parallel or perpendicular to each other between the first liquid crystal cell 120-1 and the second liquid crystal cell 120-2. Note that, the orientation direction is perpendicular to the longitudinal direction of the first electrodes 126 or the second electrodes 128 in each of the first region to the fourth region (see white arrows).

Employment of such an arrangement allows the light output from the depressed portions 112a to be diffused in the x direction and the y direction in a portion of the lighting device 100 (i.e., in a portion where the first region and the third region overlap each other) and to be diffused in a direction inclined from the x direction and the y direction in the other portion (i.e., in a portion where the second region and the fourth region overlap each other). Therefore, it is possible to form illuminated regions with more diverse shapes.

Figure 39:
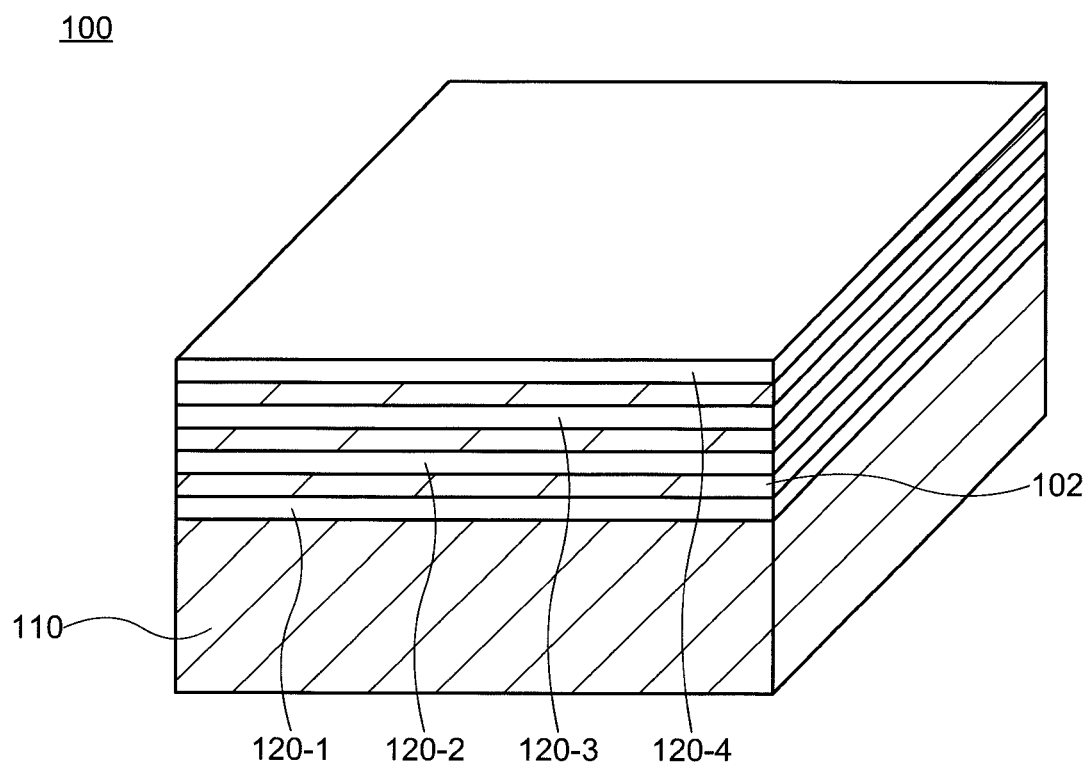
FIG. 39 is a schematic perspective view of a lighting device according to an embodiment of the present invention.

Furthermore, the liquid crystal cells 120 having the structure described in the First Embodiment may be combined with the pair of liquid crystal cells 120 according to the modified example 5 or the modified example 6 in the lighting device 100. Adjacent liquid crystal cells 120 may be in direct contact with each other or may be fixed through an adhesive layer 102. For example, FIG. 39 shows an example in which a third liquid crystal cell 120-3 and a fourth liquid crystal cell 120-4 with the plurality of first electrodes 126 and the plurality of second electrodes 128 respectively inclined from the sides of the first substrate 122 and the second substrate 124 are disposed over a first liquid crystal cell 120-1 and a second liquid crystal cell 120-2 with the plurality of first electrodes 126 and the plurality of second electrodes 128 respectively extending parallel to the sides of the first substrate 122 and the second substrate 124. Since the light can be diffused in a direction inclined from the x direction and the y direction (e.g., inclined by 45°) in addition to the x direction and the y direction by driving the first to fourth liquid crystal cells 120 as appropriate in such a configuration, the illuminated region can be transformed in a variety of ways.

Eighth Embodiment

In the present embodiment, a modified example of the driving method of the lighting device 100 described in the First Embodiment is explained. An explanation of the structures the same as or similar to those described in First to Seventh Embodiments may be omitted.

Figure 40:
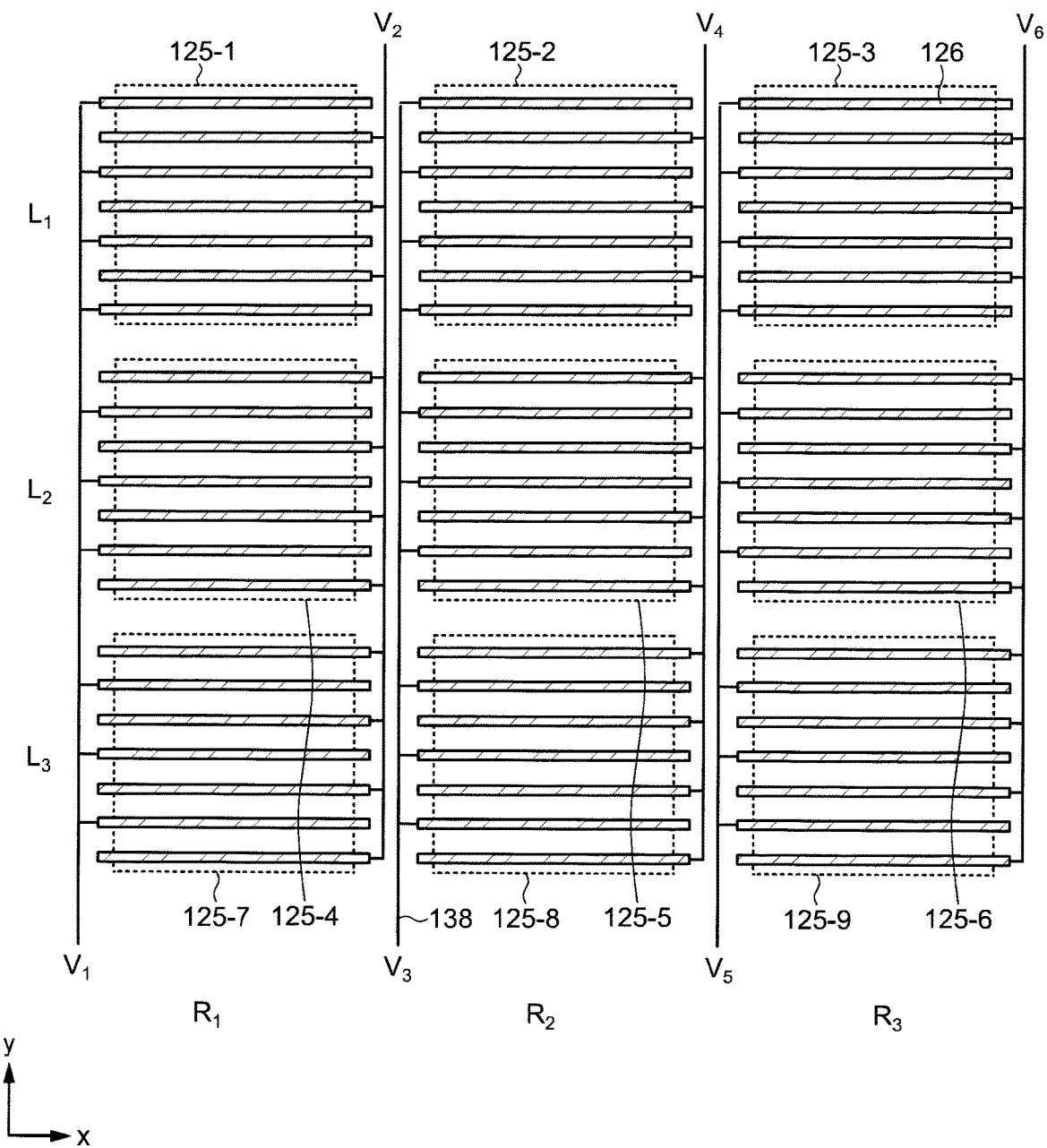
FIG. 40 is a schematic top view of a liquid crystal cell of a lighting device according to an embodiment of the present invention.
Figure 41:
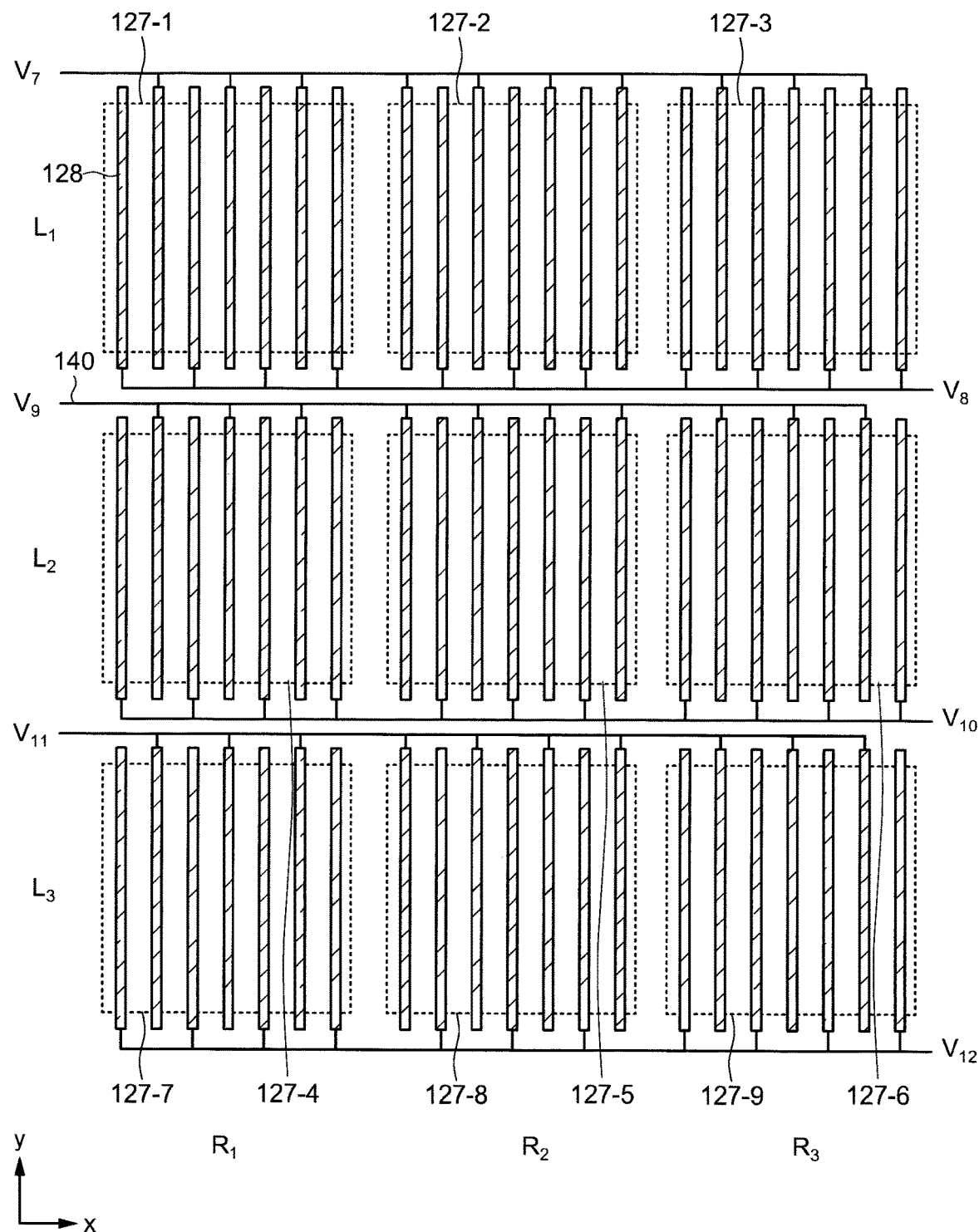
FIG. 41 is a schematic top view of a liquid crystal cell of a lighting device according to an embodiment of the present invention.
Figure 42A:
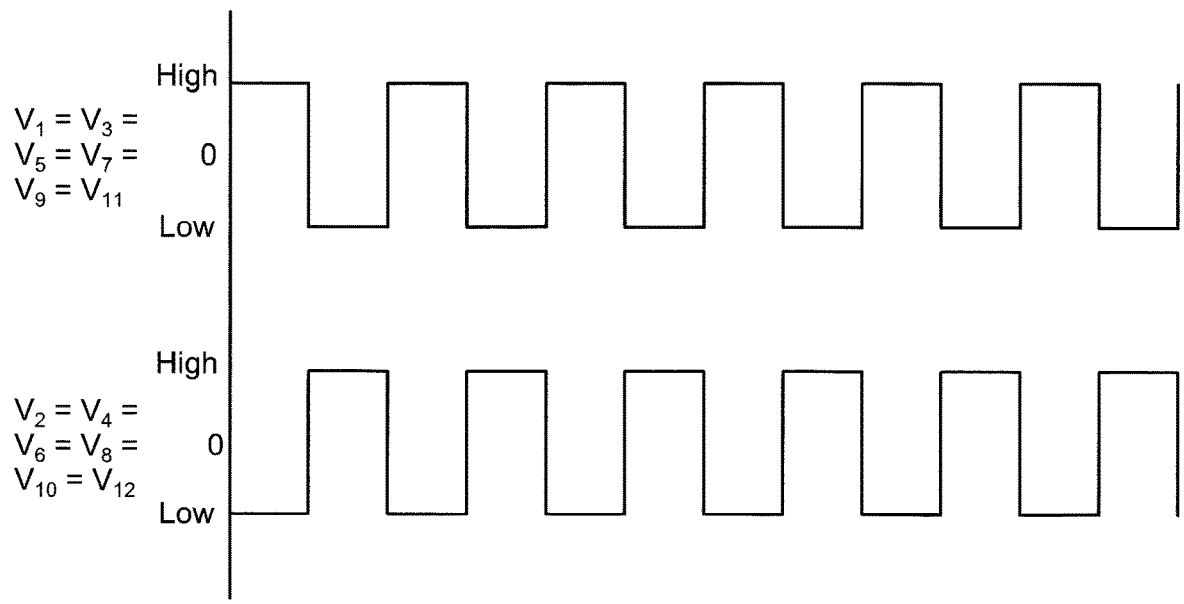
FIG. 42A is a timing chart of a lighting device according to an embodiment of the present invention.

As an example, the arrangements of the first electrodes 126 and the second electrodes 128 of the lighting device 100 having the first electrode groups 125 and the second electrode groups 127 each arranged in a matrix of three rows and three columns are respectively shown in FIG. 40 and FIG. 41. As described in the First Embodiment, alternating voltages with different phases from each other are respectively applied to the first electrodes 126 selected every other one and the other first electrodes 126 in each column. Similarly, alternating voltages with different phases from each other are respectively applied to the second electrodes 128 selected every other one and the other second electrodes 128 in each row. Since the alternating voltages are applied to the wirings 138 and 140 according to the timing chart shown in FIG. 42A in the driving method described in the First Embodiment, the phases of the two wirings 138 between adjacent columns are opposite, and the phases of the two wirings 140 between adjacent rows are also opposite. Hence, since a potential difference is generated between the wirings 140 arranged between adjacent rows and between the wirings 138 arranged between adjacent columns, a refractive index distribution is also generated between adjacent liquid crystal cells 120, i.e., between adjacent depressed portions 112a. Since no illuminated plane 116 is formed between adjacent depressed portions 112a, such an unintended refractive index distribution does not seriously influence the light distribution control. However, an increase in the aforementioned potential difference may affect the orientation of the liquid crystal layer 136 overlapping the illuminated planes 116.

Figure 42B:
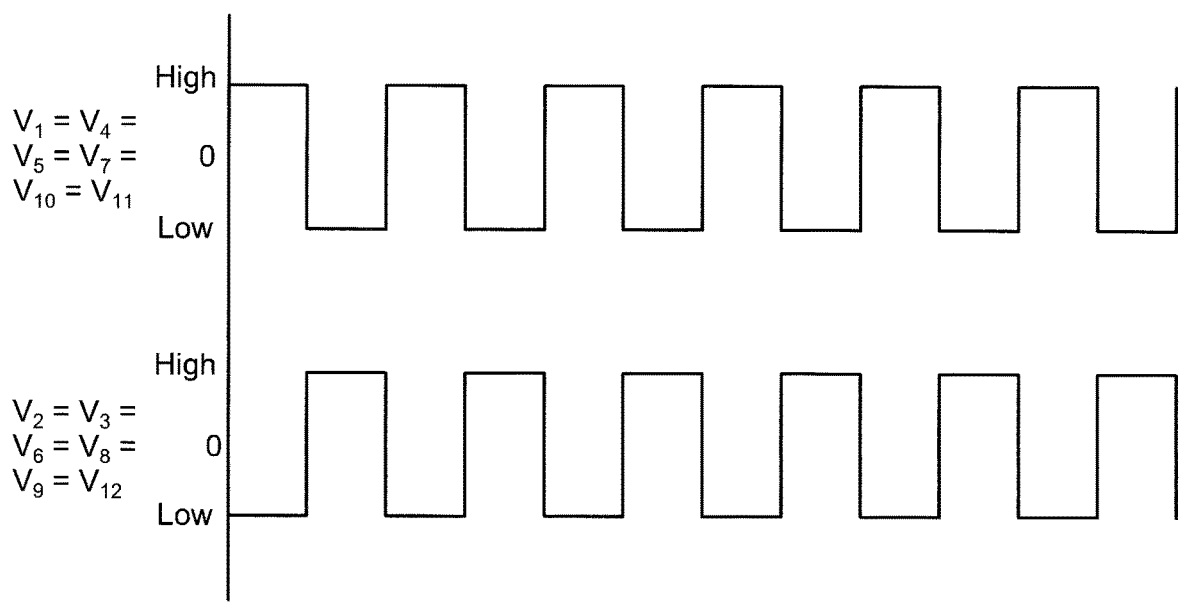
FIG. 42B is a timing chart of a lighting device according to an embodiment of the present invention.

Therefore, when generating a larger transverse electric field, for example, it is preferable to apply an alternating voltage with the same voltage and the same phase to two wirings 138 arranged between adjacent columns to avoid the generation of a potential difference therebetween. Similarly, it is preferable to apply an alternating voltage with the same voltage and the same phase to two wirings 140 arranged between adjacent rows to avoid the generation of a potential difference therebetween. Thus, it is preferable to provide the alternating voltages to the wirings 138 and 140 according to the timing chart shown in FIG. 42B.

In this embodiment, light can also be diffused independently in the x direction and the y direction. In this case, the voltages of the first electrodes 126 and the second electrodes 128 may be appropriately adjusted in each liquid crystal cell 120 as described in the First Embodiment. In addition, when only the light-emitting elements 114 of a part of the depressed portions 112a are driven and the first electrodes 126 of a part of the columns or the second electrodes 128 of a part of the rows are driven as in the Fourth Embodiment, the wirings 138 may be applied with alternating voltages with different phases so that the phases of the first electrode 126 selected every other one and the other first electrodes 126 are different from each other in the non-driving adjacent columns. Similarly, alternating voltages with different phases may be applied to the wirings 140 so that the phases of the second electrodes 128 selected every other one and the other second electrodes 128 are different from each other in the non-driving adjacent rows.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process is included in the scope of the present invention as long as they possess the concept of the present invention.

It is understood that another effect different from that provided by each of the aforementioned embodiments is achieved by the present invention if the effect is obvious from the description in the specification or readily conceived by persons ordinarily skilled in the art.

What is claimed is:

1. A lighting device comprising:
    a light source comprising a plurality of light-emitting elements arranged in a matrix shape with m rows and n columns;
    a first liquid crystal cell over the light source; and
    a second liquid crystal cell over the first liquid crystal cell,
    wherein each of the first liquid crystal cell and the second liquid crystal cell comprises:
        a first substrate;
        a plurality of first electrode groups located over the first substrate and arranged in a matrix shape with m rows and n columns;
        a liquid crystal layer over the plurality of first electrode groups; and
        a second substrate over the liquid crystal layer,
    wherein, in each of the first liquid crystal cell and the second liquid crystal cell,
        each of the plurality of first electrode groups comprises a plurality of first electrodes extending in a row direction,
        the light-emitting elements in a jth row and a kth column overlap with one of the plurality of first electrode groups located in the jth row and the kth column,
    wherein longitudinal directions of the plurality of first electrodes of the first liquid crystal cell are parallel to longitudinal directions of the plurality of first electrodes of the second liquid crystal cell, and
    wherein n and m are each a natural number larger than 1, j is a variable selected from natural numbers equal to or larger than 1 and equal to or smaller than n, and k is a variable selected from natural numbers equal to or larger than 1 and equal to or smaller than m.

2. The lighting device according to claim 1,
    wherein each of the first liquid crystal cell and the second liquid crystal cell further comprises a single second electrode between the liquid crystal layer and the second substrate, and
    wherein, in each of the first liquid crystal cell and the second liquid crystal cell, the second electrode overlaps the plurality of first electrode groups.

3. The lighting device according to claim 1,
    wherein each of the first liquid crystal cell and the second liquid crystal cell further comprises a plurality of second electrode groups arranged in a matrix shape with m rows and n columns between the liquid crystal layer and the second substrate, and
    wherein, in each of the first liquid crystal cell and the second liquid crystal cell,
        each of the plurality of second electrode groups comprises a plurality of second electrodes extending in a column direction, and
        the light-emitting element in the jth row and the kth column overlaps one of the plurality of second electrode groups in the jth row and the kth column.

4. The lighting device according to claim 1,
    wherein the light source comprises a reflective plate having a plurality of depressed portions arranged in a matrix shape with m rows and n columns,
    the plurality of light-emitting elements is arranged in the corresponding plurality of depressed portions, and
    the plurality of depressed portions is configured so that light from the light-emitting element in the depressed portion located in the jth row and the kth column is selectively applied to the one of the plurality of first electrode groups located in the jth row and the kth column in the first liquid crystal cell.

5. The lighting device according to claim 1,
    wherein, in each of the first liquid crystal cell and the second liquid crystal cell,
        the plurality of first electrodes is configured to be applied with a constant voltage or a first alternating voltage,
        a phase of the first alternating voltage is inverted between the first electrodes adjacent in the same column when the first alternating voltage is applied, and
        the constant voltage is different between the first electrodes adjacent in the same column when the constant voltage is applied.

6. The lighting device according to claim 3,
    wherein, in each of the first liquid crystal cell and the second liquid crystal cell,
        the plurality of second electrodes is configured to be applied with a constant voltage or a second alternating voltage,
        a phase of the second alternating voltage is inverted between the second electrodes adjacent in the same row when the second alternating voltage is applied, and
        the constant voltage is different between the second electrodes adjacent in the same row when the constant voltage is applied.

7. The lighting device according to claim 1,
    wherein a thickness of the liquid crystal layer is equal to or larger than 20 μm and equal to or smaller than 60 μm in each of the first liquid crystal cell and the second liquid crystal cell.

8. The lighting device according to claim 1,
    wherein each of the first liquid crystal cell and the second liquid crystal cell further comprises:
        a first orientation film between the plurality of first electrode groups and the liquid crystal layer; and a second orientation film located between the liquid crystal layer and the second substrate and in contact with the liquid crystal layer, and wherein, in each of the first liquid cell and the second liquid crystal cell, an orientation direction of the first orientation film is perpendicular to the longitudinal directions of the plurality of first electrodes, and an orientation direction of the second orientation film is perpendicular to the orientation direction of the first orientation film.

9. The lighting device according to claim 1, wherein, in each of the first liquid crystal cell and the second liquid crystal cell, the plurality of first electrodes selected every other one in the kth column electrically conducts with the plurality of first electrodes selected every other one in the column adjacent to the kth column.

10. The lighting device according to claim 3, wherein, in each of the first liquid crystal cell and the second liquid crystal cell, the plurality of second electrodes selected every other one in the jth row electrically conducts with the plurality of second electrodes selected every other one in the row adjacent to the jth row.

11. The lighting device according to claim 1, wherein, in each of the first liquid crystal cell and the second liquid crystal cell, the plurality of first electrodes selected every other one in each column electrically conducts with each other.

12. The lighting device according to claim 3, wherein, in each of the first liquid crystal cell and the second liquid crystal cell, the plurality of second electrodes selected every other one in each row electrically conducts with each other.

13. The lighting device according to claim 1, wherein the light source is configured so that the plurality of light-emitting elements is controlled independently from each other.

14. The lighting device according to claim 3, wherein, in each of the first liquid crystal cell and the second liquid crystal cell, the first substrate has a first region and a second region, the second substrate has a third region and a fourth region respectively overlapping the first region and the second region, the plurality of first electrodes is parallel to a side of the first substrate in the first region, the plurality of first electrodes is inclined from the side of the first substrate in the second region, the plurality of second electrodes is parallel to a side of the second substrate in the third region, and the plurality of second electrodes is inclined from the side of the second substrate in the fourth region.

15. The lighting device according to claim 1, further comprising:

a third liquid crystal cell having the same structure as the first liquid crystal cell and located between the first liquid crystal cell and the second liquid crystal cell; and a fourth liquid crystal cell having the same structure as the second liquid crystal cell and located over the second liquid crystal cell, wherein the longitudinal directions of the plurality of first electrodes are parallel between the first liquid crystal cell and the third liquid crystal cell, wherein the longitudinal directions of the plurality of first electrodes are parallel between the second liquid crystal cell and the fourth liquid crystal cell, and wherein the longitudinal directions of the plurality of first electrodes intersect each other between the first liquid crystal cell and the second liquid crystal cell.

16. An optical element comprising:

a first substrate;

a plurality of first electrode groups located over the first substrate and arranged in a matrix shape with m rows and n columns;

a liquid crystal layer over the plurality of first electrode groups; and a second substrate over the liquid crystal layer, wherein each of the plurality of first electrode groups comprises a plurality of first electrodes extending in a row direction, wherein, in a portion of the plurality of first electrode groups arranged in a kth column, odd-numbered first electrodes in a column direction are connected to a first wiring, while even-numbered first electrodes are connected to a second wiring, wherein, in a portion of the plurality of first electrode groups arranged in a (k+1)th column, odd-numbered first electrodes in the column direction are connected to a third wiring, while even-numbered first electrodes are connected to a fourth wiring, and wherein n and m are each a natural number larger than 1, and k is a variable selected from natural numbers equal to or larger than 1 and less than n.

17. The optical element according to claim 16, further comprising a driver circuit connected to the first wiring to the fourth wiring and configured to independently supply a potential to the first wiring to the fourth wiring.

18. The optical element according to claim 16, further comprising a plurality of second electrode groups located under the substrate and arranged in a matrix shape with m rows and n columns, wherein each of the plurality of second electrode groups comprises a plurality of second electrodes extending in a column direction, wherein, in a portion of the plurality of second electrode groups arranged in a jth row, odd-numbered second electrodes in the row direction are connected to a fifth wiring, while even-numbered second electrodes are connected to a sixth wiring, wherein, in a portion of the plurality of second electrode groups arranged in a (j+1)th row, odd-numbered second electrodes in the column direction are connected to a seventh wiring, while even-numbered second electrodes are connected to an eighth wiring, and wherein j is a variable selected from natural numbers equal to or larger than 1 and less than m.

19. The optical element according to claim 18, further comprising a driver circuit connected to the first wiring to the eighth wiring and configured to independently supply a potential to the first wiring to the eighth wiring.

* * * * *